(12) United States Patent
Arefi

(10) Patent No.: US 12,491,470 B2
(45) Date of Patent: Dec. 9, 2025

(54) INTEGRATED GREEN ENERGY AND SELECTIVE MOLECULAR SEPARATION SYSTEM, AND PROCESS OF GENERATING ELECTRICITY AND SELECTIVELY SEPARATING AND CAPTURING PREDETERMINED MOLECULES PRESENT IN SURROUNDING ENVIRONMENT (GREEN ENERGY BLUE)

(71) Applicant: Babak Bob Arefi, Spring, TX (US)

(72) Inventor: Babak Bob Arefi, Spring, TX (US)

( * ) Notice: Subject to any disclaimer, the term of this patent is extended or adjusted under 35 U.S.C. 154(b) by 520 days.

(21) Appl. No.: 17/855,273

(22) Filed: Jun. 30, 2022

(65) Prior Publication Data

US 2023/0147875 A1    May 11, 2023

Related U.S. Application Data

(60) Provisional application No. 63/284,354, filed on Nov. 30, 2021, provisional application No. 63/278,316, filed on Nov. 11, 2021.

(51) Int. Cl.
*B01D 53/14* (2006.01)
*B01D 53/02* (2006.01)
(Continued)

(52) U.S. Cl.
CPC ......... *B01D 53/1425* (2013.01); *B01D 53/02* (2013.01); *B01D 53/04* (2013.01); *B01D 53/1475* (2013.01); *B01D 53/228* (2013.01); *B01D 67/00931* (2022.08); *B01D 69/147* (2013.01); *B01D 71/028* (2013.01);
(Continued)

(58) Field of Classification Search
CPC ..... B01D 53/02; B01D 53/04; B01D 53/1425
See application file for complete search history.

(56) References Cited

U.S. PATENT DOCUMENTS

| 8,163,066 B2 | 4/2012 | Eisenberger |
| 9,555,365 B2 | 1/2017 | Eisenberger et al. |

(Continued)

FOREIGN PATENT DOCUMENTS

CN    111346475 A  *  6/2020

*Primary Examiner* — Robert A Hopkins
(74) *Attorney, Agent, or Firm* — McCutcheon Joseph, PLLC

(57) ABSTRACT

A green energy generating system (e.g., thermal, solar, wind, kinetic) is integrated with a selective molecular separation (i.e., greenhouse gas capturing) system. The output of each system is utilized by the other to form a unitary system that produces green energy (i.e., electricity) while separating/capturing predetermined molecules (e.g., greenhouse gases) from the environment. The process includes providing kinetic energy fluid from an energy source; driving a turbine via the kinetic energy fluid; driving a generator via the turbine to generate electricity; supplying (i) the kinetic energy fluid exiting the turbine and/or (ii) electricity generated by the generator to a molecular separation unit; intaking the predetermined molecules into the separation unit and selectively separating at least one predetermined molecule from other molecules; and capturing the predetermined molecule via a desorption process using heat from thermal energy of (i) the kinetic energy fluid and/or (ii) an electrical heater powered by the electricity.

39 Claims, 32 Drawing Sheets

(51) Int. Cl.
*B01D 53/04* (2006.01)
*B01D 53/22* (2006.01)
*B01D 67/00* (2006.01)
*B01D 69/14* (2006.01)
*B01D 71/02* (2006.01)
*H02K 7/18* (2006.01)
*H02N 11/00* (2006.01)

(52) U.S. Cl.
CPC ......... *B01D 71/0281* (2022.08); *H02K 7/183* (2013.01); *H02N 11/002* (2013.01); *B01D 2257/404* (2013.01); *B01D 2257/502* (2013.01); *B01D 2257/504* (2013.01); *B01D 2258/06* (2013.01); *B01D 2259/40088* (2013.01)

(56) References Cited

U.S. PATENT DOCUMENTS 9,869,167 B2  1/2018  Randolph
10,577,248 B2  3/2020  Harper, Jr.

\* cited by examiner

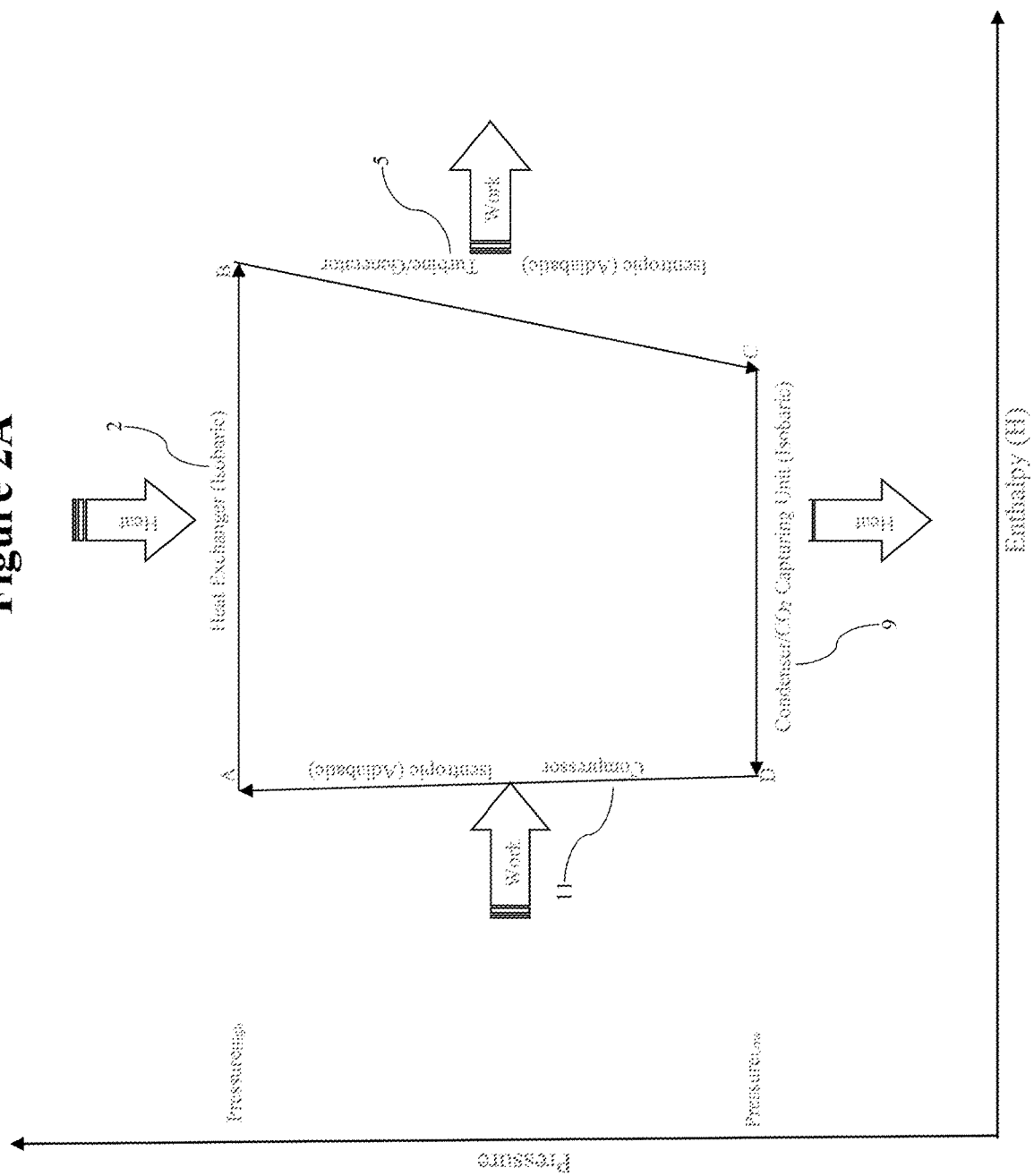

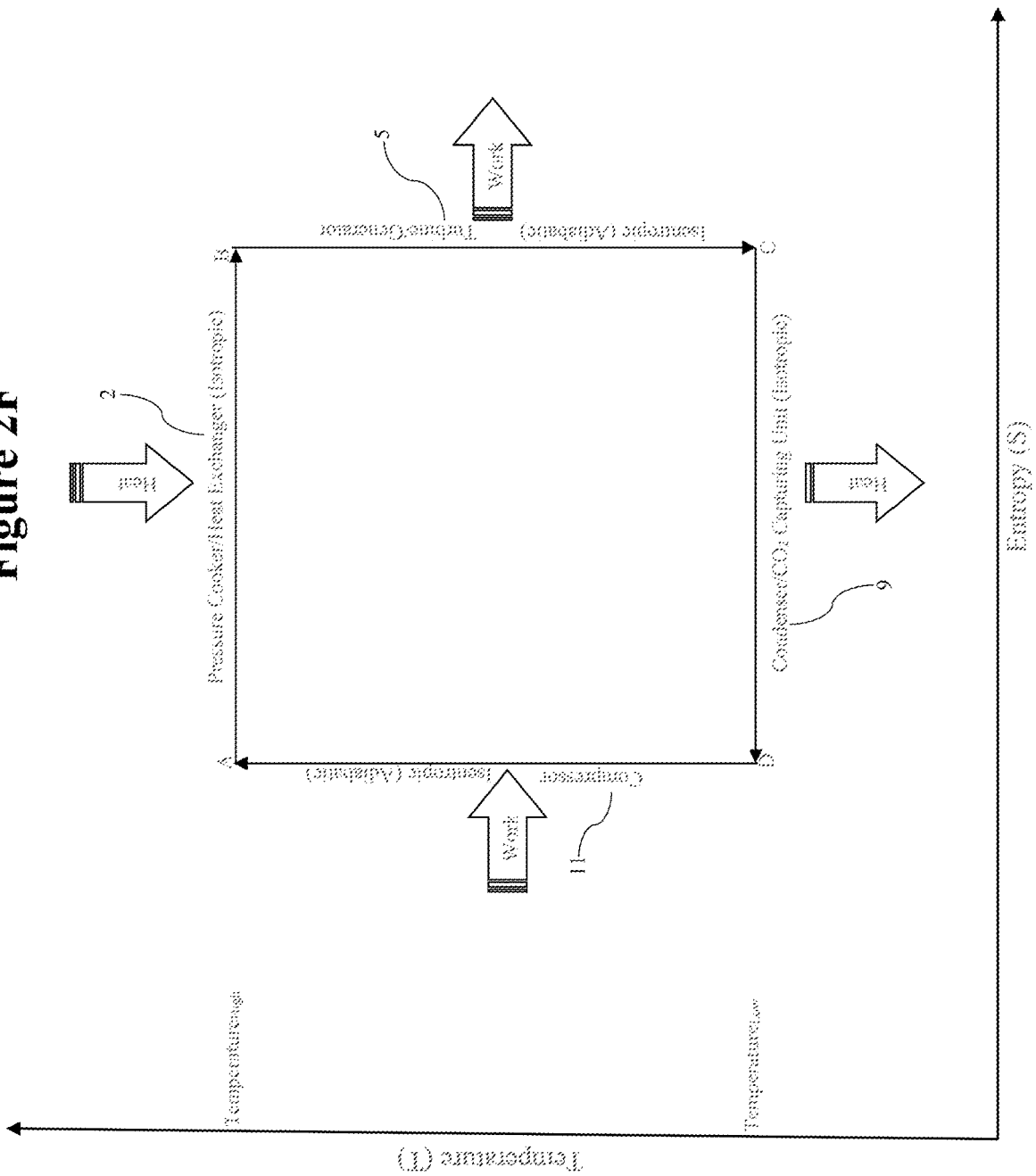

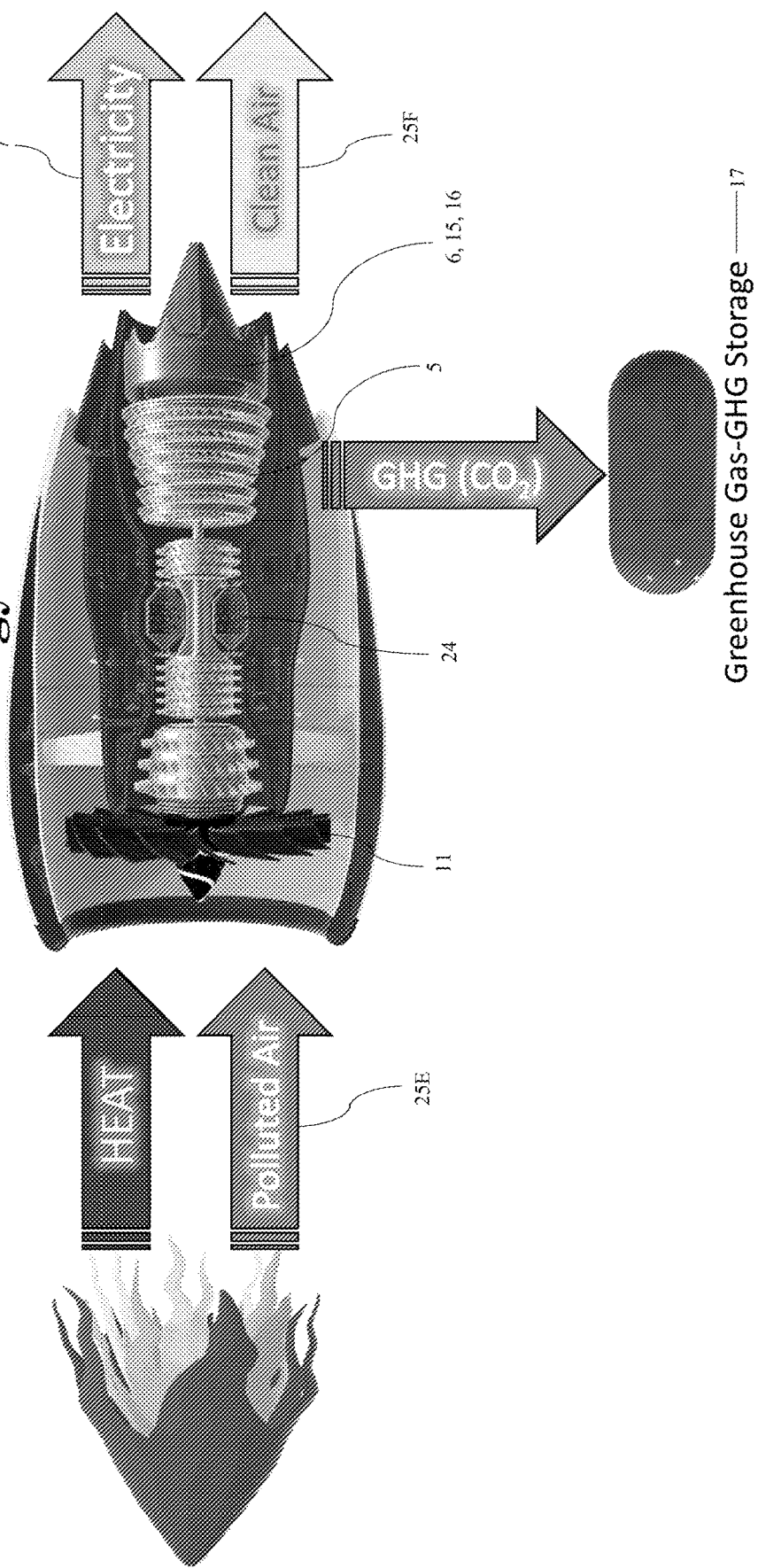

Figure 5D

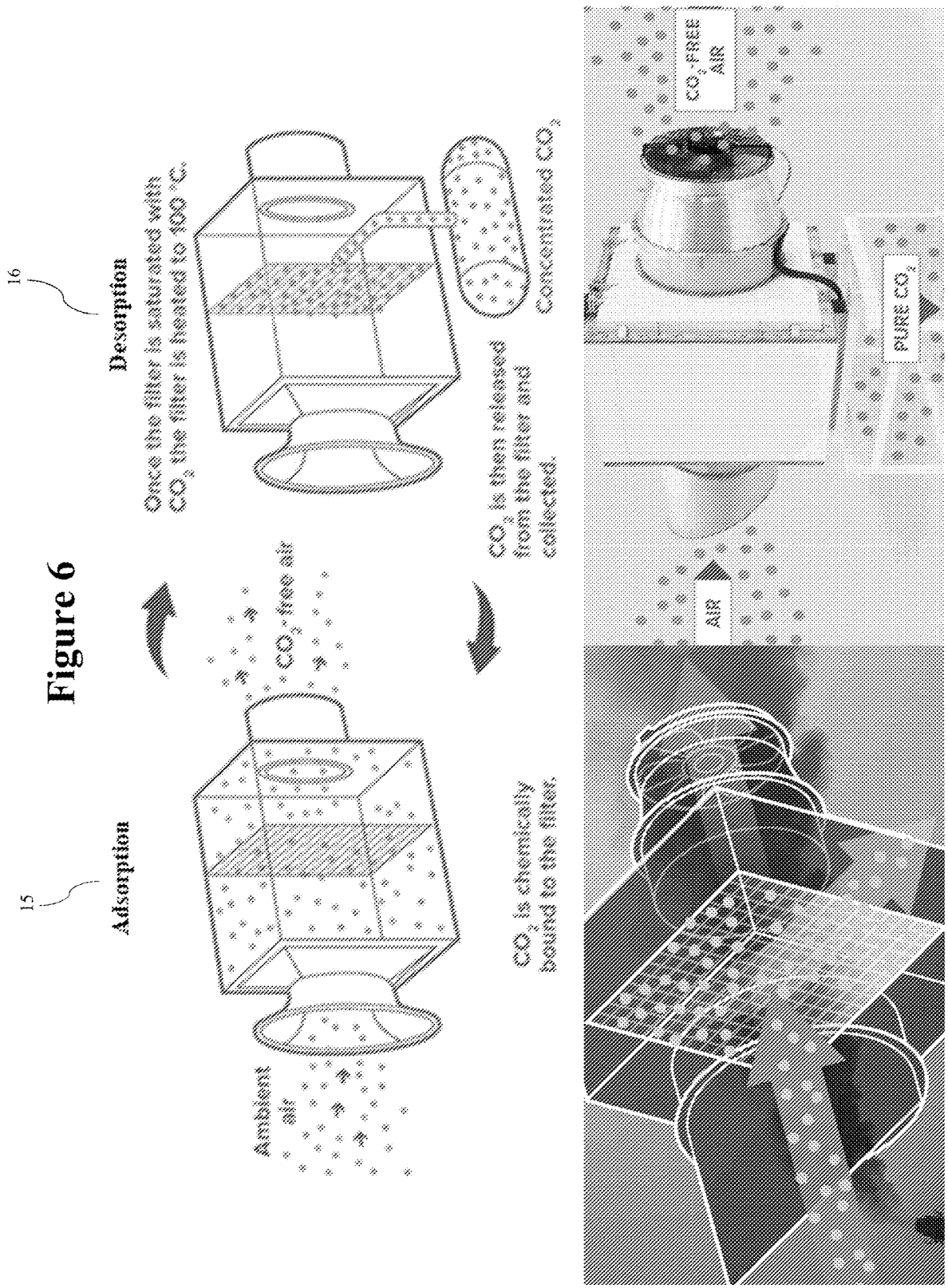

INTEGRATED GREEN ENERGY AND SELECTIVE MOLECULAR SEPARATION SYSTEM, AND PROCESS OF GENERATING ELECTRICITY AND SELECTIVELY SEPARATING AND CAPTURING PREDETERMINED MOLECULES PRESENT IN SURROUNDING ENVIRONMENT (GREEN ENERGY BLUE)

CROSS REFERENCE TO RELATED APPLICATIONS

This application is a non-provisional application that claims priority to U.S. Provisional Application No. 63/278,316, filed on Nov. 11, 2021 and U.S. Provisional Application No. 63/284,354, filed on Nov. 30, 2021. The disclosures of the prior applications are hereby incorporated by reference herein in their entireties.

TECHNICAL FIELD

The present disclosure relates to green energy generation processes and systems, such as thermal, solar, wind, and kinetic energy processes and systems, which generate electricity. The present disclosure also relates to selective molecular separation (e.g., greenhouse gas capturing) processes and systems that separate and capture predetermined molecules, such as greenhouse gas (carbon dioxide ($CO_2$)), carbon monoxide (CO), and nitrogen oxides ($NO_X$), from the surrounding environment. In particular, the present disclosure relates to a green energy generating system that is integrated with a selective molecular separation (e.g., greenhouse gas capturing) system such that the output of each system is utilized by the other to form a unitary system that produces green energy (i.e., electricity) while also separating and capturing predetermined molecules (e.g., greenhouse gases) from the surrounding environment. The present disclosure further relates to processes of integrating green energy generation with selectively separating and capturing predetermined molecules present in a surrounding environment.

BACKGROUND

Known green energy systems include thermal (e.g., geothermal) energy systems, solar energy systems, and wind energy systems (such as wind farms), that utilize a naturally occurring energy source to generate electricity. Geothermal energy systems extract heat from an underground geologic formation, such as a hot rock reservoir. In a typical geothermal energy system, a fluid is pumped down into an underground rock formation to transfer thermal energy of the rock formation to the surface. At the surface, the heated fluid is utilized in a process that drives a turbine and an electrical generator to produce electrical power, and then the fluid is pumped back into the underground formation to repeat the cycle. Solar energy systems convert sunlight energy into electrical energy either through photovoltaic (PV) panels or through lenses or mirrors that concentrate solar radiation. When the sun shines onto a solar panel, energy from the sunlight is absorbed by the PV cells in the panel. This energy creates electrical charges that move in response to an internal electrical field in the cell, causing electricity to flow. Lenses or mirrors concentrate solar radiation so that photons in the concentrated radiation raise the temperature of a primary fluid (e.g., molten salt), which is used in a process that eventually heats a secondary fluid to drive a turbine and an electrical generator to produce electrical power. In wind energy systems, wind turns the propeller-like blades of a turbine around a rotor, which spins the shaft of an electrical generator to produce electricity.

Greenhouse gas capturing systems may include devices/equipment and chemical materials for removing greenhouse gases (carbon dioxide ($CO_2$)), as well as carbon monoxide (CO), and nitrogen oxides ($NO_X$), or other harmful gases from the environment such as the air in the atmosphere that we breathe. Some systems involve chemical and/or physical mechanisms for removing some molecules (e.g. greenhouse gas) from the environment.

SUMMARY

While green energy systems and greenhouse gas capturing systems have been used to positively impact the Earth's environment by reducing pollution, the two systems have always been two independent and discrete systems or processes. Green energy systems and greenhouse gas capturing systems have not been considered in combination, i.e., as one integrated system or process.

The present disclosure describes different types of energy systems, such as thermal, solar, wind, combustion, and kinetic energy systems, that can be integrated with a selective molecular separation (e.g., greenhouse gas capturing) system. The energy system and the selective molecular separation system are integrated with each other because the output of each system is utilized by the other to form a unitary system that produces green energy (i.e., electricity) while also separating and capturing predetermined molecules (e.g., greenhouse gas) from the surrounding environment. The present disclosure further describes different green energy processes, such as thermal, solar, wind, and kinetic energy systems, that can be integrated with a selective molecular separation (e.g., greenhouse gas capturing) process to form one unitary process that produces green energy (i.e., electricity) while separating and capturing predetermined molecules (e.g., greenhouse gases) from the surrounding environment. In some embodiments, a kinetic energy fluid turns a blade that rotates a shaft connected to an electrical generator. The rotating shaft produces electromagnetic induction in the electrical generator to produce electricity. The kinetic energy fluid can be subsequently directed to and integrated with a regeneration/desorption process in the selective molecular separation unit where thermal energy of the kinetic energy fluid is exchanged to break hands between separated predetermined molecules and a sorbent and/or molecular sieve membrane in order to be captured and stored. In other embodiments, heat from arm electrical heater associated with the selective molecular separation unit and powered by the electricity from the electrical generator is used to break the bonds between separated predetermined molecules and the sorbent and/or molecular sieve membrane. The present disclosure thus provides an integrated green energy and selective molecular separation system and process ("Green Energy Blue") that is an improvement over known systems and processes for generating green energy, and over known systems and processes for capturing greenhouse gases.

In an embodiment, a process of generating electricity and selectively separating and capturing predetermined molecules present in a surrounding environment comprises: providing kinetic energy fluid derived from an energy source; driving a turbine by rotating a shaft of the turbine via the kinetic energy fluid; driving a generator via rotation of the shaft of the turbine to generate electricity by electromagnetic induction; supplying at least one of (i) the kinetic energy fluid exiting the turbine and (ii) electricity generated by the generator to a selective molecular separation unit; intaking the predetermined molecules into the selective molecular separation unit and selectively separating at least one predetermined molecule from other molecules of the surrounding environment; and capturing the at least one predetermined molecule via a desorption process of the at least one predetermined molecule in the selective molecular separation unit using heat from thermal energy of at least one of (i) the kinetic energy fluid and (ii) an electrical heater powered by the electricity generated by the generator.

In an embodiment, the at least one predetermined molecule is selectively separated via at least one of a sorption process and a molecular sieve membrane in the selective molecular separation unit.

In an embodiment, the desorption process regenerates at least one of a sorbent material used in the sorption process and the molecular sieve membrane.

In an embodiment, the thermal energy is sufficient to break a bond between the separated predetermined molecule and at least one of the sorbent material and the molecular sieve membrane to regenerate the at least one of the sorbent material and the molecular sieve membrane for a next cycle of selective separation of another predetermined molecule of the surrounding environment.

In an embodiment, the sorption process utilizes at least one of an absorption process and adsorption process.

In an embodiment, the sorbent material is impregnated or grafted in the molecular sieve membrane.

In an embodiment, the process further comprising storing the at least one predetermined molecule in a storage unit after the capturing.

In an embodiment, the turbine is a windmill.

In an embodiment, the energy source is at least one of: a combustion process which produces the kinetic energy fluid; a burning process which produces the kinetic energy fluid; and the surrounding environment including wind which produces the kinetic energy fluid.

In an embodiment, the combustion process occurs in one of an engine and a gas turbine.

In an embodiment, the burning process occurs in one of a flare, a water heater and a furnace.

In an embodiment, the heat is generated via at least one of: (i) one or more of a Rankine Cycle; a Carnot Cycle; a Brayton Cycle; a Diesel Engine Cycle, an Otto Cycle; an Ericsson Cycle; a Hygroscopic Cycle; a Scuderi Cycle; a Stirling Cycle; a Manson Cycle; a Stoddard Cycle; an Atkinson Cycle; a Humphrey Cycle; a Bell Coleman Cycle and a Lenoir Cycle; and (ii) the electrical heater powered by the generator in combination with the one or more Cycles in (i).

In an embodiment, the kinetic energy fluid is at least one of in a supercritical state; and has an increased flow rate when driving the turbine.

In another embodiment, an integrated green energy and selective molecular separation system comprises: an energy source that provides thermal energy to heat a working fluid to produce a heated working fluid; a turbine that is driven by the heated working fluid; a generator that is driven by the turbine to generate electricity by electromagnetic induction; and a selective molecular separation unit that intakes predetermined molecules present in a surrounding environment and receives at least one of (i) the heated working fluid exiting the turbine and (ii) electricity generated by the generator, wherein the selective molecular separation unit selectively separates at least one predetermined molecule from other molecules of the surrounding environment and captures the at least one predetermined molecule via a desorption process using heat from thermal energy of at least one of (i) the heated working fluid and (ii) an electrical heater that is associated with the selective molecular separation unit and that is powered by the electricity generated by the generator.

In an embodiment, the selective molecular separation unit comprises at least one of a sorbent material and a molecular sieve membrane that selectively separates the at least one predetermined molecule of the surrounding environment.

In an embodiment, heat transferred from the thermal energy regenerates at least one of the sorbent material and the molecular sieve membrane by breaking a bond between the separated at least one predetermined molecule and at least one of the sorbent material and the molecular sieve membrane for a next cycle of selective separation of another predetermined molecule of the surrounding environment.

In an embodiment, the sorbent material is at least one of an absorbent material and adsorbent material.

In an embodiment, the sorbent material is impregnated or grafted in the molecular sieve membrane.

In an embodiment, the system further comprises a storage unit that stores the at least one predetermined molecule after the at least one predetermined molecule is captured.

In an embodiment, the heat is generated via at least one of: (i) one or more of: a Rankine Cycle; a Carnot Cycle; an Ericsson Cycle; a Hygroscopic Cycle; a Scuderi Cycle; a Stirling Cycle; a Manson Cycle; and a Stoddard Cycle; and (ii) the electrical heater powered by the generator in combination with the one or more Cycles in (i).

In an embodiment, the selective molecular separation unit further comprising a condenser that extracts heat from the heated working fluid exiting the turbine to desorb the separated at least one predetermined molecule and regenerate at least one of the sorbent material and the molecular sieve membrane, and wherein the condenser reduces a temperature of the heated working fluid to produce a reduced-temperature working fluid.

In an embodiment, the system further comprises: a compressor that receives the reduced-temperature working fluid from the condenser and increases a pressure of the reduced-temperature working fluid to produce an increased-pressure, reduced-temperature working fluid, and conveys the increased-pressure, reduced-temperature working fluid to a heat exchanger that also receives the thermal energy from the energy source, wherein the heat exchanger transfers the thermal energy from the energy source to the increased-pressure, reduced-temperature working fluid to increase a temperature of the increased-pressure, reduced-temperature working fluid to produce the heated working fluid having increased pressure and increased temperature.

In an embodiment, the system further comprises: one of an expansion valve and a nozzle to increase a velocity of the heated working fluid before the heated working fluid enters the turbine.

In an embodiment, the energy source is one of: an underground geothermal energy source comprising a primary fluid that transfers heat to the heated working fluid to increase kinetic energy of the heated working fluid; a thermal energy source including one of a flare and an exhaust flue gas comprising a primary fluid that transfers heat to the heated working fluid to increase kinetic energy of the heated working fluid; and a solar energy source that raises the temperature of a primary fluid that transfers heat to the heated working fluid to increase kinetic energy of the heated working fluid.

In a further embodiment, an integrated green energy and selective molecular separation system comprises: an energy source that provides kinetic energy fluid; a turbine comprising a shaft that is driven by the kinetic energy fluid; a generator that is driven via rotation of the shaft of the turbine to generate electricity by electromagnetic induction; a selective molecular separation unit that intakes predetermined molecules present in a surrounding environment and receives at least one of (i) the kinetic energy fluid exiting the turbine and (ii) electricity generated by the generator, wherein the selective molecular separation unit selectively separates at least one predetermined molecule from other molecules of the surrounding environment and captures the at least one predetermined molecule via a desorption process using heat from thermal energy of at least one of (i) the kinetic energy fluid and (ii) an electrical heater that is associated with the selective molecular separation unit and that is powered by the electricity generated by the generator.

In an embodiment, the energy source is at least one of: a combustion process which produces the kinetic energy fluid; a burning process which produces the kinetic energy fluid; and the surrounding environment including wind which produces the kinetic energy fluid.

In an embodiment, the turbine is a windmill.

In an embodiment, the system further comprises at least one of: a compressor to increase a pressure of the kinetic energy fluid before the kinetic energy fluid enters the turbine; a combustor to increase a temperature of the kinetic energy fluid before the kinetic energy fluid enters the turbine; and a burner to increase a temperature of the kinetic energy fluid before the kinetic energy fluid enters the turbine.

In an embodiment, the selective molecular separation unit comprises at least one of a sorbent material and a molecular sieve membrane that selectively separates the at least one predetermined molecule of the surrounding environment.

In an embodiment, heat transferred from the thermal energy regenerates at least one of the sorbent material and the molecular sieve membrane by breaking a bond between the separated at least one predetermined molecule and at least gone of the sorbent material and the molecular sieve membrane for a next cycle of selective separation of another predetermined molecule of the surrounding environment.

In an embodiment, the system further comprises a heat exchanger to exchange the thermal energy from the kinetic energy fluid to at least one of the sorbent material and the molecular sieve membrane to regenerate and desorb the at least one predetermined molecule.

In an embodiment, the sorbent material is at least one of an absorbent material and adsorbent material.

In an embodiment, the sorbent material is impregnated or grafted in the molecular sieve membrane.

In an embodiment, the system further comprises a storage unit that stores the at least one predetermined molecule after the at least one predetermined molecule is captured.

In an embodiment, the heat is generated via at least one of: (i) one or more of: a Brayton Cycle; a Diesel Engine Cycle, a Otto Cycle; an Atkinson Cycle; a Humphrey Cycle; a Bell Coleman; and a Lenoir Cycle; and (ii) the electrical heater powered by the generator in combination with the one or more Cycles in (i).

In an embodiment, the turbine is a windmill.

In an embodiment, the energy source is at least one of: a combustor which produces the kinetic energy fluid; a burner which produces the kinetic energy fluid; and a windmill which produces the kinetic energy fluid.

In an embodiment, the combustor is one of an engine and a gas turbine.

In an embodiment, the burner is one of a flare, a water heater and a furnace.

BRIEF DESCRIPTION OF THE FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein.

FIG. 2A is an illustration of a Rankine Cycle that is implemented by an integrated green energy and selective molecular separation system, according to an embodiment.

FIG. 2F is another illustration of Carnot Cycle that can be implemented by an integrated green energy and selective molecular separation system, according to an embodiment.

FIG. 3K is an exemplary implementation of an integrated green energy and selective molecular separation system of FIG. 3C in a jet engine (i.e., Brayton Cycle), according to an embodiment.

FIG. 5D illustrates different types of molecular bonding in a desorption process that may occur in an integrated green energy and selective molecular separation system, according to an embodiment.

FIG. 6 illustrates an adsorption process using an adsorbent material/membrane and a desorption process of the adsorbent material/membrane that may occur in an integrated green energy and selective molecular separation system, according to an embodiment.

DETAILED DESCRIPTION

Figure 1A:
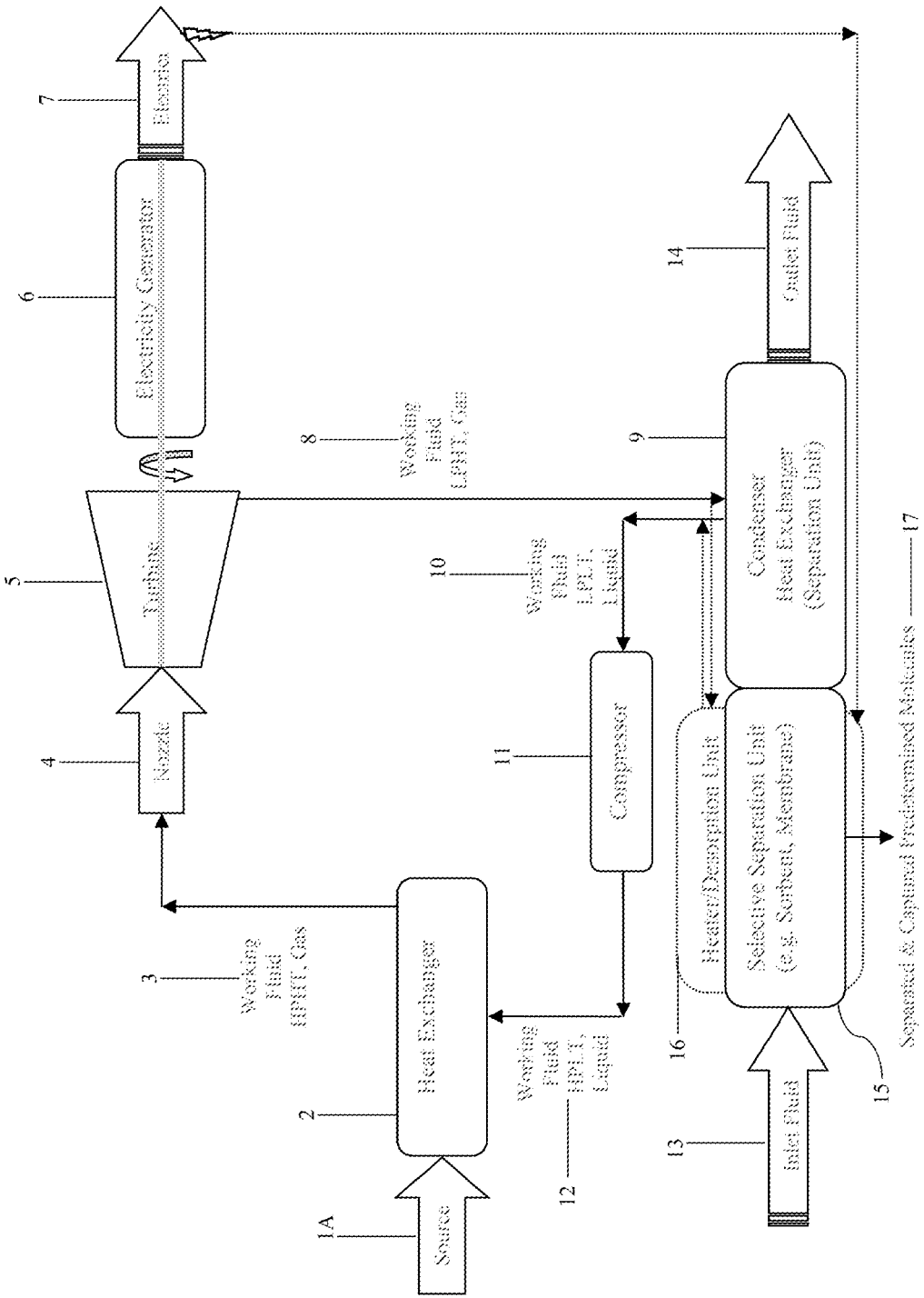
FIG. 1A is a schematic illustration of an integrated green energy and selective molecular separation system that uses thermal energy as the source of green energy, according to an embodiment.

While processes, systems and devices are described herein by way of examples and embodiments, those skilled in the art recognize the processes, systems and devices are not limited to the embodiments or drawings described. It should be understood that the drawings and description are not intended to be limited to the particular form disclosed. Rather, the intention is to cover all modifications, equivalents and alternatives falling within the spirit and scope of the appended claims and description. Any headings used herein are for organization purposes only and are not meant to limit the scope of the description of the claims. As used herein, the word "may" is used in a permissive sense (i.e., meaning having the potential to) rather than the mandatory sense (i.e., meaning must). Similarly, the words "include," "including," and "includes" mean including, but not limited to. The present disclosure describes particular embodiments and with reference to certain drawings, but the subject matter is not limited thereto.

The present disclosure will provide description to the accompanying drawings, in which some, but not all embodiments of the subject matter of the disclosure are shown. Indeed, the subject matter may be embodied in many different forms and should not be construed as limited to the embodiments set forth herein, rather, these embodiments are provided so that this disclosure satisfies all the legal requirements. The disclosure herein is illustrative and explanatory of one or more embodiments and variations thereof, and it will be appreciated that various changes in the design, organization, means of operation, structures and location, methodology, and use of mechanical equivalents may be made without departing from the spirit of the invention. Because many varying and different embodiments may be made within the scope of the concept(s) herein taught, and because many modifications may be made in the embodiments described herein, it is to be understood that the details herein are to be interpreted as illustrative and non-limiting.

Certain terminology is used in the following description for convenience only and is not limiting. Certain words used herein designate directions in the drawings to which reference is made. Unless specifically set forth herein, the terms "a," "an" and "the" are not limited to one element, but instead should be read consistent with the meaning of "one or more," "at least one," and "one or more than one." As used herein "another" means at least a second or more. The terminology includes the words noted above, derivatives thereof and words of similar import.

Use of the term "about", when used with a numerical value, is intended to include +/−10%. For example, if a number of amino acids is identified as about 200, this would include 180 to 220 (plus or minus 10%). Similarly, use of the term "approximately", when used with a numerical value, is intended to include +/−10%. For example, if a number of amino acids is identified as approximately 200, this would include 180 to 220 (plus or minus 10%).

Unless otherwise defined, all technical and scientific terms used herein have the same meaning as commonly understood by one of ordinary skill in the art.

FIG. 1A illustrates one embodiment of an integrated green energy and selective molecular separation system ("Green Energy Blue") that uses thermal energy as the source 1A of green energy. In the green energy portion of this system, at least some portion of thermal energy from the source 1A is transferred as heat to a working fluid 3 by heat exchange. That is, the working fluid 3 absorbs heat from the thermal energy of the source 1A. In the present disclosure, a thermal energy source can be any source of enemy that transfers thermal energy (i.e., heat) to raise the thermal energy and/or temperature of the working fluid 3. The transferred heat from the thermal source can subsequently elevate the kinetic energy of the working fluid 3. The heated working fluid 3 may have a relatively high temperature and pressure. The thermal energy may be derived from the motion and vibration of molecules of the energy source 1A. Thermal energy sources may include, but are not limited to: geothermal energy sources, such as wells and reservoirs in underground geologic formations; solar energy sources, such as radiation from the sun; burners, such as gas flares resulting from the burning process of natural gas associated with oil extraction; exhaust emitted from an engine; heat conducted from oil and gas pipelines; combustion occurring in an engine or a gas turbine; and commercial and residential heaters, such as water heaters, furnaces, ovens and stoves (i.e., "burners" that derive heat from a flame). The burning processes herein may also produce a kinetic energy fluid.

The green energy portion of the integrated system shown in FIG. 1A includes a heat exchanger 2 in which the thermal energy of the energy source 1A is transferred to the working fluid 3. In the present disclosure, a heat exchanger can be any mechanical device that exchanges heat between a higher thermal energy source and a lower thermal energy working fluid. In FIG. 1A, the thermal energy (heat) is transferred to the working fluid 3 in the heat exchanger 2. The energy source 1A in the embodiment of FIG. 1A may be one or more of: gas flares resulting from the burning process of natural gas associated with oil extraction; exhaust emitted from an engine; heat conducting from oil and gas pipelines; combustion occurring in an engine or a gas turbine; and commercial and residential heaters, such us water heaters, furnaces, ovens and stoves (i.e., "burners" that derive heat from a flame). However, other thermal energy sources, such as the geothermal and solar energy sources discussed above, could also be used in the FIG. 1A embodiment. Upon absorbing the thermal energy (heat) in the heat exchanger 2, the working fluid 3 may increase its temperature, volume and pressure, and thus its enthalpy, and may change its phase state from a liquid to a gas/vapor. The structure of the heat exchanger 2 is not limited in the present disclosure to any particular design or configuration, so long as the heat exchanger 2 is operable to transfer heat from the thermal energy source to the working fluid. As examples, the heat exchanger 2 may be a finned tube heat exchanger, a shell and tube heat exchanger, or a plate heat exchanger. Other types of heat exchangers not listed here that may be used to transfer heat to the working fluid 3 are within the scope of this invention. The heated working fluid 3 is then directed from the heat exchanger 2 towards a turbine 5. In some instances, the heated working fluid 3 may be considered as a kinetic energy fluid by virtue of its molecular movement to drive the turbine 5.

In the embodiment shown in FIG. 1A, a nozzle 4 is provided between the heat exchanger 2 and the turbine 5, so that the high pressure and temperature working fluid 3 passes through the nozzle 4 before entering the turbine 5. In other embodiments, the nozzle 4 may not be required, and may be omitted from the green energy portion of the integrated system. In such a case, a high pressure and temperature working fluid 3 flows directly from the heat exchanger 2 into the turbine 5. In the integrated system of FIG. 1A, the nozzle 4 provides a restriction in the path of the heated working fluid 3 in order to transfer some of the pressure of the heated working fluid 3 to velocity, and thus expand the volume of the heated working fluid 3. The nozzle 4 may be a fixed restriction in the path of the heated working fluid 3, or may be an adjustable expansion valve that can be controlled, e.g., electronically or manually, to adjust the size of the restriction based on system conditions, a desired temperature and/or pressure of the heated working fluid 3, or other considerations. As the heated working fluid 3, preferably in the supercritical gas state/phase, enters the turbine 5, its kinetic energy will move a series of blades mounted on a shaft of the turbine 5. The force turns the blades, which rotates the shaft to drive the turbine 5. In the present disclosure, a turbine is any mechanical device that performs work by using kinetic energy of a working fluid. Two main factors for having a significant amount of kinetic energy entering the turbine 5 can be a supercriticality state of the working fluid 3, as well as the flow rate of the working fluid 3. The working fluid 3 with high supercriticality will have higher kinetic energy, and thus and create more work. A higher flowrate of the working fluid 3 will also create more work due to its higher magnitude coming out of the nozzle 4. More work has the potential to eventually generate more electricity, and capture more predetermined molecules in a selective separation unit 9, 15, 16 oldie integrated system.

The turbine 5, in turn, drives an electricity generator 6 to generate electricity 7 via electromagnetic induction. In the present disclosure, electricity generator 6 is any mechanical/electrical device that changes kinetic energy to electrical energy. In one embodiment, the electricity generator 6 includes a rotor that is connected to shaft of the turbine 5 so as to rotate with rotation of the shaft. The rotor of the electricity generator 6 may include a coil of copper wire (armature) that rotates in response to rotation of the shaft of the turbine 5. Two polar field magnets on either side of the armature create a magnetic field inside the in the electricity generator 6. As the rotor, shaft, and armature rotate, they move within the electric field created by the magnets. As the turbine 5 rotates the armature through the magnetic field, an electrical current is created within the copper coil of the armature. This process of generating electrical current is known as electromagnetic induction. The electricity 7 produced can be extracted from the electricity generator 6, and may be sent to an electrical grid for commercial distribution and use. In this regard, the frequency of the electricity 7 from the electricity generator 6 can be adjusted to the grid-line frequency of the grid to synchronize the transmission. The electricity 7 produced by the electricity generator 6 can also be directly fed to a desorption unit 16 in the selective molecular separation unit 9, 15, 16 of the integrated system as discussed in further detail below. Further, the heated working fluid 8 exiting the turbine 5 after driving the turbine 5 (which is a low pressure, high temperature working fluid 8) is conveyed to a condenser/heat exchanger 9 in the selective molecular separation unit 9, 15, 16 of the integrated system as discussed in detail below.

Figure 4:
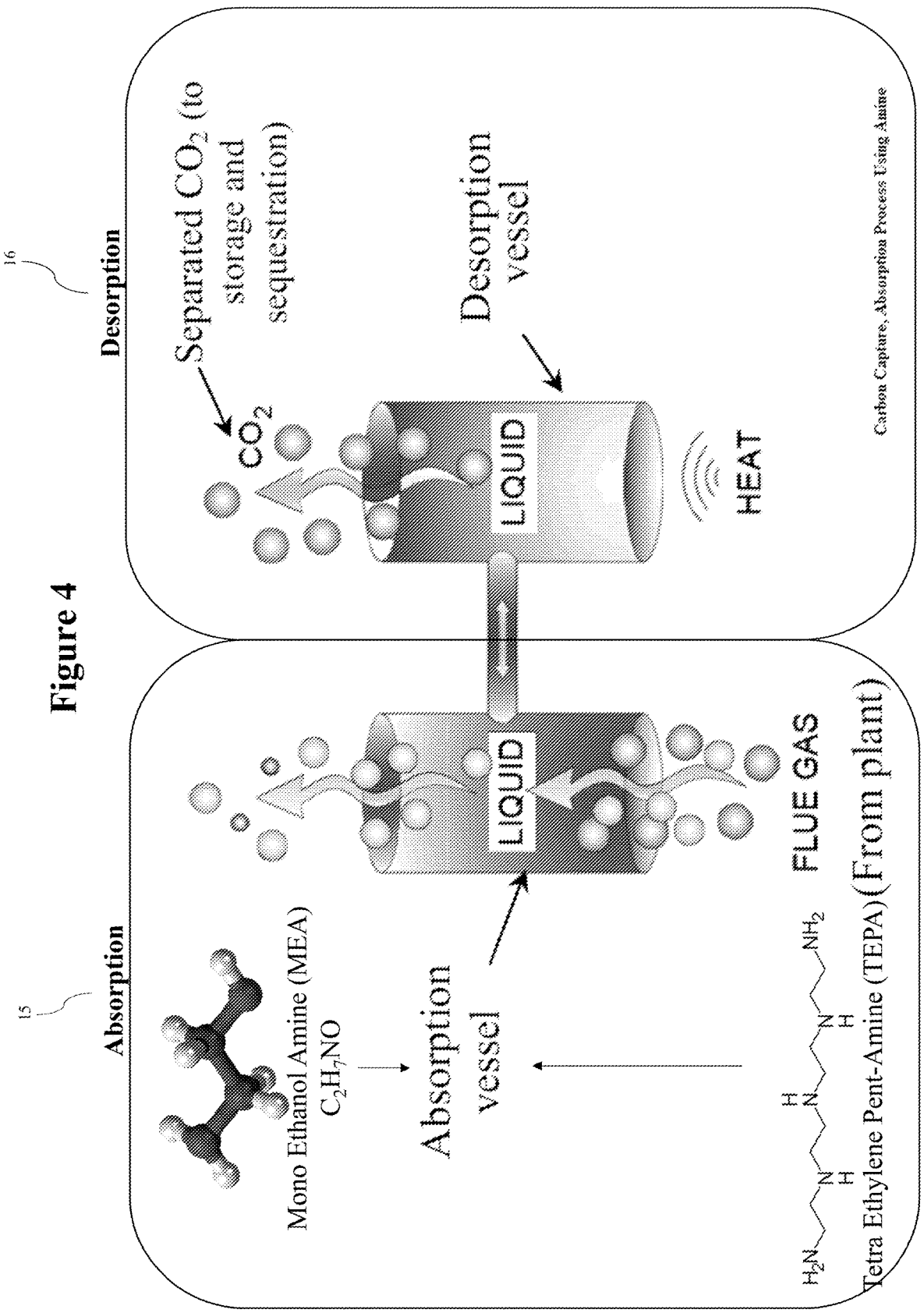
FIG. 4 is a schematic illustration of an absorption and a desorption process that may occur in an integrated green energy and selective molecular separation system, according to an embodiment.

As shown in FIG. 1A, the selective molecular separation unit 9, 15, 16 of the integrated system receives an inlet fluid 13 from the surrounding environment. The surrounding environment may be the atmosphere of the earth, such that the inlet fluid 13 is air. The air may be polluted with greenhouse gas (carbon dioxide ($CO_2$)), carbon monoxide (CO), and nitrogen oxides ($NO_X$). Other harmful gases not listed here may also be present in the air. The inlet fluid 13 may be received in the selective molecular separation unit 9, 15, 16 via an opening, a fan 18 (see FIG. 1B), a vacuum, a pressure difference, or other similar device or process for intaking the inlet fluid 13 and moving the inlet fluid 13 through the selective molecular separation unit 9, 15, 16. The selective molecular separation unit 9, 15, 16 includes a separation portion 15 in which one or more predetermined molecules of the greenhouse gases in the inlet fluid 13 are selectively separated from other molecules of the surrounding environment. The separation may be carried out in the separation portion 15 via a sorption process and/or a molecular sieve membrane. The sorption process utilizes an absorption process and/or an adsorption process. In the absorption process, one or more vessels may contain a liquid absorbent material such as, for example, ethanol amine, mono ethanol amine (MEA), Di ethanol amine (DEA), Methyl Di ethanol amine (MDEA) and tetra ethylene pentamine (TEPA). Other liquid absorbent materials not listed here are encompassed within the scope of the present disclosure. The inlet fluid 13 containing the greenhouse gases is passed through the liquid absorbent in the vessels (see FIG. 4) at which the predetermined molecules, such as carbon dioxide ($CO_2$), are absorbed by the liquid absorbent in a chemical process. Absorption of the predetermined molecules, such as carbon dioxide ($CO_2$), carbon monoxide (CO), and nitrogen oxides ($NO_X$) by the liquid absorbent separates the predetermined molecules from other molecules of the inlet fluid 13. The other molecules, such as oxygen ($O_2$) and nitrogen ($N_2$), which have been separated from the predetermined molecules in the inlet fluid 13 and which do not constituted greenhouse gases may exit the vessels in the separation portion 15 and flow through the condenser/heat exchanger 9 of the selective molecular separation unit 9, 15, 16 to be released as outlet fluid 14 into the surrounding environment. Meanwhile, the liquid absorbent material containing the predetermined molecules, such as carbon dioxide ($CO_2$), carbon monoxide (CO), and nitrogen oxides ($NO_X$), subsequently undergoes a desorption process, discussed below, in the same or another vessel as shown in FIG. 4 via heat from the green energy portion of the integrated system.

The adsorption process utilizes solid adsorbent material to adsorb the predetermined molecules (e.g., carbon dioxide ($CO_2$), carbon monoxide (CO), and nitrogen oxides ($NO_X$)) of the inlet fluid 13 to a surface of the absorbent material via molecular bonding. The solid adsorbent material may be one or more of: Zeolite, Layered double hydroxide (LDH), Silica, Metal organic framework (MOF), Activated carbon, Activated carbon fibers (ACF), DOF, Alkali-metal-based materials, ordered porous carbon, Graphene, Carbon molecular sieves (CMS), and combinations thereof (see FIG. 5A). Other solid adsorbent materials not listed here are encompassed within the scope of the present disclosure. Adsorption of the predetermined molecules, such as carbon dioxide ($CO_2$), carbon monoxide (CO), and nitrogen oxides ($NO_X$) by the solid adsorbent separates the predetermined molecules from other molecules of the inlet fluid 13 which are not adsorbed by the solid adsorbent. The other molecules, such as oxygen ($O_2$) and nitrogen ($N_2$), which have been separated from the predetermined molecules in the inlet fluid 13 and which do not constituted greenhouse gases may exit the separation portion 15 and flow through the condenser/heat exchanger 9 of the selective molecular separation unit 9, 15, 16 and be released as outlet fluid 14 back into the surrounding environment. In order to enhance the sorption process, the solid adsorbent material may be impregnated with one or more liquid absorbent materials. The porous nature of Zeolite beneficially increases the surface area of this adsorbent material, providing more area to adsorb the predetermined molecules. Results of a study in the following table show that each cubic centimeter of Zeolite has enough pores to adsorb approximately 0.31 grams of carbon dioxide ($CO_2$).

TABLE 1

| Capacity of 1 $cm^3$ Zeolite to Adsorb carbon dioxide ($CO_2$) | | | |
| --- | --- | --- | --- |
| Inlet Fluid Flow Rate in Gallons per Minute (GPM) | Approximate Amount of Zeolite that is Fully Regenerated ($m^3$) | Potential Amount of $CO_2$ Captured (kg) | Potential Annual $CO_2$ Captured (Tons) |
| 5 | 0.172824 | 53.575 | 28.159 |
| 10 | 0.345648 | 107.151 | 56,318.565 |
| 50 | 1.72824 | 535.754 | 281,502.303 |
| 100 | 3.45648 | 1,071.51 | 563,185.656 |
| 200 | 6.91296 | 2,143.017 | 1,173,301.808 |

In an embodiment in which a molecular sieve membrane is used in the sorption process, the inlet fluid 13 may pass through a membrane or a set of membranes that act as filters to physically separate larger molecules from smaller molecules in the inlet fluid 13. For example, the sieve membrane(s) may physically separate larger oxygen ($O_2$) and nitrogen ($N_2$) molecules from a smaller carbon dioxide ($CO_2$) molecule. That is, the molecular sieve membrane or a set of molecular sieve membranes may have microscopic apertures that are sized to allow only the smaller carbon dioxide ($CO_2$) molecule to pass through, while the larger oxygen ($O_2$) and nitrogen ($N_2$) molecules are deflected and subsequently be directed to an outlet of the selective molecular separation unit 9, 15, 16 as outlet fluid 14, and released back into the atmosphere (surrounding environment). The smaller carbon dioxide ($CO_2$) molecule may then pass through one or more additional molecular sieve membranes or sorption processes in the separation portion 15 for further separation. In order to enhance the separation (filtration) process, one of the sorbent materials discussed above impregnated or grafted in the molecular sieve membrane(s). In such a case, the impregnated or grafted in the molecular sieve membrane(s) can be subjected to the desorption process discussed below.

After the predetermined molecules of the greenhouse gases in the inlet fluid 13 are selectively separated according to any of the sorption and/or (impregnated/grafted in) molecular sieve membrane embodiments discussed above, the separated predetermined molecules are captured from the sorbent material and/or impregnated/grafted in molecular sieve membrane(s) via a desorption/regeneration process in a desorption unit 16 of the selective molecular separation unit 9, 15, 16. The desorption process uses thermal energy to break a bond between the separated predetermined molecule (e.g., carbon dioxide ($CO_2$), carbon monoxide (CO), and nitrogen oxides ($NO_X$)) and the sorbent material (e.g., absorbent, adsorbent material) and/or the impregnated molecular sieve membrane(s). For instance, a solid adsorbent material (e.g., Zeolite) and a liquid absorbent material (e.g., MEA) may require a temperature of, e.g., 80-110 degrees Celsius to release carbon dioxide ($CO_2$) as a gas from the material. In the embodiment illustrated in FIG. 1A, the thermal energy used in the desorption process comes from the green energy portion of the integrated system via either thermal energy of the working fluid 8 or/and generated electricity 7 by electrical generator 6. FIG. 4 shows an embodiment in which heat from the green energy portion of the integrated system is used to capture the predetermined molecules, such as carbon dioxide ($CO_2$), carbon monoxide (CO), and nitrogen oxides ($NO_x$) contained in the liquid absorbent material. The liquid absorbent material may be desorbed in the same vessel used in the absorption process, or may be transferred to another vessel for the desorption process as shown in FIG. 4.

As discussed above, the selective molecular separation unit 9, 15, 16 receives one or both of: the heated working fluid 8 exiting the turbine 5 and the electricity 7 produced by the electricity generator 6. The heated working fluid 8 exiting the turbine 5 may be in a superheated gas/vapor state. In this state, the fluid may have a decreased pressure, but a still relatively high temperature. This low pressure, high temperature working fluid 8 is received at the condenser/heat exchanger 9 which exchanges the heat of the high temperature gas/vapor working fluid 8 with the ambient temperature of the air in the desorption unit 16. This exchange causes the superheated gas/vapor working fluid 8 to cool while the heat is conveyed to one or more vessels, adsorbent materials, or molecular sieve membrane(s) depending on which of these processes is being used in the desorption unit 16 of the selective molecular separation unit 9, 15, 16 for selectively separating the predetermined molecules. The heat breaks the bond(s) between the separated predetermined molecule(s) (e.g., carbon dioxide ($CO_2$), carbon monoxide (CO), and nitrogen oxides ($NO_x$)) and the sorbent material (e.g., absorbent, adsorbent material) and/or the molecular sieve membrane(s) so that the separated predetermined molecule(s) are released from the sorbent material and/or the molecular sieve membrane(s). The released predetermined molecule(s) (e.g., carbon dioxide ($CO_2$), carbon monoxide (CO), and nitrogen oxides ($NO_x$)) may subsequently be captured, stored and/or sequestered. The carbon dioxide ($CO_2$) molecules may be conveyed from the desorption unit 16 for storage 17 in a storage tank (not shown), or may be transported for later processing and/or use in the fields of, e.g., refrigerants, fire extinguishers, inflatable devices, blasting coal, foaming rubber and plastics, growth of plants in greenhouses, and carbonated beverages. Releasing the separated predetermined molecule(s) from the sorbent material and/or the molecular sieve membrane(s) in the desorption process regenerates the sorbent material and/or the molecular sieve membrane(s) so that the sorbent material and/or the molecular sieve membrane(s) are free of the separated predetermined molecule(s), and able to be reused in a next cycle of selective separation of additional predetermined molecules coming into the separation portion 15 as new inlet fluid 13 from the surrounding environment. In this way, the green energy portion of the system may continuously regenerate and recycle the materials used for desorption, thus improving the efficiency and life of the separation portion 15 and desorption unit 16.

In addition or in the alternative to the heated working fluid 8 used in the desorption process, the desorption unit 16 may include an electrical heater that is powered by the electricity 7 generated by the electricity generator 6. In the present disclosure, an electrical heater may operate based on convection, conduction, and/or radiation. Thermal energy from the electrical heater in the desorption unit 16 may provide the heat required to break the bond(s) between the separated predetermined molecule(s) (e.g., carbon dioxide ($CO_2$), carbon monoxide (CO), and nitrogen oxides ($NO_x$)) and the sorbent material (e.g., absorbent, adsorbent material) and/or the molecular sieve membrane(s) so that the separated predetermined molecule(s) are released from the sorbent material and/or the molecular sieve membrane(s), as discussed above. That is, the desorption unit 16 may use heat from one or both of: the heated working fluid 8 exiting the turbine 5; and the electrical heater powered by the electricity 7 from the electricity generator 6, in the desorption process discussed above.

In the above embodiments, the separation portion 15 and the desorption unit 16 may include one or more vessels for the sorption and desorption processes, respectively. The number of vessels is not limited in the present disclosure. When only one vessel is used, the sorption and desorption processes are implemented in an alternating sequential intervals. That is, the one vessel accommodates the sorption process in one time interval without heat in the desorption process, and in the next time interval is heated in the desorption process without accommodating the sorption process. The time intervals then repeat. Alternatively, the one vessel may undergo both the sorption and desorption process at the same time. In yet another embodiment, the separation portion 15 and the desorption unit 16 may include two or more vessels or a set of several vessels which alternate undergoing the sorption and desorption process. That is, one vessel may accommodate the sorption process while the other vessel undergoes the desorption process simultaneously. After a predetermined amount of time, the one vessel undergoes the desorption process while the other vessel accommodates the sorption process at the same time. In this manner, a continuous sorption and desorption process occurs in the separation portion 15 and the desorption unit 16. These processes of sorption and desorption can be done as a batch or continuous systems.

Similarly, the separation portion 15 and the desorption unit 16 may include one or more sorbents for the sorption and desorption processes. The number of sorbents is not limited in the present disclosure. When only one sorbent is used, the sorption and desorption processes are implemented in an alternating sequential intervals. That is, the one sorbent accommodates the sorption process in one time interval without heat in the desorption process, and in the next time interval is heated in the desorption process without accommodating the sorption process. The time intervals then repeat. Alternatively, the one sorbent may undergo both the sorption and desorption process at the same time. To yet another embodiment, the separation portion 15 and the desorption unit 16 may include two or more sorbents or a set of several sorbents which alternate undergoing the sorption and desorption process. That is, one sorbent may accommodate the sorption process while the other sorbent undergoes the desorption process. After a predetermined amount of time, the one sorbent undergoes the desorption process while the other sorbent accommodates the sorption process. In this manner, a continuous sorption and desorption process occurs in the separation portion 15 and the desorption unit 16. These processes of sorption and desorption can be done as a batch or continuous systems.

Furthermore, the separation portion 15 and the desorption unit 16 may include one or more molecular sieve membranes for the sorption and desorption processes. The number of molecular sieve membranes is not limited in the present disclosure. When only one molecular sieve membrane is used, the sorption and desorption processes are implemented in an alternating sequential intervals. That is, the one molecular sieve membrane accommodates the sorption process in one interval without heat in the desorption process, and in the next interval is heated in the desorption process without accommodating the sorption process. The intervals then repeat. Alternatively, the one molecular sieve membrane may undergo both the sorption and desorption process at the same time. In yet another embodiment, the separation portion 15 and the desorption unit 16 may include two or more molecular sieve membranes or a set of several molecular sieve membranes which alternate undergoing the sorption and desorption process. That is, one molecular sieve membrane may accommodate the sorption process while the other molecular sieve membrane undergoes the desorption process. After a predetermined amount of time, the one molecular sieve membrane undergoes the desorption process while the other molecular sieve membrane accommodates the sorption process. In this manner, a continuous sorption and desorption process occurs in the separation portion 15 and the desorption unit 16. These processes of sorption and desorption can be done as a batch or continuous systems.

As discussed above, the high temperature gas/vapor working fluid 8 is cooled by the condenser/heat exchanger 9. In the present disclosure, a condenser is any mechanical device that lowers temperature of a fluid. Thus, the low pressure, low temperature working fluid 10 exiting the condenser/heat exchanger 9 may have a decreased temperature along with the decreased pressure. The lower temperature of the working fluid 10 is beneficial in the green energy portion of the integrated system because a lower (cooler) temperature allows the heated working fluid 10 to absorb more heat from the thermal energy of the energy source 1A and thus increases the efficiency in reusing the heated working fluid in a cyclic thermodynamic process.

As is apparent from the foregoing, the green energy portion and the selective molecular separation unit 9, 15, 16 in the integrated system of FIG. 1A mutually benefit from each other by utilizing outputs from each other. The desorption unit 16 utilizes the heat provided by the green energy portion for the desorption process, while the heated working fluid 8 of the green energy portion is cooled by the condenser/heat exchanger 9 in the selective molecular separation unit 9, 15, 16 to maximize the heat absorption and efficiency of the heated working fluid 8 in the thermodynamic process. The green energy portion and the selective molecular separation unit 9, 15, 16 are thus integrated together in one unitary system.

The working fluid 10 exiting the condenser/heat exchanger 9 may have a decreased temperature and a decreased and may be in a gas and/or a liquid state, as discussed above. In this state the heated working fluid 10 may be conveyed back to the green energy portion of the integrated system to be first compressed and then reheated by the thermal energy of the energy source 1A and used again in the green energy process. In order to maximize heat absorption from the energy source 1A, the heated working fluid 10 conveyed from the condenser/heat exchanger 9 may pass through a compressor 11 to increase the pressure of the heated working fluid 10. In the present disclosure, a compressor is any mechanical device that elevates pressure of a fluid. The increase in pressure may produce the heated working fluid 12 leaving the compressor 11 in a liquid state with high pressure and low temperature. The high pressure, low temperature heated working fluid 12 is then conveyed back to the heat exchanger 2 to reabsorb heat provided by the thermal energy from the energy source 1A. The integrated green energy and selective molecular separation process described above may then be repeated in a repetitive, cyclic manner to both generate green energy (e.g., electricity) and selectively remove predetermined molecules (e.g., greenhouse gas (carbon dioxide ($CO_2$)), carbon monoxide (CO), and nitrogen oxides ($NO_X$)) from the surrounding environment (e.g., the atmosphere).

Figure 1B:
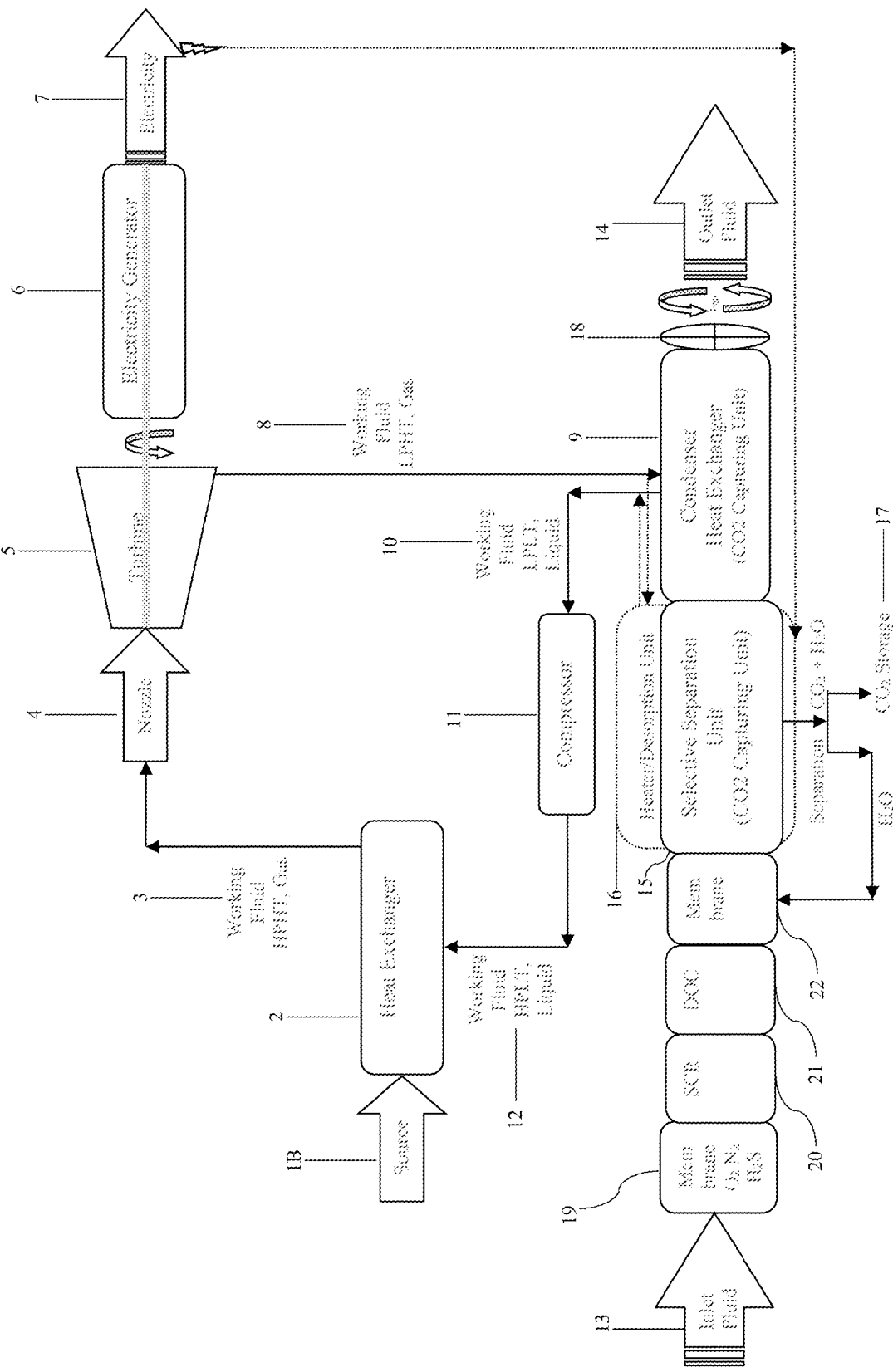
FIG. 1B is a schematic illustration of another embodiment of an integrated green energy and selective molecular separation system that uses thermal energy as the source of green energy.

FIG. 1B illustrates another embodiment of an integrated green energy and selective molecular separation system that uses thermal energy as the source of green energy. The integrated system in FIG. 1B is similar to the one described above with respect to FIG. 1A, and the component parts of the systems identified with the same reference numerals in both embodiments may be the same and operate in the same manner. The energy source 1B in the FIG. 1B embodiment may be a geothermal energy source, such as a well, or an underground reservoir in a geologic formation. In this case for instance, heat from the bottom of the well or the reservoir is transferred to the surface via, e.g., fluid such as water, oil, gas, alcohol, and combinations thereof, that absorbs heat from the well or reservoir. However, other thermal energy sources, such as a solar energy source; gas flares; exhaust; heat from oil and gas pipelines; and commercial and residential heaters, discussed above, could also be used in the FIG. 1B embodiment. The green energy portion of the integrated system in FIG. 1B may interact with the selective molecular separation unit 9, 15, 16 in the same manner as discussed above with respect to the integrated system in FIG. 1A. In the FIG. 1B integrated system, the selective molecular separation unit 9, 15, 16 may include additional components, including one or more additional molecular sieve membranes 19, a selective catalytic reducer (SCR) 20, a catalytic converting unit (DOC) 21 and/or a carbon monoxide (CO) reduction unit 22. The one or more additional molecular sieve membranes 19 may be similar to the molecular sieve membranes discussed above, and can be used to separate larger oxygen ($O_2$), nitrogen ($N_2$) and hydrogen sulfide ($H_2S$) molecules from a smaller carbon dioxide ($CO_2$) molecule. That is, the one or more additional molecular sieve membranes 19 may have microscopic apertures that are sized to allow only the smaller carbon dioxide ($CO_2$) molecule to pass through, while the larger oxygen ($O_2$), nitrogen ($N_2$) and hydrogen sulfide ($H_2S$) molecules are deflected and redirected (see FIG. 7). The smaller carbon dioxide ($CO_2$) molecule may then continue passing through additional separating devices or processes in the molecular separation unit 9, 15, 16 such as those discussed above.

The selective catalytic reducer (SCR) 20 can lower the concentration of nitrogen oxide (NOx) molecules (e.g., both nitric oxide (NO) and nitrogen dioxide ($NO_2$)) in the inlet fluid 13. Within the selective catalytic reducer (SCR) 20, the nitrogen oxide (NOx) molecules are reduced by ammonia in water ($H_2O$) and nitrogen ($N_2$), which are both non-polluting. The water ($H_2O$) and nitrogen ($N_2$) can be then released into the atmosphere or used in a further separation process in the selective molecular separation unit 9, 15, 16. For instance, the water ($H_2O$) can be fed into the carbon monoxide (CO) reduction unit 22 to react with additional carbon monoxide (CO) molecules in future separation cycles. Catalysts for the selective catalytic reducer (SCR) 20 may include vanadium, molybdenum, tungsten, zeolites, or precious metals.

The catalytic converting unit (DOC) 21 (see FIG. 9B) may contain palladium and/or platinum supported on alumina. This unit converts particulate matter (PM), hydrocarbons (i.e., unburnt and partially burned fuel), and carbon monoxide (CO) to carbon dioxide ($CO_2$) and water ($H_2O$). The catalytic converting unit (DOC) 21 can therefore be used to reduce hydrocarbon and carbon monoxide from the surrounding environment. The oxidation of carbon monoxide to carbon dioxide may occur as follows: 2 CO+$O_2$→2 $CO_2$. The oxidation of hydrocarbons to carbon dioxide and water may occur as follows: $C_xH_{2x+2}$+[(3x+1)/2] $O_2$→x $CO_2$+(x+1) $H_2O$.

The carbon monoxide (CO) reduction unit 22 may mix water ($H_2O$) molecules with carbon monoxide (CO) molecules to produce hydrogen ($H_2$) molecules and change the carbon monoxide (CO) molecules to carbon dioxide ($CO_2$) molecules in a manner shown in FIG. 9A and discussed in further detail below.

Figure 1C:
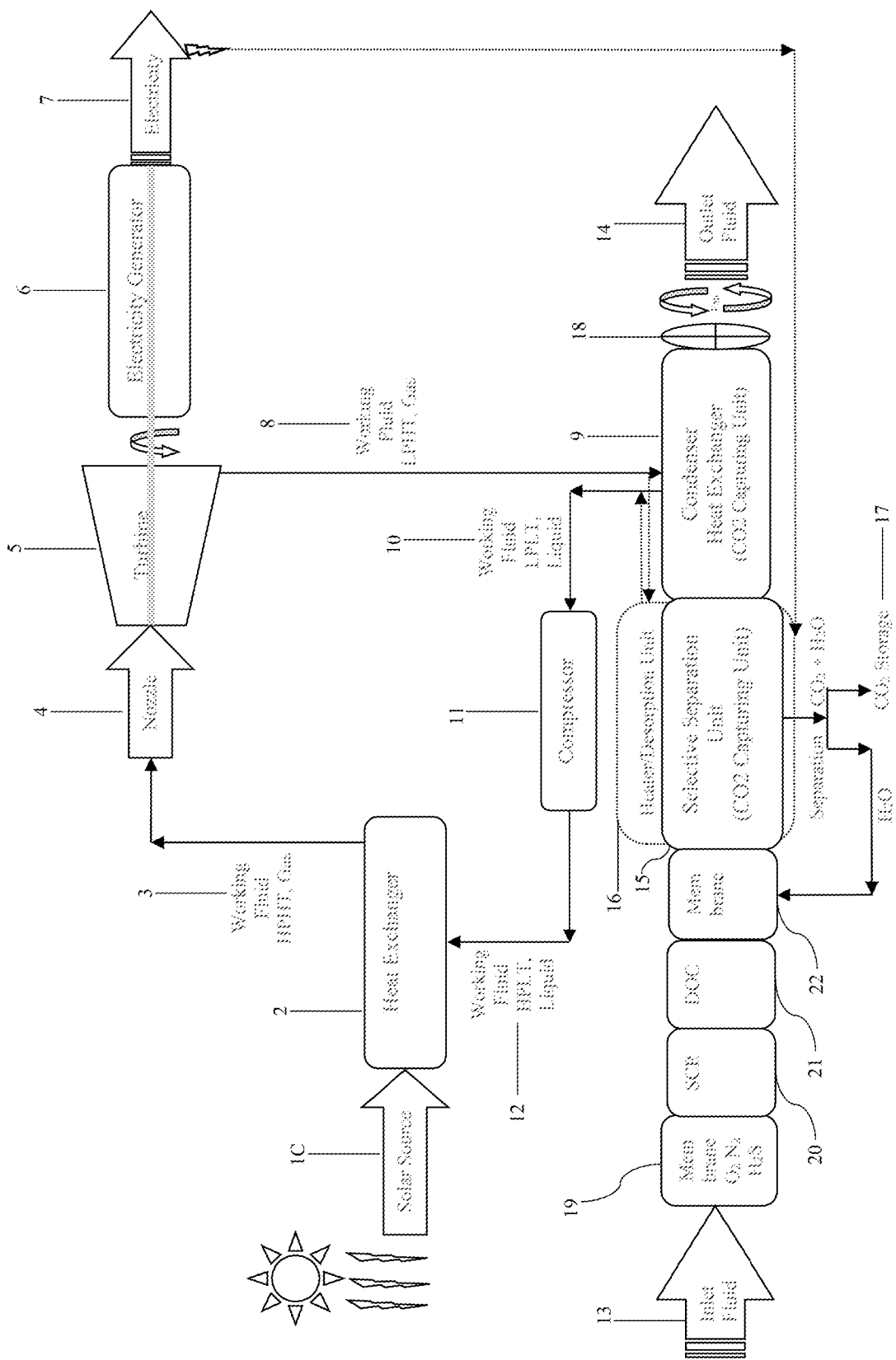
FIG. 1C is a schematic illustration of an integrated green energy and selective molecular separation system that uses solar energy as the source of green energy, according to another embodiment.

FIG. 1C illustrates a further embodiment of an integrated green energy and selective molecular separation system that uses solar energy as the source of green energy. The integrated system in FIG. 1C is similar to the ones described above with respect to FIGS. 1A and 1B, and the component parts of the systems identified with the same reference numerals in the embodiments may be the same and operate in the same manner. The difference between the integrated system in FIG. 1C and those in FIGS. 1A and 1B is that the energy source 1C in FIG. 1C is a solar energy source. Solar energy is generated by the sun. The green energy portion of the integrated system in FIG. 1C may interact with the selective molecular separation unit 9, 15, 16 in the same manner as discussed above with respect to the integrated systems in FIGS. 1A and 1B. In FIG. 1C, thermal energy from the solar energy source 1C may be applied to a primary fluid, such as molten salt, to raise the temperature of the primary fluid. That is, the primary fluid absorbs heat from the solar energy source and becomes a heated primary fluid. The solar energy may be harnessed by using concaved lenses or mirrors to concentrate photons from the sun's rays into the center of a lens or mirror to melt salt. The concentration of photons generates thermal energy that is applied to the primary fluid. The heated primary fluid transfers its thermal energy (heat) to the working fluid 12 in the heat exchanger 2. In an alternative embodiment, the thermal energy from the solar energy source 1C may be applied directly to the working fluid 12 (i.e., without the primary fluid). That is, the working fluid 12 can absorb the solar thermal energy directly from sun.

Figure 1D:
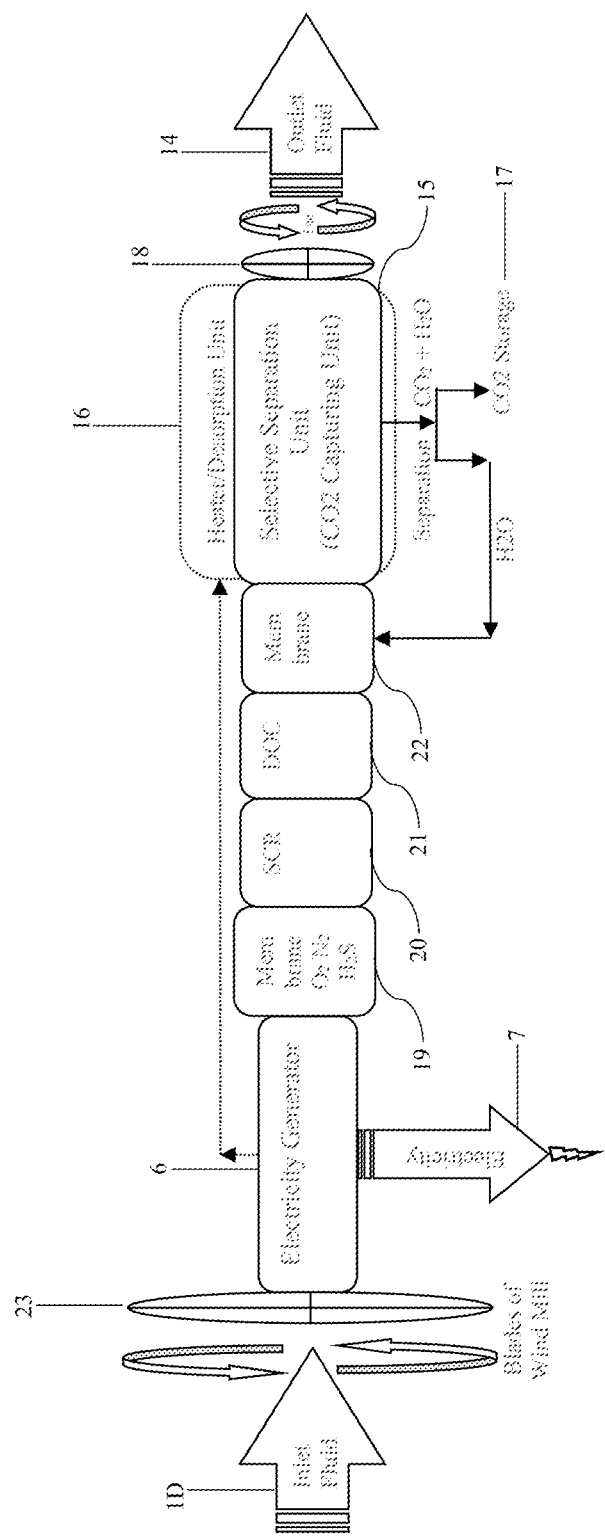
FIG. 1D is a schematic illustration of an integrated green energy and selective molecular separation system that uses wind energy as the source of green energy, according to an embodiment.

FIG. 1D illustrates a further embodiment of an integrated green energy and selective molecular separation system that uses wind energy as the source of green energy. The integrated system of FIG. 1D includes sonic of the component parts of the systems discussed above with respect to FIGS. 1A to 1C, and the component parts identified with the same reference numerals in FIGS. 1A to 1D may be the same and operate in the same manner. Instead of a thermal energy source as in FIGS. 1A to 1C, the energy source in FIG. 1D is kinetic energy of an inlet fluid 1D, such as wind, from the surrounding environment. That is, the energy is generated by the wind. As discussed above, the surrounding environment may be the atmosphere of the earth, such that the inlet fluid 1D is air. The inlet fluid 1D may be polluted with greenhouse gas (carbon dioxide ($CO_2$)), carbon monoxide (CO), nitrogen oxides ($NO_X$), hydrogen sulfide ($H_2S$), and/or other gases as discussed above. The integrated system in FIG. 1D includes a windmill 23 that is driven by the inlet fluid 1D (e.g., wind). The windmill 23 may include blades that are turned by movement of the inlet fluid 1D. The windmill 23 may be mechanically connected to the rotor of an electricity generator 6 so that rotation of the windmill 23 rotates the rotor of the electricity generator 6 to generate electricity 7 via electromagnetic induction as discussed above. The electricity 7 produced can be extracted from the electricity generator 6, and may be sent to an electrical grid for commercial distribution and use, as discussed above.

The inlet fluid 13 that turns the windmill 23 to drive the electricity generator 6 also enters the selective molecular separation unit 15. The selective molecular separation unit 15 may be the same as the selective molecular separation unit 15 in the embodiments of FIGS. 1A to 1C except that the selective molecular separation unit 15 in FIG. 1D may not include the condenser/heat exchanger 9. In all other respects, the selective molecular separation unit 15 of FIG. 1D may operate as the selective molecular separation unit 15 in the embodiments of FIGS. 1A to 1C unless indicated otherwise below. In the integrated system of FIG. 1D, the inlet fluid 13 may pass through the molecular sieve membrane(s) 19, the selective catalytic reducer (SCR) 20, the catalytic converting unit (DOC) 21, and for the carbon monoxide (CO) reduction unit 22 for initial separation and capture of predetermined molecules (e.g., greenhouse gases), as discussed above, before entering the separation portion 15. Movement of the inlet fluid 13 may be assisted via the fan 18, a vacuum or other similar device through the separation portion 15. The inlet fluid 13 containing any remaining greenhouse gas (e.g., carbon dioxide ($CO_2$), carbon monoxide (CO), nitrogen oxides ($NO_X$)) may then enter the separation portion 15 and undergo further separation via the sorption process and/or the molecular sieve membrane(s) discussed above. The desorption process in the desorption unit 16 in the embodiment of FIG. 1D uses heat from the electrical heater powered by the electricity 7 from the electricity generator 6 in the manner discussed above.

Figure 1E:
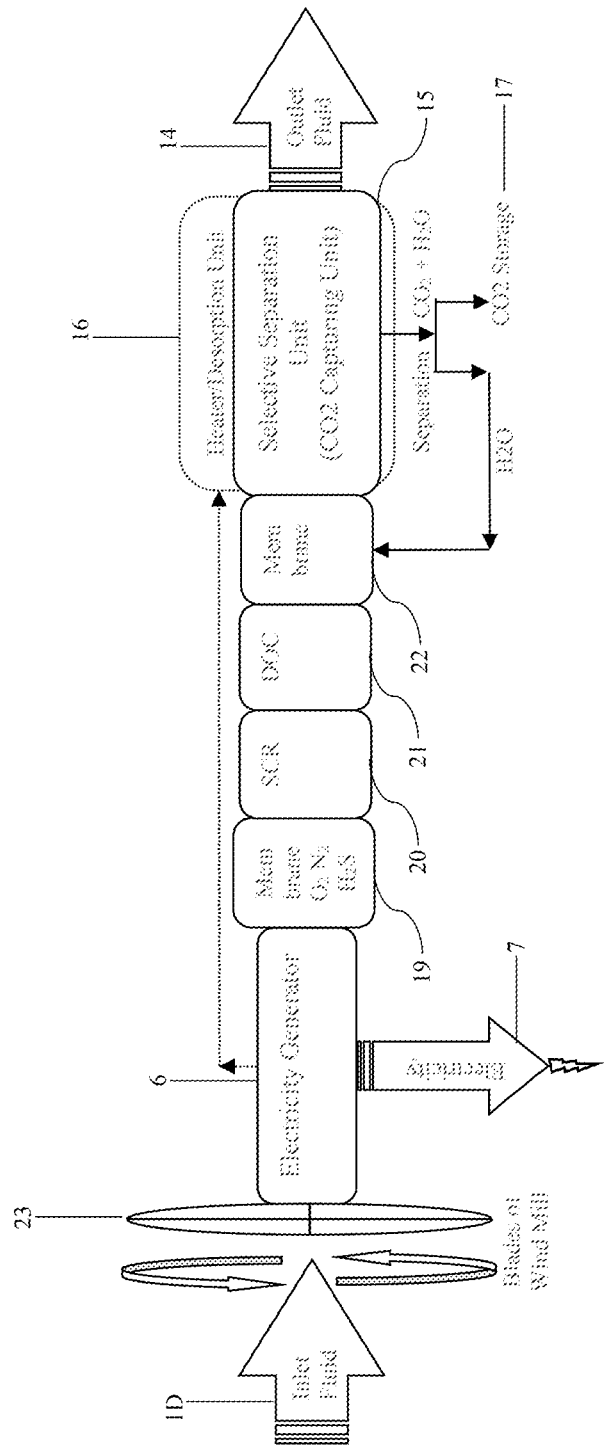
FIG. 1E is a schematic illustration of another integrated green energy and selective molecular separation system that uses wind energy as the source of green energy, according to an embodiment.

FIG. 1E is a schematic illustration of another integrated green energy and selective molecular separation system that uses wind energy as the source of green energy. The integrated system of FIG. 1E may be the same as the system of FIG. 1D, but excludes the fan 18. The remaining component parts identified with the same reference numerals in FIGS. 1D and 1E may be the same and operate in the same manner.

FIG. 2A is an illustration of a Rankine Cycle that is implemented by an integrated green energy and selective molecular separation system, according to an embodiment. FIG. 2A illustrates the relationship between pressure and enthalpy a Rankine Cycle, and includes four points or "states" ("A" through "D") along the cycle. State "A" corresponds to a beginning point in the cycle at which the working fluid has particular pressure, temperature, enthalpy, and may be in a liquid state. The cycle proceeds to state "B" by introducing the working fluid into the heat exchanger 2, at which the temperature and enthalpy increase, and the heated working fluid may be changed from a liquid state to a gas/vapor state. The cycle next proceeds to state "C", corresponding to the heated working fluid from the heat exchanger 2 driving the turbine 5 with the state "B" characteristics. At step "C", after the heated working fluid exits the turbine 5, the pressure, temperature and enthalpy of the working fluid may be decreased. The cycle then proceeds to state "D" corresponding to the working fluid passing through the condenser 9 of the selective molecular separation unit 9, 15, 16 with the state "C" characteristics. The condenser 9 may decrease the enthalpy of the working fluid, and change the state of the working fluid at least mostly back to a liquid state. The cycle finally returns to state "A", corresponding to the working fluid passing through the compressor 11, which elevates the pressure of the working fluid and may change to the state of the working fluid to a complete liquid state. In the Rankine Cycle, the ideal net energy equals zero according to the conservation of energy law.

Figure 2B:
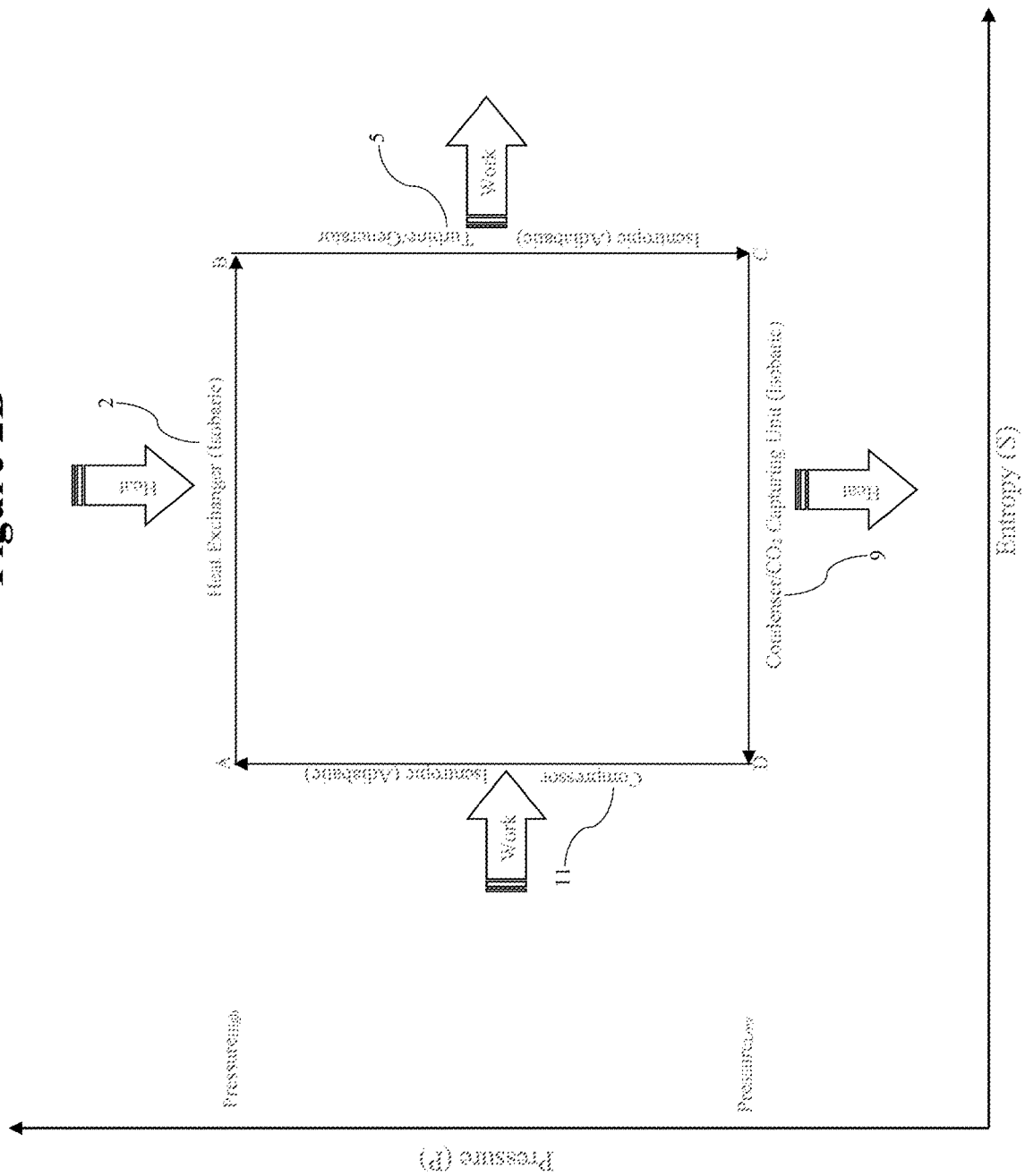
FIG. 2B is another illustration of a Rankine Cycle that is implemented by an integrated green energy and selective molecular separation system, according to an embodiment.

FIG. 2B is another illustration of a Rankine Cycle that is implemented by an integrated green energy and selective molecular separation system, according to an embodiment. FIG. 2B illustrates the relationship between pressure and entropy in a Rankine Cycle, and includes four points or "states" ("A" through "D") along the cycle. State "A" corresponds to a beginning point in the cycle at which the working fluid has particular pressure, temperature, entropy, and may be in a liquid state. The cycle proceeds to state "B" by introducing the working fluid into the heat exchanger 2, at which the temperature and entropy may increase, and the heated working fluid may be changed from a liquid state to a gas vapor state. The cycle next proceeds to state "C", corresponding to the heated working fluid from the heat exchanger 2 driving the turbine 5 with the state "B" characteristics. At step "C", after the heated working fluid exits the turbine 5, the pressure, temperature of the working fluid may be decreased. The cycle then proceeds to state "D" corresponding to the working fluid passing through the condenser 9 of the selective molecular separation unit 9, 15, 16 with the state "C" characteristics. The condenser 9 may decrease the entropy of the working fluid, and change the state of the working fluid at least mostly back to a liquid state. The cycle finally returns to state "A", corresponding to the working fluid passing through the compressor 11, which elevates the pressure of the working fluid and may change to the state of the working fluid to a complete liquid state.

Figure 2C:
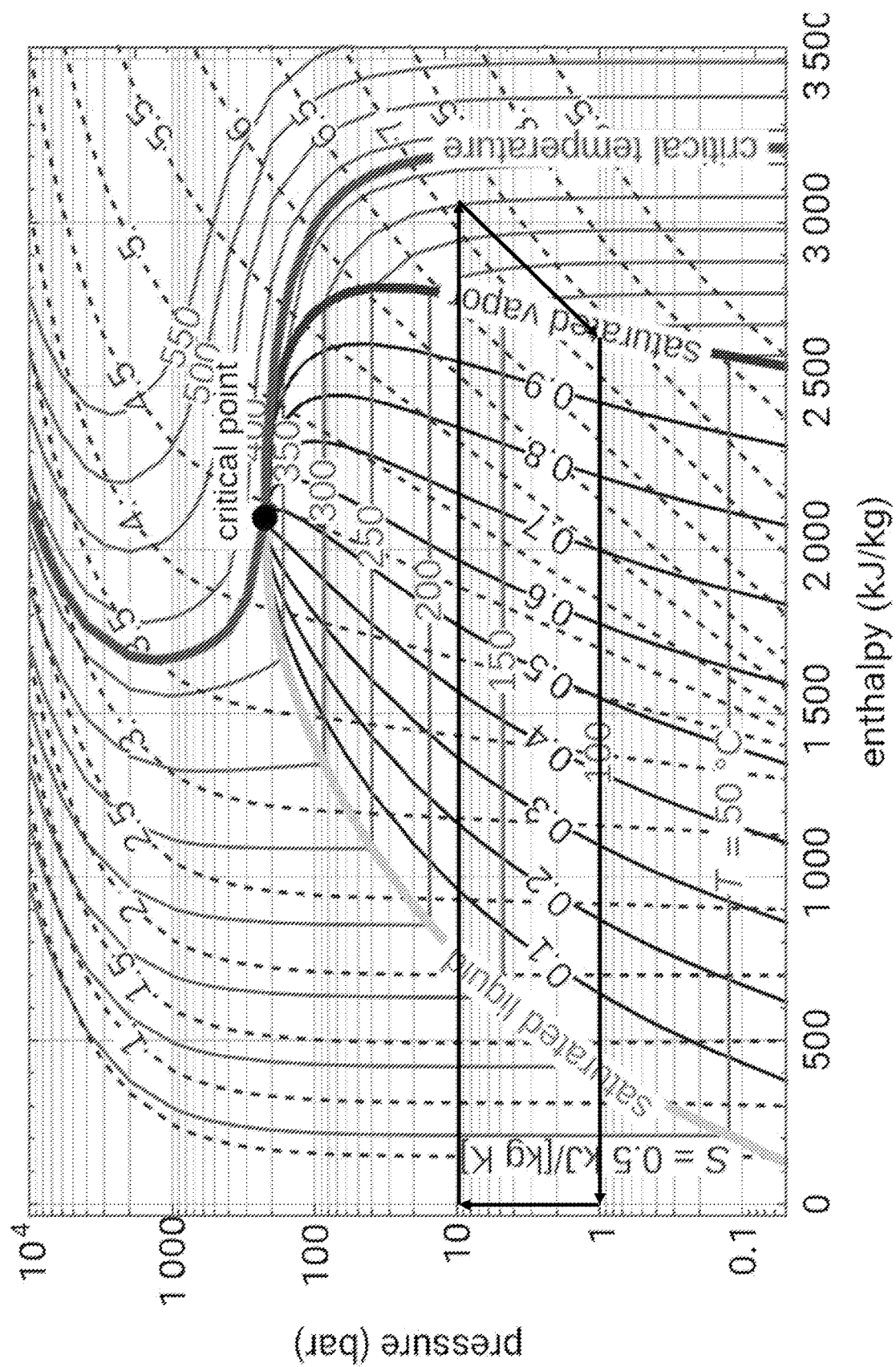
FIG. 2C illustrates a graph of a Rankine Cycle using water as a working fluid according to an embodiment.

FIG. 2C illustrates a graph of a Rankine Cycle in which water is the working fluid according to an embodiment. In the embodiment, the steam has a temperature of 300 degrees Celsius, and the thermal energy source is a flame or flare having a temperature of about 700 to 1,400 degrees Celsius. The working fluid is heated by a flame or flare in a heat exchanger to have a temperature of 300 degrees Celsius. The following table illustrates the electrical energy that can be produced along with the number of people able to receive the electricity according to different flows rates of the working fluid, according to the inventor's calculation.

TABLE 2

Electrical Output Based on Working Fluid Flow Rate

| Working Fluid Flow Rate (Gallons per Minute-GPM) | Electrical Energy (Mega Watt Hour-MWH) | Number of Persons Receiving Electricity in the U.S.A. |
| --- | --- | --- |
| 5 | 0.118 | 88 |
| 10 | 0.236 | 175 |
| 50 | 1.181 | 874 |
| 100 | 2.362 | 1747 |
| 200 | 4.706 | 3481 |

Figure 2D:
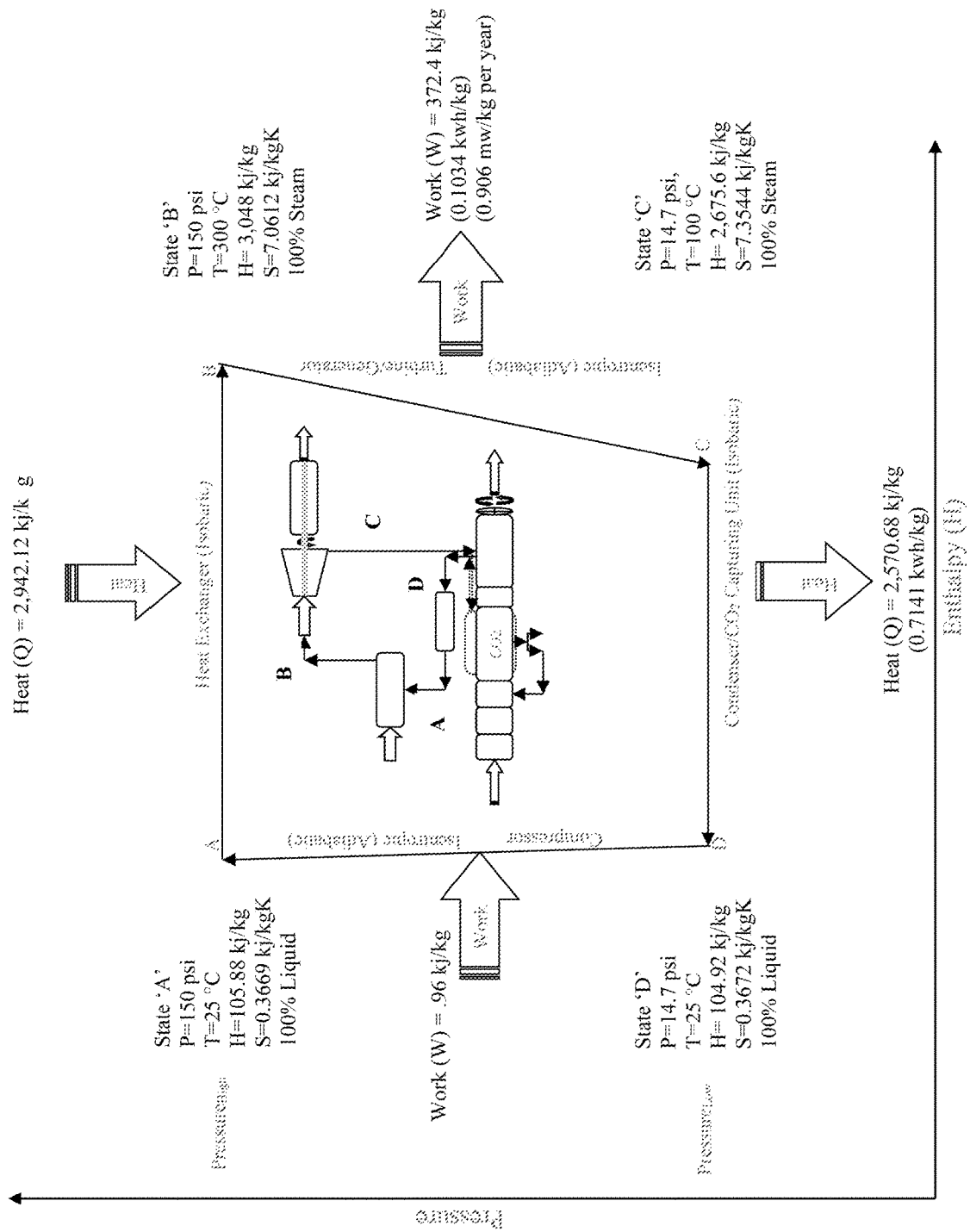
FIG. 2D illustrates a specific example of a Rankine Cycle that is implemented by an integrated green energy and selective molecular separation system, according to an embodiment.

FIG. 2D is illustrates a specific example of a Rankine Cycle that is implemented by an integrated green energy and selective molecular separation system, according to an embodiment. In the embodiment, water is used as the working fluid. At state "A" the heated working fluid is under a pressure (P) of 150 psi, has a (T) temperature of 25 degrees Celsius, has an enthalpy (H) of 105.88 kj/kg, has an entropy of 0.3669 kj/kgK, and is in a 100 percent liquid state. In the heat exchanger 2, the temperature is raised to 300 degrees Celsius, the enthalpy (H) is raised to 3,048 kj/kg, the entropy is raised to 7.0612 kj/kgK, and the state of the heated working fluid is changed to gas/vapor state (e.g., 100 percent steam). The heated working fluid enters a turbine 5 in this state (state "B") to drive the turbine 5 and perform work at 372.4 kj/kg. The work drives an electricity generator 6 to generate electricity via electromagnetic induction to produce electricity in the amount of 0.1034 kwh/kg, i.e., 0.906 mw/kg per year. After passing through the turbine 5, the pressure of the working fluid is decreased to 14.7 psi, the temperature is decreased to 100 degrees Celsius, the enthalpy is decreased to 2,675.6 kj/kg, the entropy is raised to 7.3544 kj/kgK, and the working fluid is maintained in the gas/vapor state (e.g., 100 percent steam) as indicated in "C". The working fluid may then pass through the condenser 9 of the selective molecular separation unit 9, 15, 16. The condenser 9 decreases the temperature of the working fluid to 25 degrees Celsius, the enthalpy of the working fluid to 104.92 kj/kg, and decreases the entropy of the working fluid to 0.367.2 kj/kgK (see step "D"). The working fluid may then pass through the compressor 11, which elevates the pressure of the working fluid to 150 psi and may change to the state of the working fluid to a complete liquid state, when returning to step "A" to repeat the cycle. Fluids other than water may yield different results (e.g., pressures, temperatures, enthalpy and entropy) than water in Rankine Cycles, and are encompassed within the scope of the present disclosure.

Figure 2E:
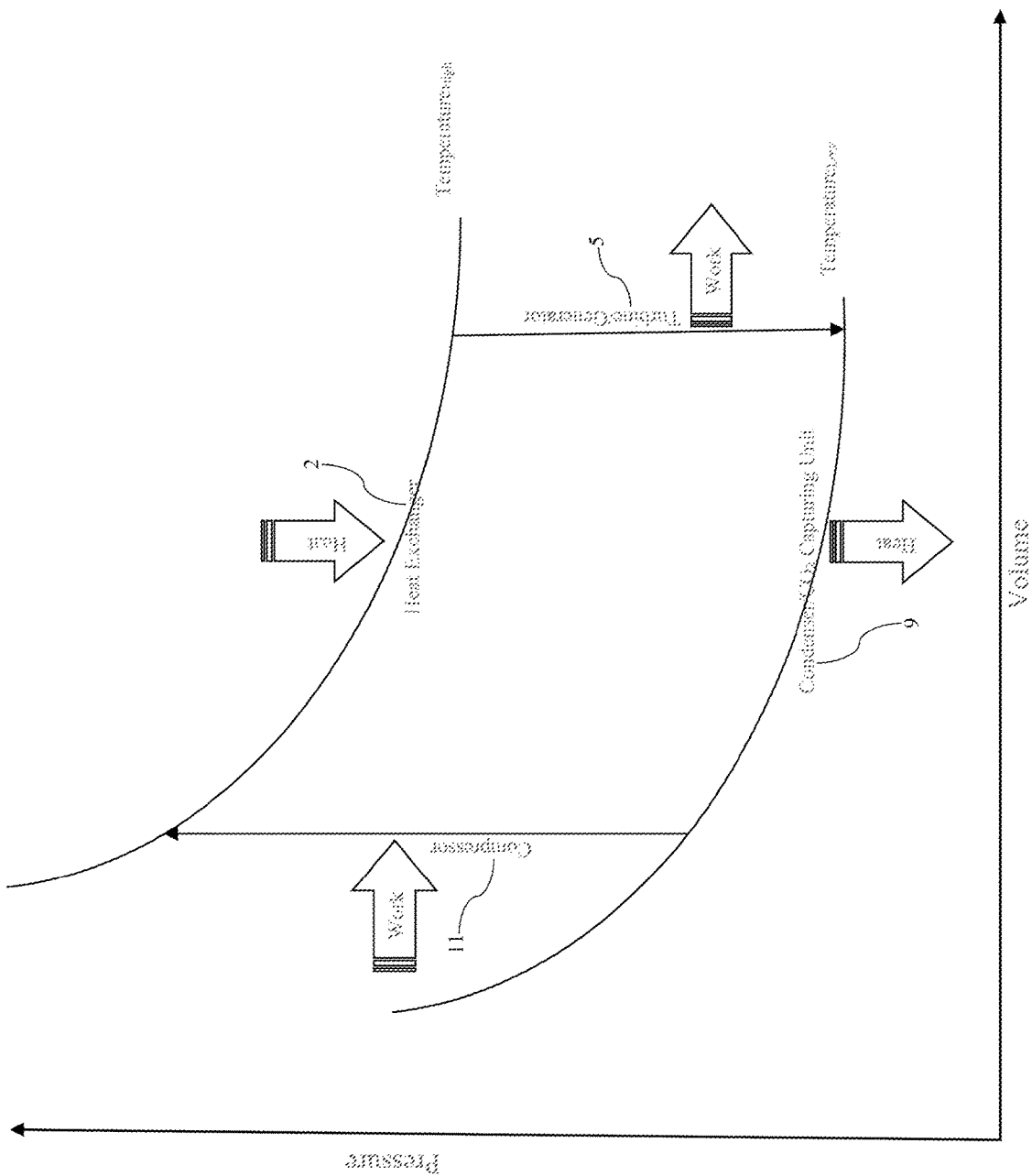
FIG. 2E is an illustration of a Carnot Cycle that can be implemented by an integrated green energy and selective molecular separation system, according to an embodiment.

FIG. 2E is an illustration of a Carnot Cycle that can be implemented by an integrated green energy and selective molecular separation system, according to an embodiment. FIG. 2E illustrates the relationship between pressure and volume of the working fluid in a Carnot Cycle, and maps generally how the pressure and volume of the working fluid change from the compressor 11 to the heat exchanger 2, from the heat exchanger 2 to the turbine/generator 4/5, from the turbine/generator 4/5 to the condenser 9, and from the condenser 9 to the compressor 11.

FIG. 2F is another illustration of a Carnot Cycle that can be implemented by an integrated green energy and selective molecular separation system, according to an embodiment. FIG. 2F illustrates the relationship between temperature and entropy of the working fluid in a Carnot Cycle, and maps generally how the temperature and entropy of the working fluid change from the compressor 11 to the heat exchanger 2, from the heat exchanger 2 to the turbine/generator 4/5, from the turbine/generator 4/5 to the condenser 9, and from the condenser 9 to the compressor 11.

The green energy portion of the integrated systems discussed herein may implement one or more of the thermodynamic cycles shown in Table 3. Table 3 shows the type of Compression, Heat Addition, Expansion and Heat Rejection of each thermodynamic cycle, along with the corresponding steps shown in FIGS. 2A, 2B and 2D to 2F. For instance, in the Rankine Cycle the heat exchanger 2 implements an isobaric heat addition (Steps A→B). The turbine 5 implements an adiabatic expansion (Steps B→C). The condenser 9 implements an isobaric heat rejection (Steps C→D). The compressor 11 implements an adiabatic compression (Steps D→A). That is, for the Rankine Cycle: Heat Exchanger (Isobaric)→Turbine (Adiabatic)→Condenser (Isobaric)→Compressor (Adiabatic). In the Carnot Cycle the heat exchanger 2 implements an isothermal heat addition (Steps A→B). The turbine 5 implements an isentropic expansion (Steps B→C). The condenser 9 implements an isothermal heat rejection Steps (C→D). The compressor 11 implements an isentropic compression (Steps D→A). That is, for the Carnot Cycle: Heat Exchanger (Isothermal)→Turbine (Isentropic)→Condenser (Isothermal)→Compressor (Isentropic).

TABLE 3

Thermodynamic Cycles Implemented by the Integrated Green Energy and Selective Molecular Separation Systems

| Cycle | Compression Steps D → A | Heat Addition Steps A → B | Expansion Steps B → C | Heat Rejection Steps C → D |
|---|---|---|---|---|
| Bell Coleman | adiabatic | isobaric | adiabatic | isobaric |
| Carnot | isentropic | isothermal | isentropic | isothermal |
| Ericsson | isothermal | isobaric | isothermal | isobaric |
| Rankine | adiabatic | isobaric | adiabatic | isobaric |
| Hygroscopic | adiabatic | isobaric | adiabatic | isobaric |
| Scuderi | adiabatic | Variable pressure and volume | adiabatic | isochoric |
| Stirling | isothermal | isochoric | isothermal | isochoric |
| Manson | isothermal | isochoric | isothermal | Isochoric, then adiabatic |
| Stoddard | adiabatic | isobaric | adiabatic | isobaric |
| Atkinson | isentropic | isochoric | isentropic | isochoric |
| Brayton | adiabatic | isobaric | adiabatic | isobaric |
| Diesel | adiabatic | isobaric | adiabatic | isochoric |
| Humphrey | isentropic | isochoric | isentropic | isobaric |
| Lenoir |  | isochoric | adiabatic | isobaric |
| Otto | isentropic | isochoric | isentropic | isochoric |

The following explanation for each process in Table 3 may be helpful. Adiabatic: No energy transfer as heat (Q) during that part of the cycle (Q=constant, δQ=0). Isothermal: The process is at a constant temperature during that part of the cycle (T=constant, δT=0). Isobaric: Pressure in that part of the cycle will remain constant (P=constant, δP=0). Isochoric: The process is constant volume (V=constant, δV=0). Isentropic: The process is one of constant entropy (S=constant, δS=0). Isenthalpic: process that proceeds without any change in enthalpy or specific enthalpy (H=constant, δH=0).

Figure 3A:
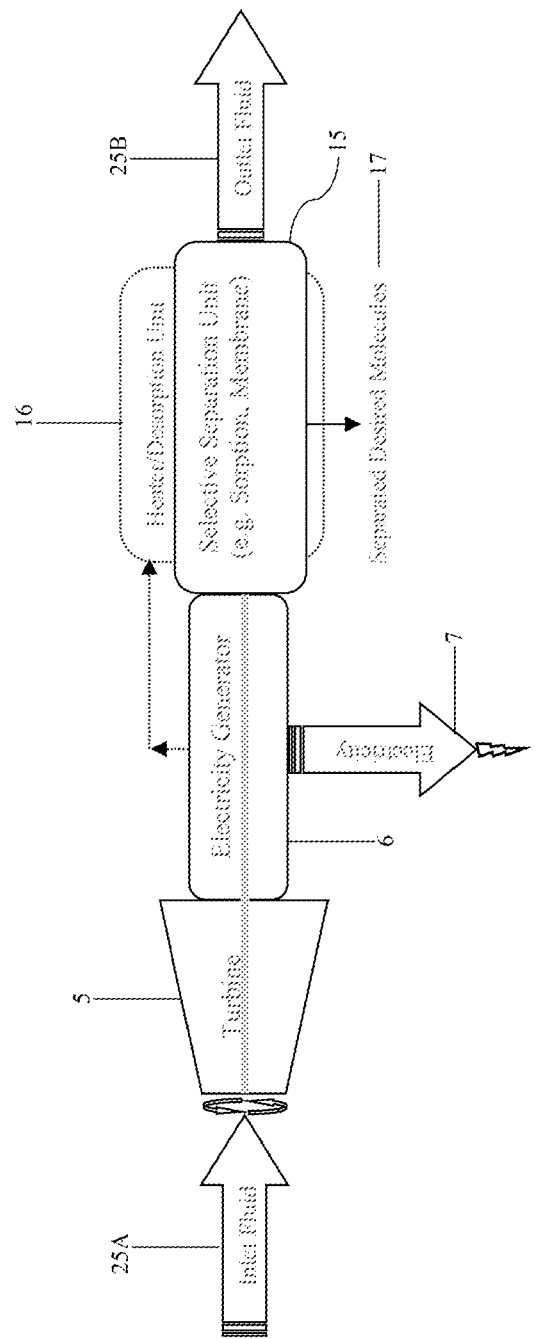
FIG. 3A is a schematic illustration of another type integrated green energy and selective molecular separation system, according to an embodiment.

FIG. 3A is a schematic illustration of another type integrated green energy and selective molecular separation system ("Green Energy Blue"). The integrated system of FIG. 3A includes some of the component parts of the systems discussed above with respect to FIGS. 1A to 1D, and the component parts identified with the same reference numerals in the figures may be the same and operate in the same manner unless indicated otherwise below. In the integrated system of FIG. 3A, the energy source is an inlet fluid 25A that possesses relatively high kinetic energy. The inlet fluid 25A may be a gas or a liquid. In an embodiment, the inlet fluid 25A may include wind containing polluted air from the surrounding environment; and/or exhaust flue gas from a flame, a flare and/or an engine. In any of these cases, the inlet fluid 25A may contain predetermined molecules of greenhouse gas (carbon dioxide ($CO_2$)), carbon monoxide (CO), nitrogen oxides ($NO_X$), hydrogen sulfide ($H_2S$), and/or other gases as discussed above. The kinetic energy of the inlet fluid 25A exerts a force on a series of blades mounted on a shaft of the turbine 5. The force turns the blades, which rotates the shaft to drive the turbine 5 as discussed above. In some embodiments, the turbine 5 may be a windmill. The shaft of the turbine 5 may be mechanically connected to the rotor of an electricity generator 6 so that rotation of the shaft rotates the rotor of the electricity generator 6 to generate electricity 7 via electromagnetic induction as discussed above. After driving the turbine 5, the inlet fluid 25A enters the separation portion 15 of the selective molecular separation unit 15, 16. The predetermined molecules of the greenhouse gases in the inlet fluid 25A are selectively separated from other molecules of the surrounding environment in the selective molecular separation unit 15 in the manner discussed above (i.e., via a sorption process and/or a molecular sieve membrane). Meanwhile, the electricity 7 produced can be extracted from the electricity generator 6, and a portion of the electricity 7 may be utilized to power the electrical heater in the desorption unit 16 which provides the heat to perform the desorption process of the separated predetermined molecules in the selective molecular separation unit 15, 16, as discussed above. Another portion of the generated electricity 7 may be sent to an electrical grid for commercial distribution and use, as discussed above. The predetermined molecules captured in the desorption process can be conveyed from the selective molecular separation unit 15, 16 for storage 17 in a storage tank (not shown). The other molecules, such as oxygen ($O_2$) and nitrogen ($N_2$), which have been separated from the predetermined molecules of the inlet fluid 25A may be released from the separation portion 15 to be released as outlet fluid 25B into the surrounding environment.

Figure 3B:
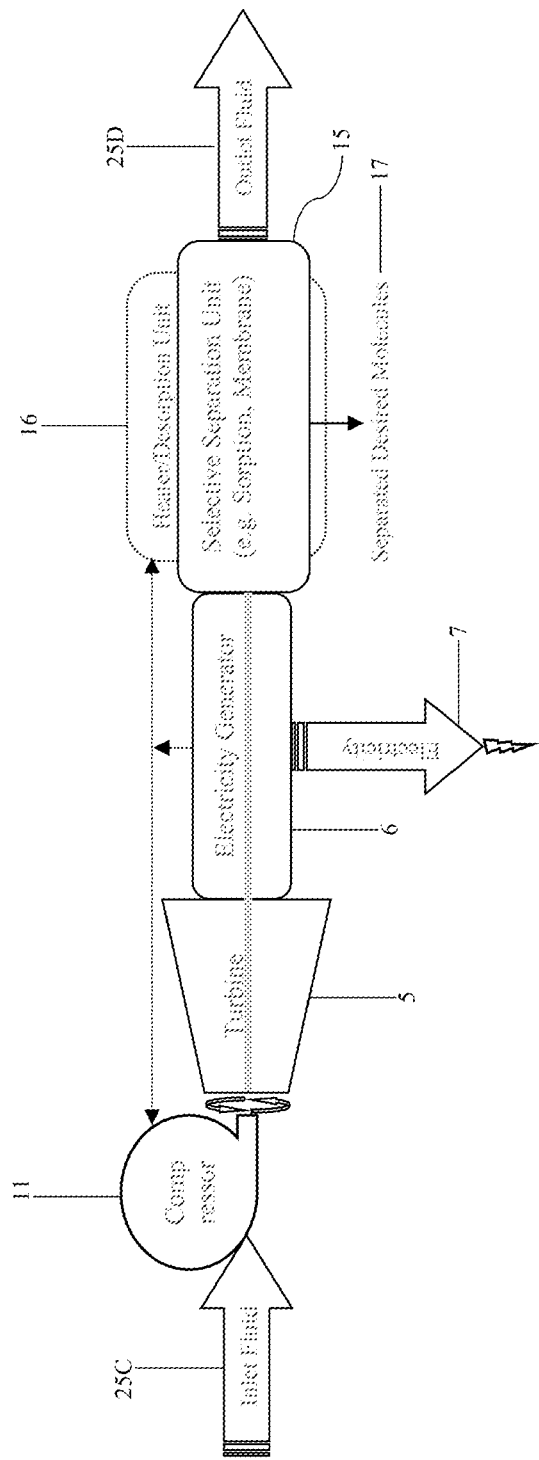
FIG. 3B is a schematic illustration of a first variation of the integrated green energy and selective molecular separation system of FIG. 3A, according to an embodiment.

FIG. 3B is a schematic illustration of a first variation of the integrated green energy and selective molecular separation system of FIG. 3A. The integrated system of FIG. 3B includes the component parts of the system of FIG. 3A, and the component parts identified with the same reference numerals in the figures may be the same and operate in the same manner unless indicated otherwise below. The integrated system of FIG. 3B adds a compressor 11 before the turbine 5, such that the inlet fluid 25C (which may be the same as the inlet fluid 25A in FIG. 3A) is compressed by the compressor 11 before entering the turbine 5. The compressor 11 may be a pump when the inlet fluid 25C is a liquid. The compressor 11 increases the pressure of the inlet fluid 25C, which increases the kinetic energy of the inlet fluid 25C. The increased kinetic energy of the inlet fluid 25C drives the turbine 5 with greater force, which in turn drives the electrical generator 6 faster to produce more electricity 7. Further, the electricity 7 generated by the electrical generator 6 can be used to power the compressor 11, in addition to the electrical heater in the desorption unit 16, as shown in FIG. 3B. In other embodiments, the compressor may be powered by the rotating shaft of the turbine 5. After driving the turbine 5, the inlet fluid 25C enters the separation portion 15. The predetermined molecules of the greenhouse gases in the inlet fluid 25C are selectively separated from other molecules of the surrounding environment in the separation portion 15 in the manner discussed above (i.e., via a sorption process and/or a molecular sieve membrane). Meanwhile, the electricity 7 produced can be extracted from the electricity generator 6, and a portion of the electricity 7 may be utilized to power the electrical heater which provides the heat to perform the desorption process of the separated predetermined molecules in the desorption unit 16, as discussed above. Another portion of the generated electricity 7 may be sent to an electrical grid for commercial distribution and use, as discussed above. The predetermined molecules captured in the desorption process can be conveyed from the selective molecular separation unit 15, 16 for storage 17 in a storage tank (not shown). The other molecules, such as oxygen ($O_2$) and nitrogen ($N_2$), which have been separated from the predetermined molecules of the inlet fluid 25C may be released from the separation portion 15 to be released as outlet fluid 25D into the surrounding environment.

Figure 3C:
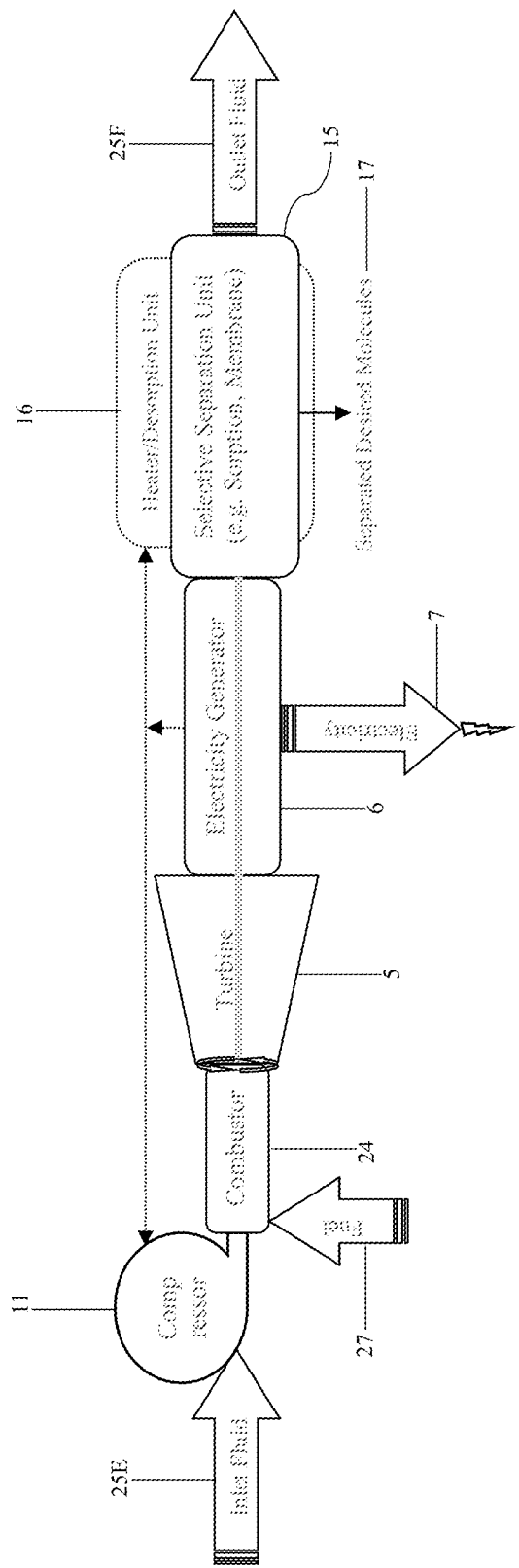
FIG. 3C is a schematic illustration of an integrated green energy and selective molecular separation system according to another embodiment.

FIG. 3C is a schematic illustration of an integrated green energy and selective molecular separation system according to another embodiment. The integrated system of FIG. 3C includes the component parts of the system of FIG. 3A, and the component parts identified with the same reference numerals in the figures may be the same and operate in the same manner unless indicated otherwise below. The integrated system of FIG. 3C includes the compressor 11 of FIG. 3B and includes a combustor 24 between the compressor 11 and the turbine 5. In some embodiments, the combustor 24 may be part of an engine or a gas turbine. The inlet fluid 25E (which may be the same as the inlet fluid 25A in FIG. 3A) may be compressed by the compressor 11 before entering the combustor 24. The compressor 11 may be a pump when the inlet fluid 25C is a liquid. The compressor 11 increases the pressure of the inlet fluid 25E, which increases the kinetic energy of the inlet fluid 25E. The combustor 24 may include an ignition source, such as a flame or a spark, and receives the compressed inlet fluid 25E along with a fuel 27. The ignition source may ignite the fuel 27 in the combustor 24 to produce a combusted inlet fluid that has a greater thermal and/or kinetic energy than the inlet fluid 25E. The greater thermal and/or kinetic energy combusted inlet fluid is used to drive the turbine 5 with a greater force than non-combusted inlet fluid. The greater force in turn drives the electrical generator 6 faster to produce more electricity 7, which can be used to power the compressor 11 and the electrical heater in the desorption unit 16, while also being sent to an electrical grid for commercial distribution and use, as discussed above. After combustion, the combusted inlet fluid enters the separation portion 15. The predetermined molecules of the greenhouse gases in the combusted inlet fluid are selectively separated from other molecules of the surrounding environment in the separation portion 15 in the manner discussed above (i.e., via a sorption process and/or a molecular sieve membrane). Meanwhile, the electricity 7 produced can be extracted from the electricity generator 6, and a portion of the electricity 7 may be utilized to power the electrical heater which provides the heat to perform the desorption process of the separated predetermined molecules in the desorption unit, as discussed above. Another portion of the generated electricity 7 may be sent to an electrical grid for commercial distribution and use, as discussed above. The predetermined molecules captured in the desorption process can be conveyed from the selective molecular separation unit 15, 16 for storage 17 in a storage tank (not shown). The other molecules, such as oxygen ($O_2$) and nitrogen ($N_2$), which have been separated from the predetermined molecules of the combusted inlet fluid may be released from the selective molecular separation unit 15 to be released as outlet fluid 25F into the surrounding environment.

Figure 3D:
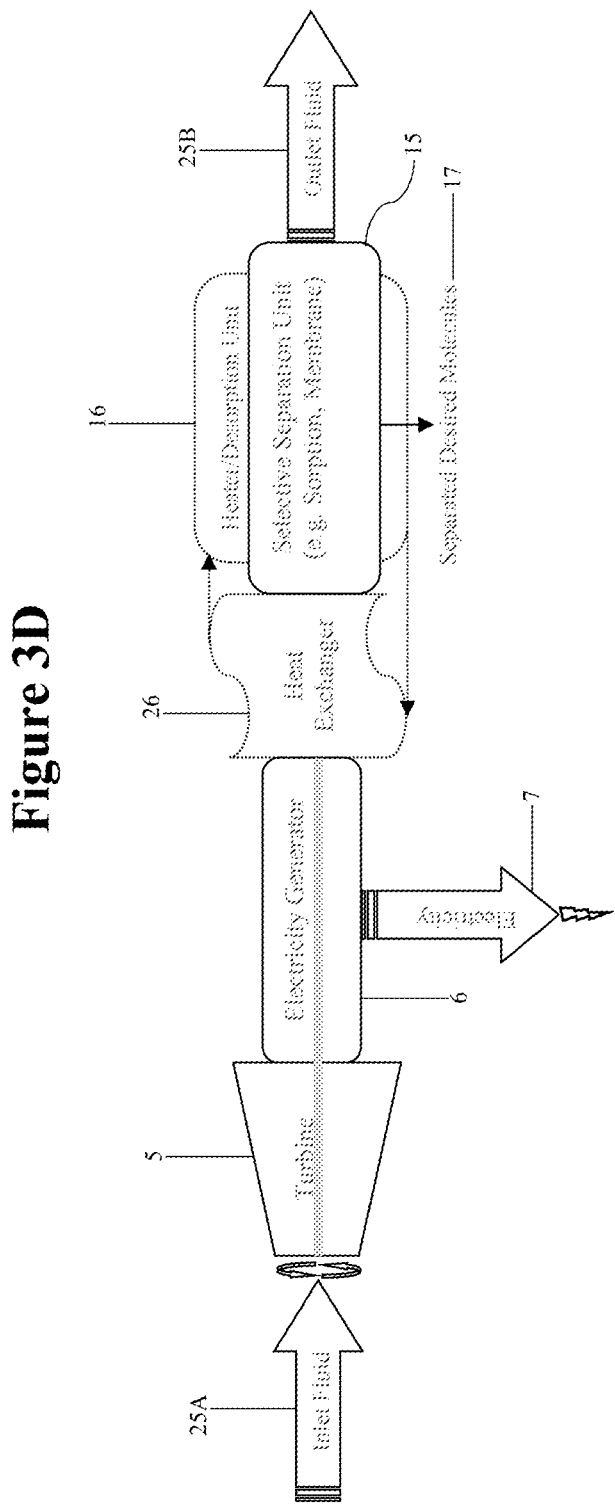
FIG. 3D is a schematic illustration of a second variation of the integrated green energy and selective molecular separation system of FIG. 3A, according to an embodiment.

FIG. 3D is a schematic illustration of a second variation of the integrated green energy and selective molecular separation system of FIG. 3A. The integrated system of FIG. 3D includes the component parts of the system of FIG. 3A, and the component parts identified with the same reference numerals in the figures may be the same and operate in the same manner unless indicated otherwise below. The integrated system of FIG. 3D additionally includes a heat exchanger 26, which may be provided between the electricity generator 6 and the selective molecular separation unit 15. The inlet fluid 25A turns the blades of the turbine 5 via kinetic energy, which rotates the shaft and drives the electricity generator 6 to generate electricity 7 as discussed above. In some embodiments, the turbine 5 may be a windmill. The inlet fluid 25A then enters the heat exchanger 26. The heat exchanger 26 may exchange thermal energy of the inlet fluid 25A with the sorbent and/or molecular sieve membrane which reduces the temperature of the inlet fluid 25A. The reduced-temperature (e.g., cooled) inlet fluid 25A then passes through the separation portion 15 to undergo the sorption process in which the predetermined molecules (e.g., of the greenhouse gases) in the reduced-temperature inlet fluid 25A are selectively separated from other molecules, as discussed above. The reduced-temperature of the inlet fluid 25A actually improves the sorption process. The other molecules which are not separated by the sorbent material, and for molecular sieve membrane, such as oxygen ($O_2$) and nitrogen ($N_2$), may be released from the separation portion 15 as outlet fluid 25B into the surrounding environment.

Meanwhile, heat from the exchange of thermal energy in the heat exchanger 26 is used to desorb the sorbent having the separated predetermined molecules from the sorption process. That is, the heat is used to capture the predetermined molecules, such as carbon dioxide ($CO_2$), carbon monoxide (CO), and nitrogen oxides ($NO_X$) from the sorbent in a desorption process as discussed above. The captured predetermined molecules can be conveyed from the desorption unit 16 for storage 17 in a storage tank (not shown). The electricity 7 produced by the electricity generator 6 may be sent to an electrical grid for commercial distribution and use, as discussed above.

Figure 3E:
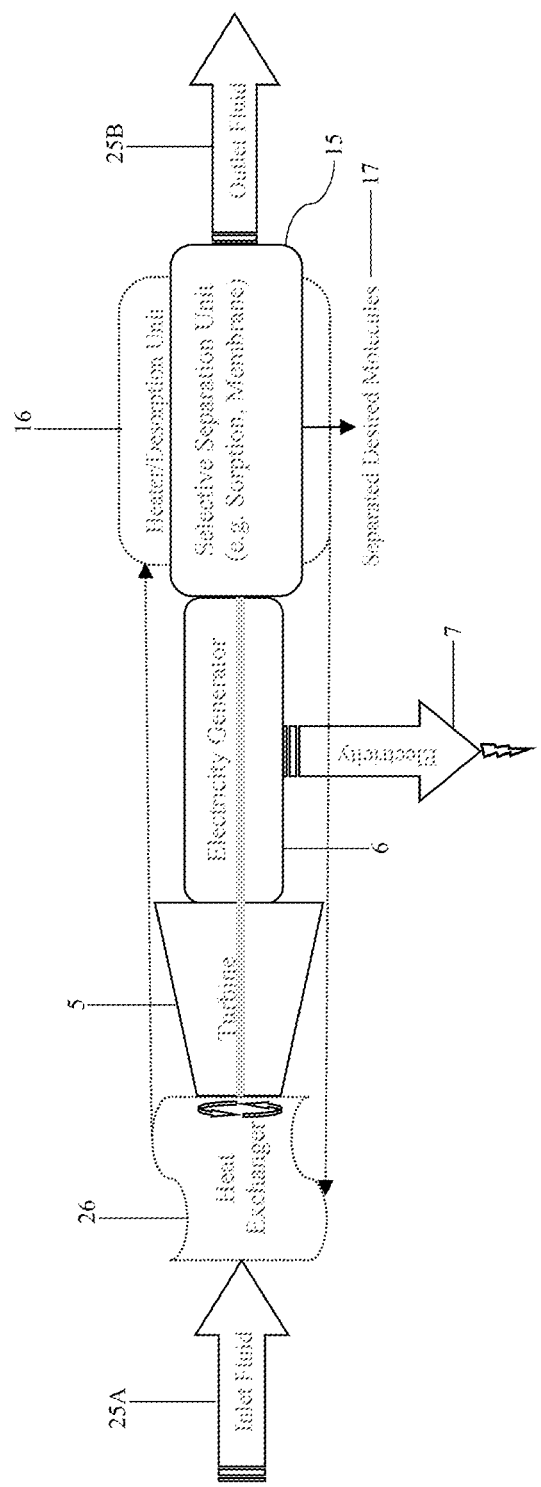
FIG. 3E is a schematic illustration of a third variation of the integrated green energy and selective molecular separation system of FIG. 3A, according to an embodiment.

FIG. 3E is a schematic illustration of a third variation of the integrated green energy and selective molecular separation system of FIG. 3A. The integrated system of FIG. 3E is similar to the integrated system of FIG. 3D, but relocates the heat exchanger 26 to be provided before the turbine 5. The remaining component parts identified with the same reference numerals in FIGS. 3D and 3E may be the same and operate in the same manner as discussed above.

Figure 3F:
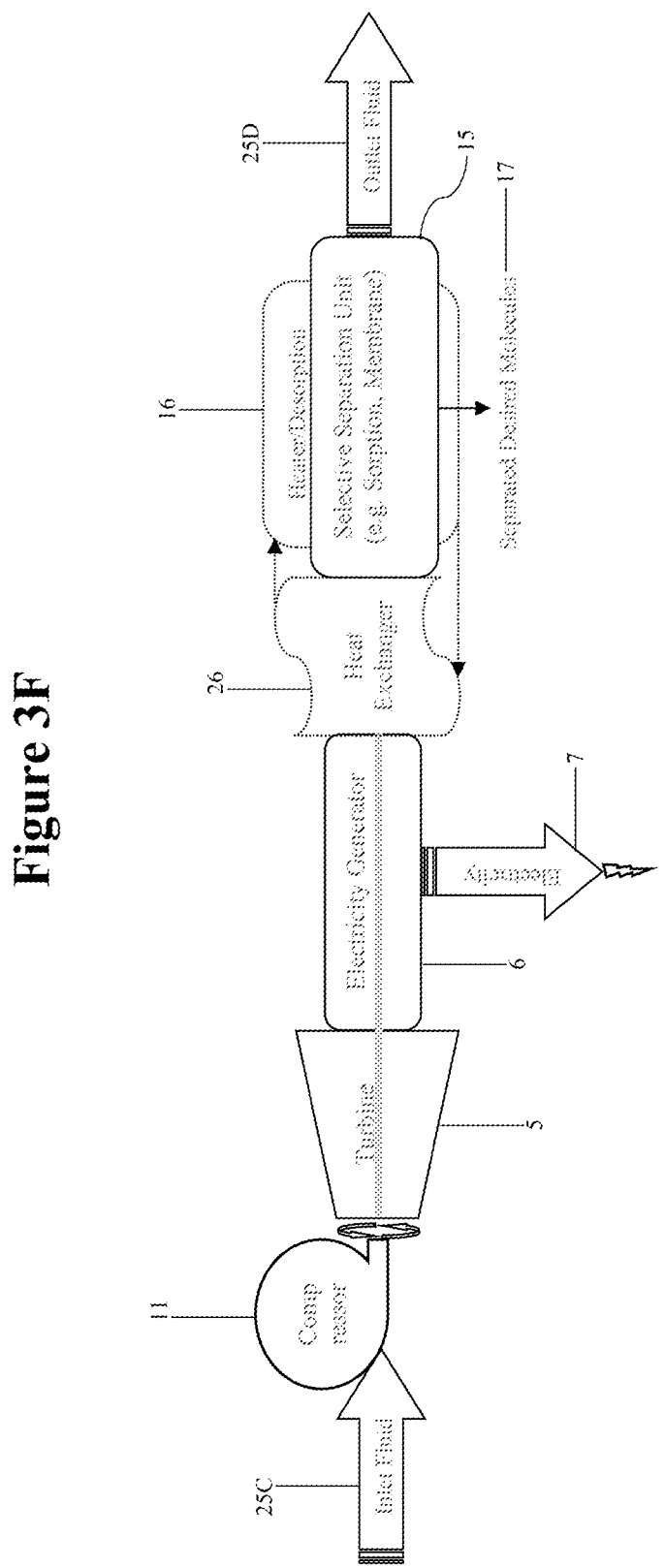
FIG. 3F is a schematic illustration of a fourth variation of the integrated green energy and selective molecular separation system of FIG. 3A, according to an embodiment.

FIG. 3F is a schematic illustration of a fourth variation of the integrated grant energy and selective molecular separation system of FIG. 3A. The integrated system of FIG. 3F is similar to the integrated systems of FIG. 3D, and includes the compressor 11 before the turbine 5. As discussed above, the compressor 11 increases the pressure of the inlet fluid 25C, which increases the kinetic energy of the inlet fluid 25C. The increased kinetic energy of the inlet fluid 25C drives the turbine 5 with greater force, which in turn drives the electrical generator 6 faster to produce more electricity 7. The remaining component parts identified with the same reference numerals in FIGS. 3D and 3F may be the same and operate in the same, manner as discussed above.

Figure 3G:
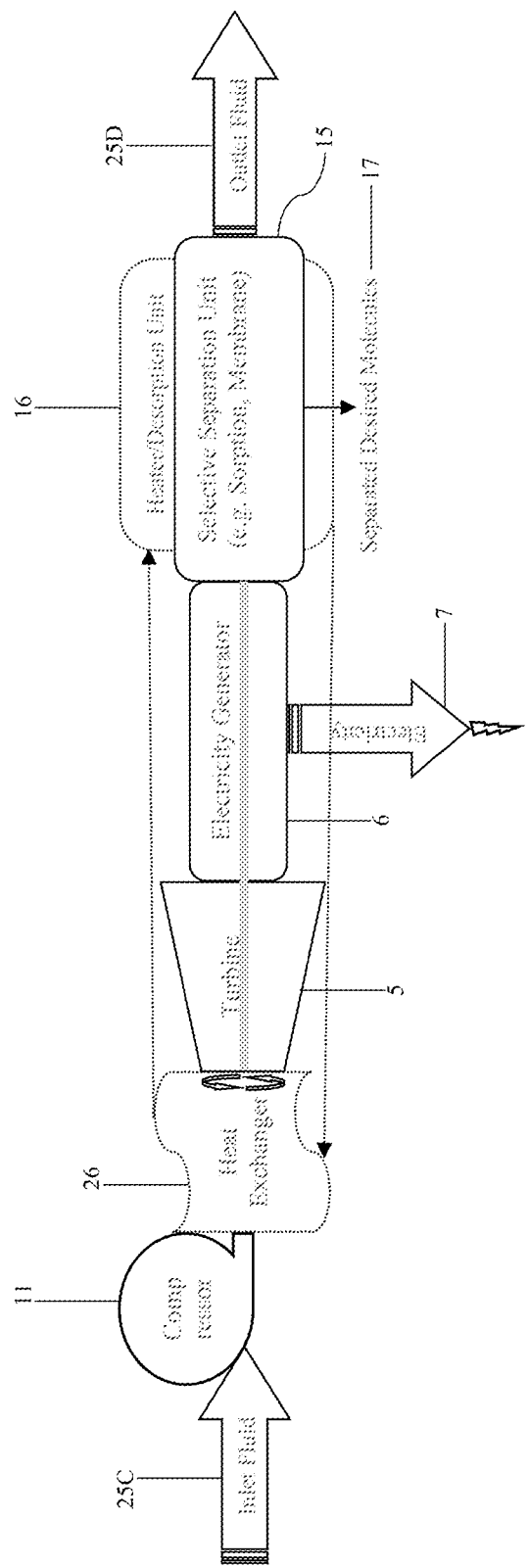
FIG. 3G is a schematic illustration of a fifth variation of the integrated green energy and selective molecular separation system of FIG. 3A, according to an embodiment.

FIG. 3G is a schematic illustration of a fifth variation of the integrated green energy and selective molecular separation system of FIG. 3A. The integrated system of FIG. 3G is similar to the integrated system of FIG. 3F, but relocates the heat exchanger 26 to be provided between the compressor 11 and the turbine 5. The compressor 11 may increase the pressure of the inlet fluid 25C before entering the heat exchanger 26. The remaining component parts identified with the same reference numerals in FIGS. 3F and 3G may be the same and operate in the same manner as discussed above.

Figure 3H:
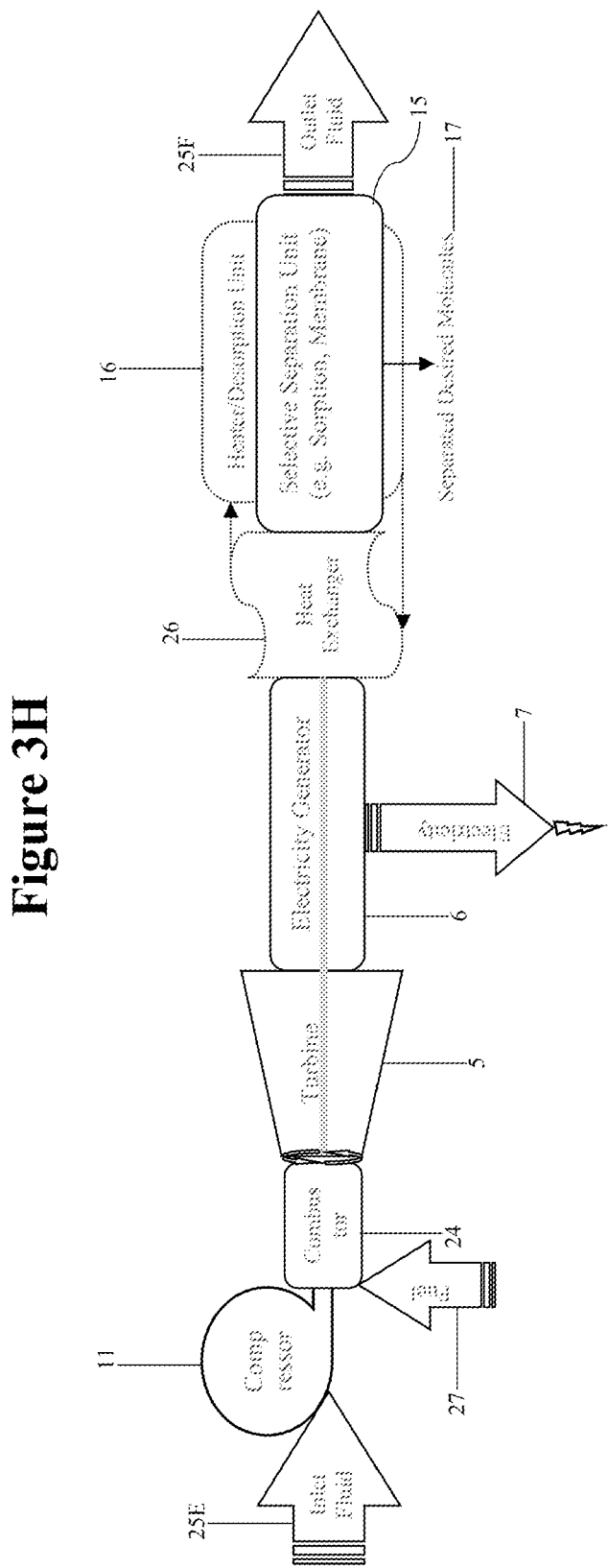
FIG. 3H is a schematic illustration of a first variation of the integrated green energy and selective molecular separation system of FIG. 3C, according to an embodiment.

FIG. 3H is a schematic illustration of a first variation of the integrated green energy and selective molecular separation system of FIG. 3C. The integrated system of FIG. 3H is similar to the integrated system of FIG. 3F and includes a combustor 24 between the compressor 11 and the turbine 5. In some embodiments, the combustor 24 may be part of an engine or a gas turbine. The inlet fluid 25E (which may be the same as the inlet fluid discussed above) may be compressed by the compressor 11 before entering the combustor 24. The compressor 11 may be a pump when the inlet fluid 25C is a liquid. As discussed above, the compressor 11 increases the pressure of the inlet fluid 25E, which increases the kinetic energy of the inlet fluid 25E. The combustor 24 may include an ignition source, such as a flame or a spark, and receive the compressed inlet fluid 25E along with a fuel 27. The ignition source may ignite the fuel 27 in the combustor 24 to produce a combusted inlet fluid that has a greater thermal and/or kinetic energy than the inlet fluid 25E. The greater thermal and/or kinetic energy combusted inlet fluid is used to drive the turbine 5 with a greater force than a non-combusted inlet fluid. The greater force in turn drives the electrical generator 6 faster to produce more electricity 7, as discussed above. In addition, the integrated system of FIG. 3H includes the heat exchanger 26 as in FIG. 3F. The remaining component parts identified with the same reference numerals in FIGS. 3H and 3F may be the same and operate in the same manner as discussed above.

Figure 3I:
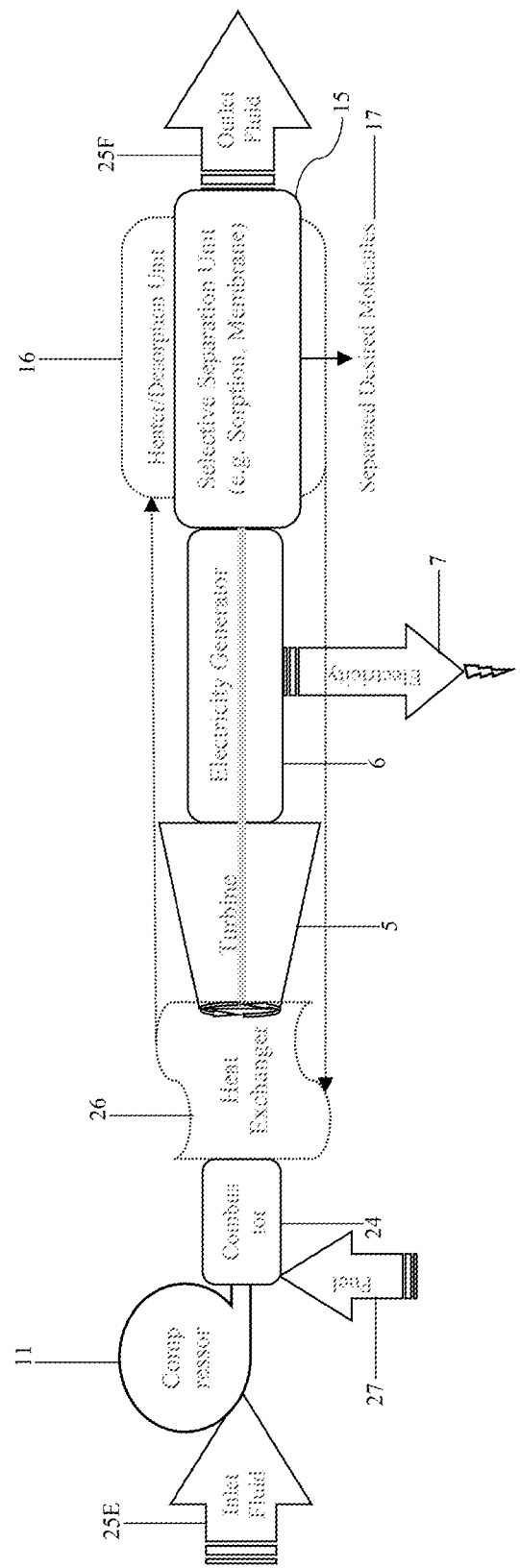
FIG. 3I is a schematic illustration of a second variation of the integrated green energy and selective molecular separation system of FIG. 3C, according to an embodiment.

FIG. 3I is a schematic illustration of a second variation of the integrated green energy and selective molecular separation system of FIG. 3C. The integrated system of FIG. 3I is similar to the integrated system of FIG. 3H, but relocates the heat exchanger 26 to be provided between the combustor 24 and the turbine 5. As discussed above, the combustor 24 produces a combusted inlet fluid that has a greater thermal and/or kinetic energy than the inlet fluid 25E. The greater thermal and/or kinetic energy combusted inlet fluid provides greater thermal energy to the heat exchanger 26. The greater thermal energy may enhance the desorption process of the separated predetermined molecules in the desorption unit 16 by providing greater heat to capture the predetermined molecules, such as carbon dioxide ($CO_2$), carbon monoxide (CO), and nitrogen oxides ($NO_x$) from the sorbent and/or molecular sieve membrane as discussed above. The remaining component parts identified with the same reference numerals in FIGS. 3H and 3I may be the same and operate in the same manner as discussed above.

Figure 3J:
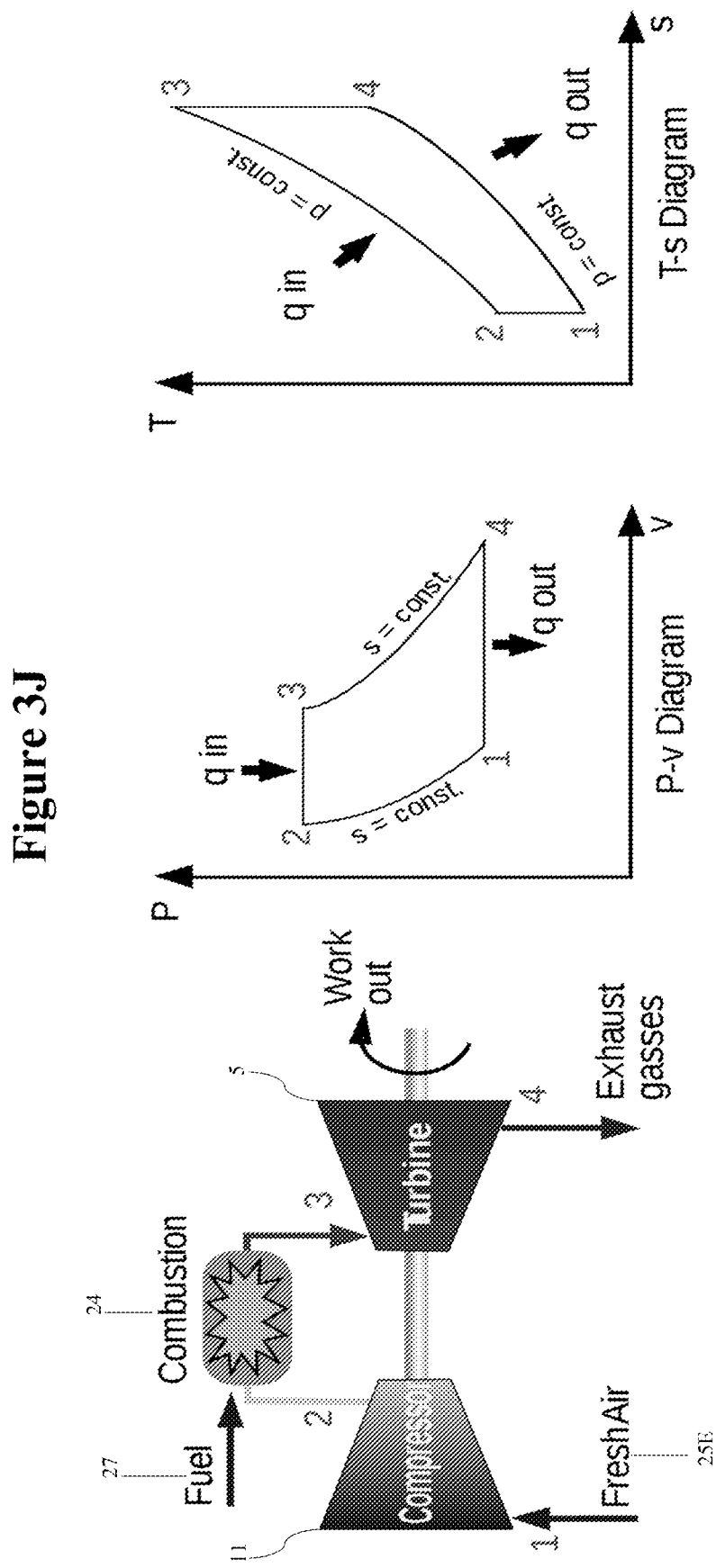
FIG. 3J illustrates a combustion process (i.e., Brayton Cycle) that may occur in an integrated green energy and selective molecular separation system, according to an embodiment, and illustrates corresponding graphs.

It is noted that the integrated green energy and selective molecular separation systems of FIGS. 3C, 3H and 3I, which use the combustor 24, may implement the thermodynamic Brayton Cycle, and may be part of or integrated with an engine or a gas turbine. FIG. 3J illustrates one embodiment of a combustion process that may occur in the integrated systems of FIGS. 3C, 3H and 3I. In Step 1, inlet air 25E is received into the compressor 11, which increases the pressure of the inlet fluid 25E. The increased pressure increases the thermal and kinetic energy of the inlet fluid 25E. In Step 2, the compressed inlet air 25E is conveyed to the combustor 24. A combustible fuel 7 is also fed into the combustor 24. The combustor 24 may include an ignition source, such as a flame or a spark, which ignites the fuel 27 in the combustor 24 to produce a combusted inlet fluid that has a greater thermal and/or kinetic energy than the inlet fluid 25E. In Step 3, the combusted inlet fluid is convoyed turbine 5 to drive the turbine 5 to produce work (e.g., to rotate the shaft of the turbine 5). In Step 4, exhaust gases from the combusted fluid exiting turbine 5 may be directed to the separation portion 15. FIG. 3J further illustrates two graphs showing that the combustion process follows a standard thermodynamic Brayton Cycle. The first graph plots how the pressure (P) and volume (V) of the inlet fluid 25E changes in Steps 1 to 4. The second graph plots how the temperature (T) and entropy (S) of the inlet fluid 25E changes in Steps 1 to 4.

FIG. 3K is an exemplary implementation of an integrated green energy and selective molecular separation system of FIGS. 3A, 3B and 3C in a jet engine, according to an embodiment. The jet engine may include several components akin to the green energy portion of the integrated system in FIG. 3C. For instance, the jet engine may include a compressor 11, a combustor 24 and turbine 5. The inlet fluid 25E may be polluted atmospheric air from the surrounding environment and/or heat. The heat may be derived from: gas flares resulting from the burning of natural gas associated with oil extraction; exhaust fumes; and combustion. The inlet fluid 25E may be compressed by the compressor 11 before entering the combustor 24. The compressor 11 increases the pressure of the inlet fluid 25E, which increases the kinetic energy of the inlet fluid 25E. The combustor 24 includes an ignition source, such as a flame or a spark, and receives the compressed inlet fluid 25E along with a fuel (see FIG. 3J). The ignition source may ignite the fuel in the combustor 24 to produce a combusted inlet fluid that drives the turbine 5. The jet engine may be equipped with an electricity generator 6 that is driven by the turbine 5 to generate electricity 7, as discussed above. And, the jet engine may be equipped with a selective molecular separation unit 15 and an electrical heater in a desorption unit 16. The electricity 7 can be used to power the compressor 11 and the electrical heater, and/or other components of the aircraft having the jet engine. In addition, the electricity 7 may be stored in storage device (not shown) for future use in an electrical and for commercial distribution and use, as discussed above.

After exiting the turbine 5, the inlet fluid enters the selective molecular separation unit 15 to perform a sorption discussed above. The electrical heater in the desorption unit 16 may be used to perform a desorption process discussed above via the electrical heater. After desorption, the captured predetermined molecules (greenhouses gas (carbon dioxide ($CO_2$)), carbon monoxide (CO), and nitrogen oxides ($NO_x$)) can be stored 17 in a storage unit (not shown). The other molecules, such as oxygen ($O_2$) and nitrogen ($N_2$), which have been separated from the predetermined molecules of the inlet fluid 25E may be released from the jet engine as outlet fluid 25F into the surrounding environment.

FIG. 4 is an embodiment of an absorption and a desorption process that may occur in the integrated green energy and selective molecular separation systems discussed above. As discussed above, the absorption process occurs in the separation portion 15 of the selective molecular separation unit 9, 15, 16, and the desorption process occurs in the desorption unit 16. In the absorption process, one or more vessels may contain a liquid absorbent material, such as, for example, ethanol amine, mono ethanol amine (MEA), di ethanol amine (DEA), methyl di ethanol amine (MDEA) and tetra ethylene pent-amine (TEPA). Other liquid absorbent materials not listed here are encompassed within the scope of the present disclosure. An inlet fluid containing the predetermined molecules, such as greenhouse gas, is passed through the liquid absorbent in the vessels in which the predetermined molecules, such as carbon dioxide ($CO_2$), carbon monoxide (CO), and nitrogen oxides ($NO_x$), of the greenhouse gases are absorbed by the liquid absorbent in a chemical process. Absorption of the predetermined molecules, such as greenhouse gas (carbon dioxide ($CO_2$)), carbon monoxide (CO), and nitrogen oxides ($NO_x$) by the liquid absorbent separates the predetermined molecules from other molecules of the inlet fluid which are not absorbed by the liquid absorbent. The other molecules, such as oxygen ($O_2$) and nitrogen ($N_2$), which have been separated from the predetermined molecules in the inlet fluid and which do not constituted greenhouse gas may exit the vessels to be released as outlet fluid into the surrounding environment, e.g., such as atmospheric air.

FIG. 4 further shows that the desorption process uses thermal energy to break a bond between the separated predetermined molecule (e.g., carbon dioxide ($CO_2$), carbon monoxide (CO), and nitrogen oxides ($NO_x$)) and the absorbent material. The thermal energy used in the desorption process comes from the green energy portion of the integrated system, and in FIG. 4 is used to capture the predetermined molecules contained in the liquid absorbent material. The liquid absorbent material may be desorbed in the same vessel used in the absorption process, or may be transferred to another vessel for the desorption process. As discussed above, when only one vessel is used, the sorption, and desorption processes are implemented in an alternating sequential intervals. That is, the one vessel accommodates the sorption process in one interval without heat in the desorption process, and in the next interval is heated in the desorption process without accommodating the sorption process. The intervals then repeat as a batch process. Alternatively, the one vessel may undergo both the sorption and desorption process at the same time. When two or more vessels or a set of several vessels are used, the vessels may alternate undergoing the absorption and desorption process. That is, one vessel may accommodate the absorption process while the other vessel undergoes the desorption process. After a predetermined amount of time, the one vessel undergoes the desorption process while the other vessel accommodates the absorption process. In this manner, a continuous absorption and desorption process may occur.

Figure 5A:
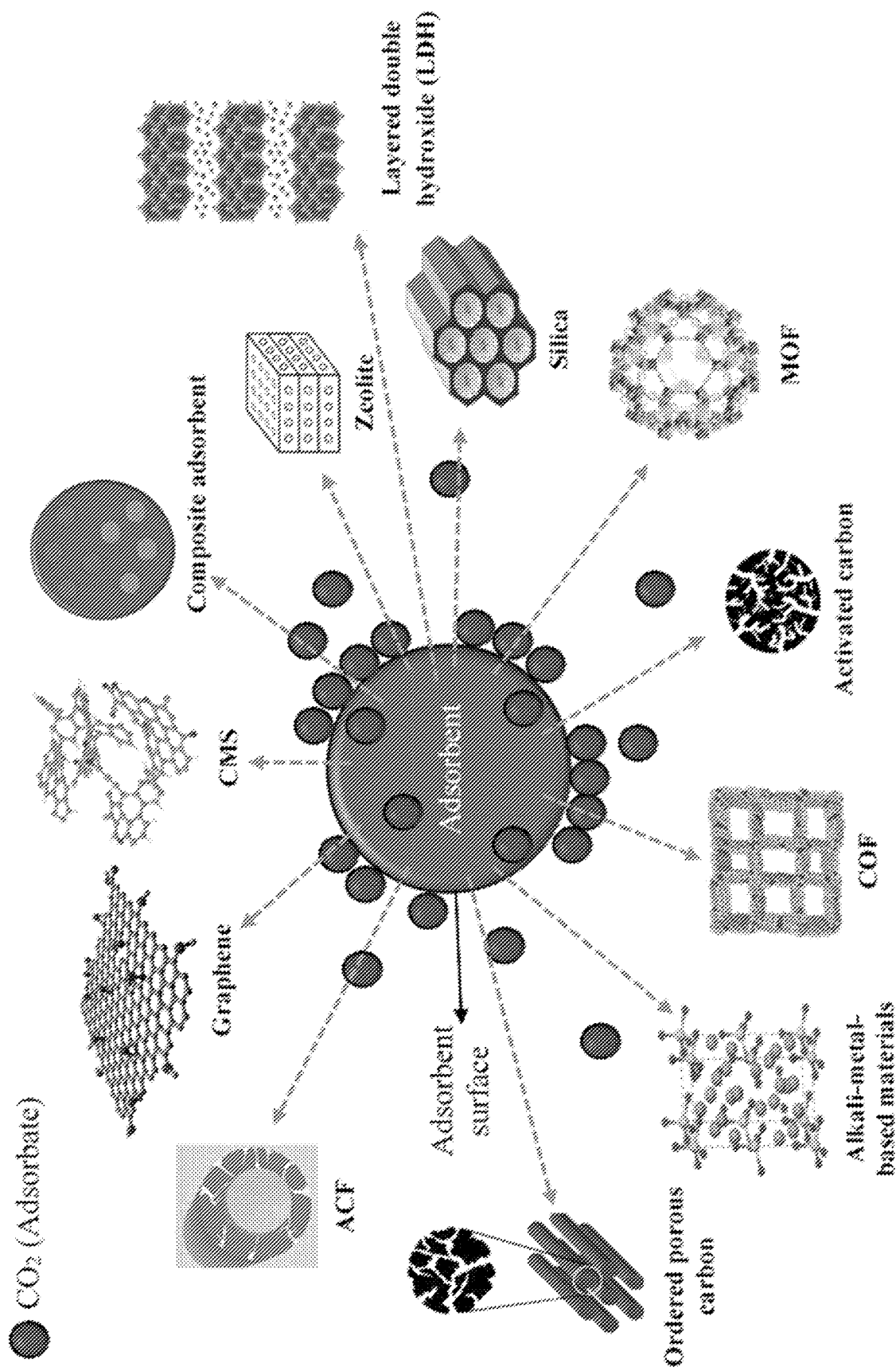
FIG. 5A shows several types of solid adsorbent materials that may be used in an adsorption process of an integrated green energy and selective molecular separation system, according to an embodiment.

FIG. 5A shows embodiments of several types of solid adsorbent materials that may be used in an adsorption process of an integrated green energy and selective molecular separation system. As discussed above, the solid adsorbent material may be one or more of: Zeolite, Layered double hydroxide (LDH), Silica, Metal-organic framework (MOF), Activated carbon, Activated carbon fibers (ACF), DOF, Alkali-metal-based materials, ordered porous carbon, Graphene, Carbon molecular sieves (CMS), and combinations thereof (see FIG. 5A).

Figure 5B:
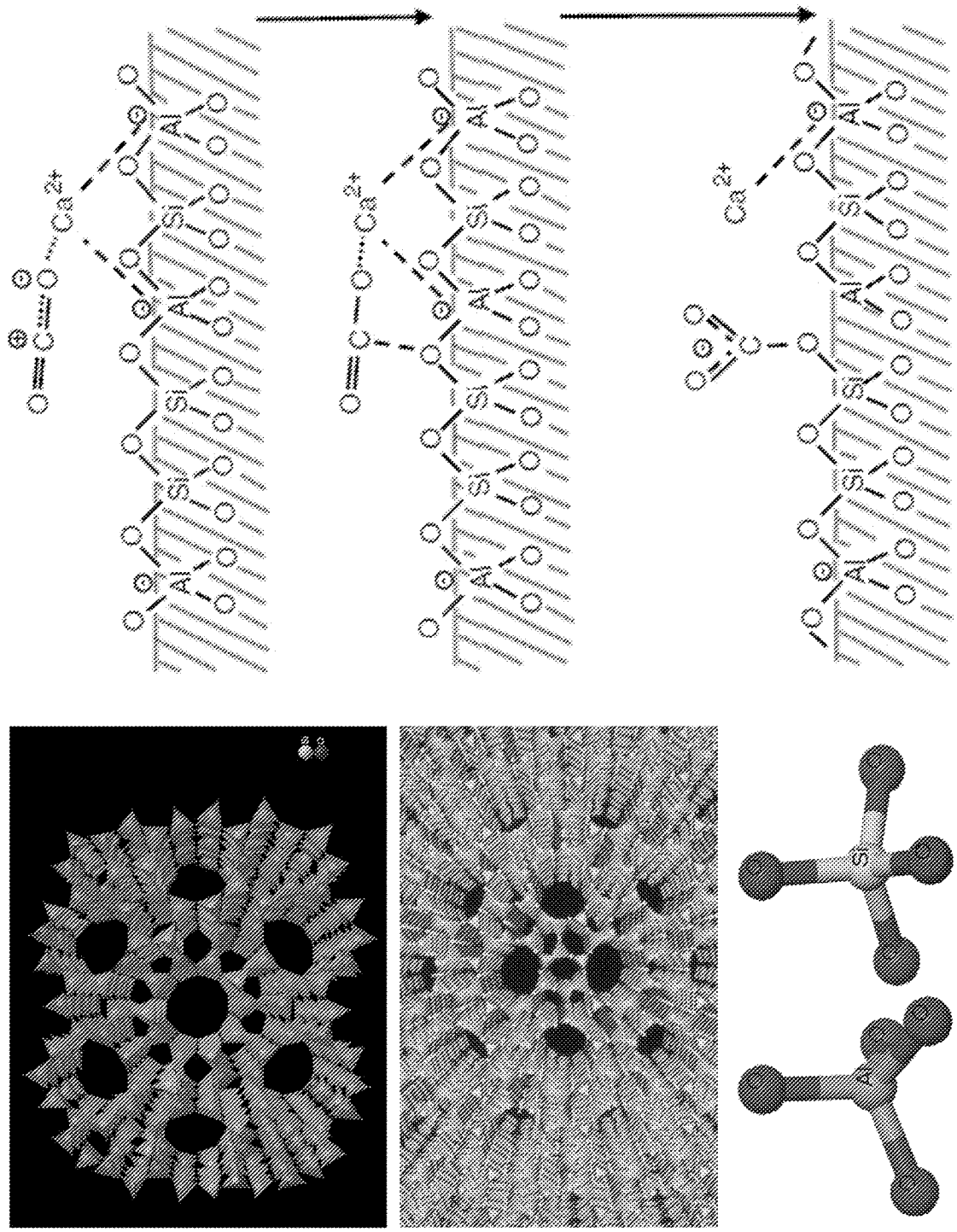
FIG. 5B illustrates one example of an adsorption process using an adsorbent material that may occur in an integrated green energy and selective molecular separation system, according to an embodiment.

FIG. 5B illustrates an embodiment of an adsorption process using an adsorbent material that may occur in an integrated green energy and selective molecular separation system. In the embodiment, Zeolite is the adsorbent material and is impregnated with some cations such as Calcium ($Ca^{2+}$). The Calcium ($Ca^{2+}$) cations attract carbon dioxide ($CO_2$) molecules of the predetermined greenhouse gas molecules. The attraction of the carbon dioxide ($CO_2$) molecules to the Calcium ($Ca^{2+}$) molecules causes the carbon dioxide molecules ($CO_2$) to attach to the oxygen atoms of the aluminate ($AlO_4$) and Silicate ($SiO_4$) and thus be captured by the impregnated Zeolite.

Figure 5C:
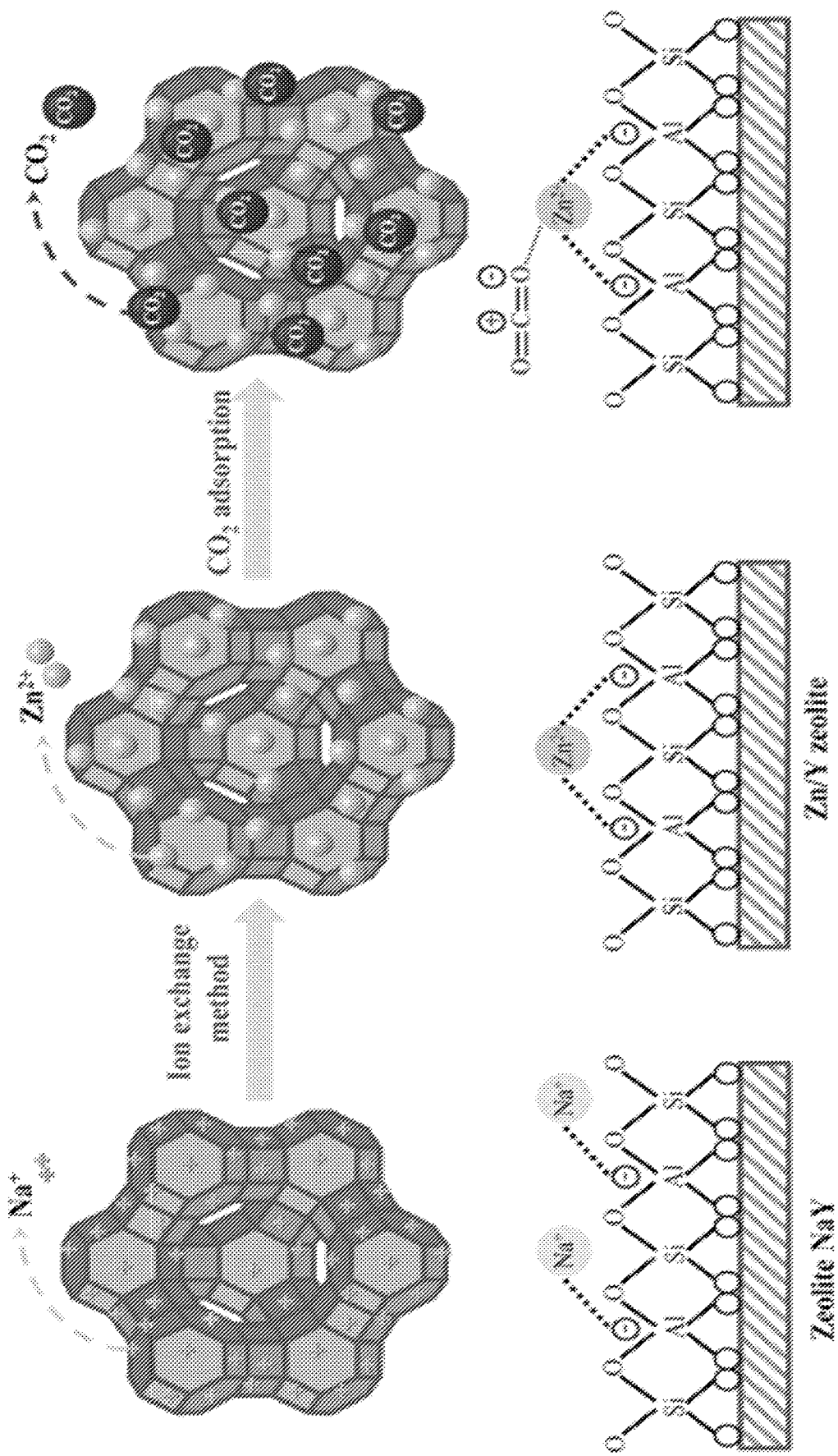
FIG. 5C illustrates another example of an adsorption process that may occur in an integrated green energy and selective molecular separation system, according to an embodiment.

FIG. 5C illustrates another embodiment of an adsorption process using an adsorbent material that may occur in an integrated green energy and selective molecular separation system. In this embodiment, the Zeolite, as the adsorbent material, is impregnated with either Sodium ($Na^+$) or Zinc ($Zn^{2+}$) cations. The Sodium ($Na^+$) or Zinc ($Zn^{2+}$) cations attract carbon dioxide ($CO_2$) molecules of the predetermined greenhouse gas molecules. The attraction of the carbon dioxide ($CO_2$) molecules to the Sodium ($Na^+$) or Zinc ($Zn^{2+}$) cations causes the carbon dioxide molecules ($CO_2$) to attach to the oxygen atoms of the aluminate ($AlO_4$) and Silicate ($SiO_4$) and thus be captured by the impregnated Zeolite.

Figure 5D:
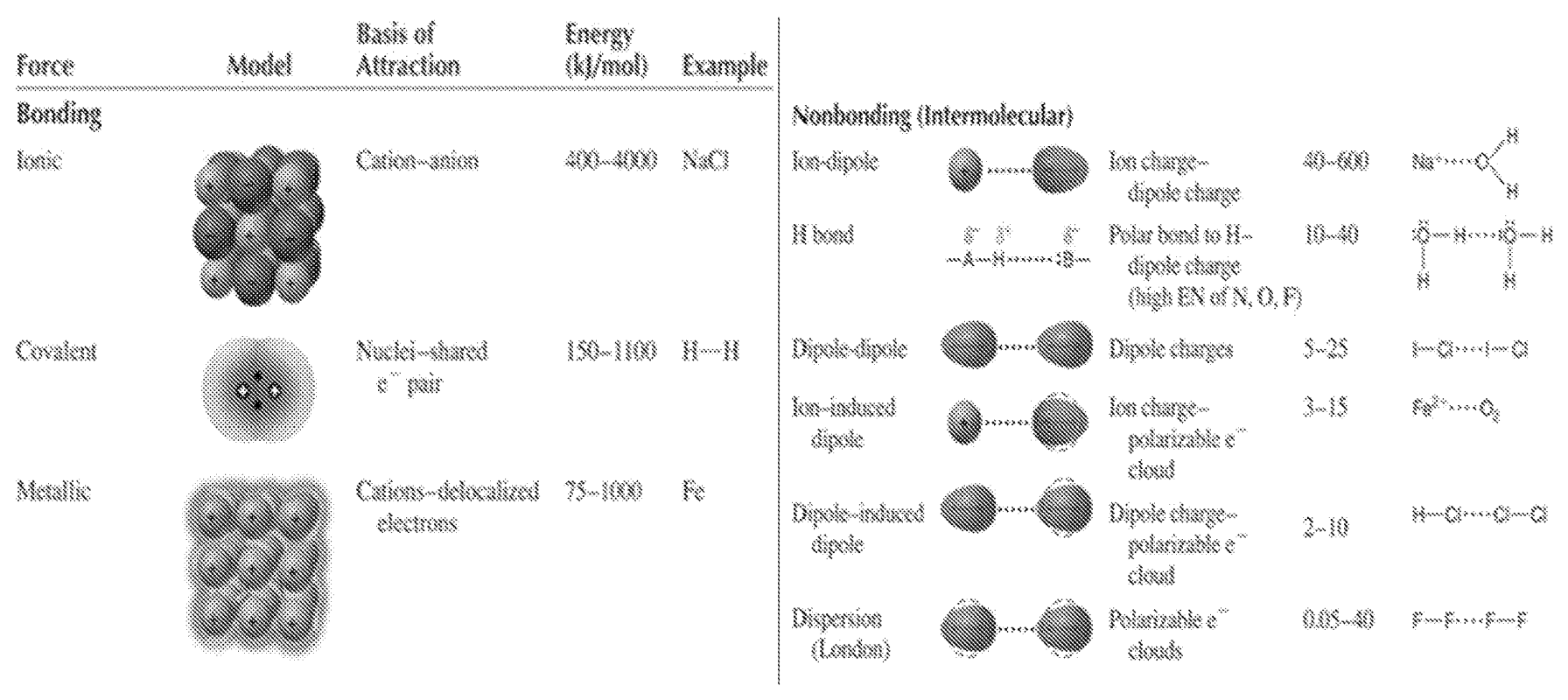

FIG. 5D illustrates different types of molecular bonding that may occur in an integrated green energy and selective molecular separation system. The desorption process in the desorption unit 16 uses heat to break the bond, as discussed above. The bonding may be ionic bonding of the predetermined molecules using a cation-anion attraction method, for example Sodium Chloride (NaCl). In another example, the bonding may be covalent bonding of the predetermined molecules using a nuclei-shared electron attraction method, for example Hydrogen ($H_2$). In a further example, the bonding may be a metallic bonding of the predetermined molecules using a cations-delocalized electron attraction method, for example iron (Fe). Intermolecular (non-bonding) methods as shown in FIG. 5D may also be used and are encompassed within the scope of the present disclosure.

FIG. 6 illustrates an embodiment of an adsorption process using a solid adsorbent material that may occur in the selective molecular separation unit 15, and illustrates an embodiment of a desorption process of the solid adsorbent material using the heater of the desorption 16 discussed above. While the illustrated example shows that a solid adsorbent material is used in the processes, a molecular membrane(s) with the sorbent materials discussed above impregnated or grafted in the molecular membrane(s) may also be used or used in combination with the solid adsorbent material. In such a case, the impregnated or grafted in the molecular membrane(s) can be also subjected to a desorption process. In the embodiment of FIG. 6, ambient air as the inlet fluid may enter a container that includes the solid adsorbent material therein. In the embodiment, the solid adsorbent material may have a planar structure. While only one solid adsorbent material is illustrated in the figure, the container may have multiple solid adsorbent materials provided in series along a flow path of the ambient air. The ambient air may contain predetermined molecules, such as greenhouse gas (carbon dioxide ($CO_2$)), carbon monoxide (CO) and nitrogen oxide ($NO_x$) molecules. For simplicity, FIG. 6 only shows the carbon dioxide ($CO_2$) molecules in the ambient air. As the ambient air in the container passes through the solid adsorbent material, predetermined molecules such as carbon dioxide ($CO_2$) are adsorbed and chemically bonded to the surface of the solid adsorbent material, while other molecules, such as oxygen ($O_2$) and nitrogen ($N_2$) pass through the solid adsorbent material. The solid adsorbent material thus physically and/or chemically separates the predetermined molecules of greenhouse gases (e.g., carbon dioxide ($CO_2$)) from the other molecules of the surrounding environment.

Once the solid adsorbent material is saturated with the predetermined molecules such as greenhouse gas, the solid adsorbent material may be heated to, e.g., approximately 100 degrees Celsius in a desorption process to capture the predetermined molecules (e.g., greenhouse gas) from the solid adsorbent material, and regenerate or recycle the solid adsorbent material. As discussed above the desorption process uses thermal energy (e.g., heat) to break a bond between the separated predetermined molecule (e.g., carbon dioxide ($CO_2$), carbon monoxide (CO), and nitrogen oxides ($NO_X$)) and the solid adsorbent material. As discussed above, the thermal energy used in the desorption process comes from the green energy portion of the integrated systems discussed herein. The predetermined molecules captured from the adsorbent material can be collected and conveyed to a storage container as shown in FIG. 6 for further usage.

Figure 7:
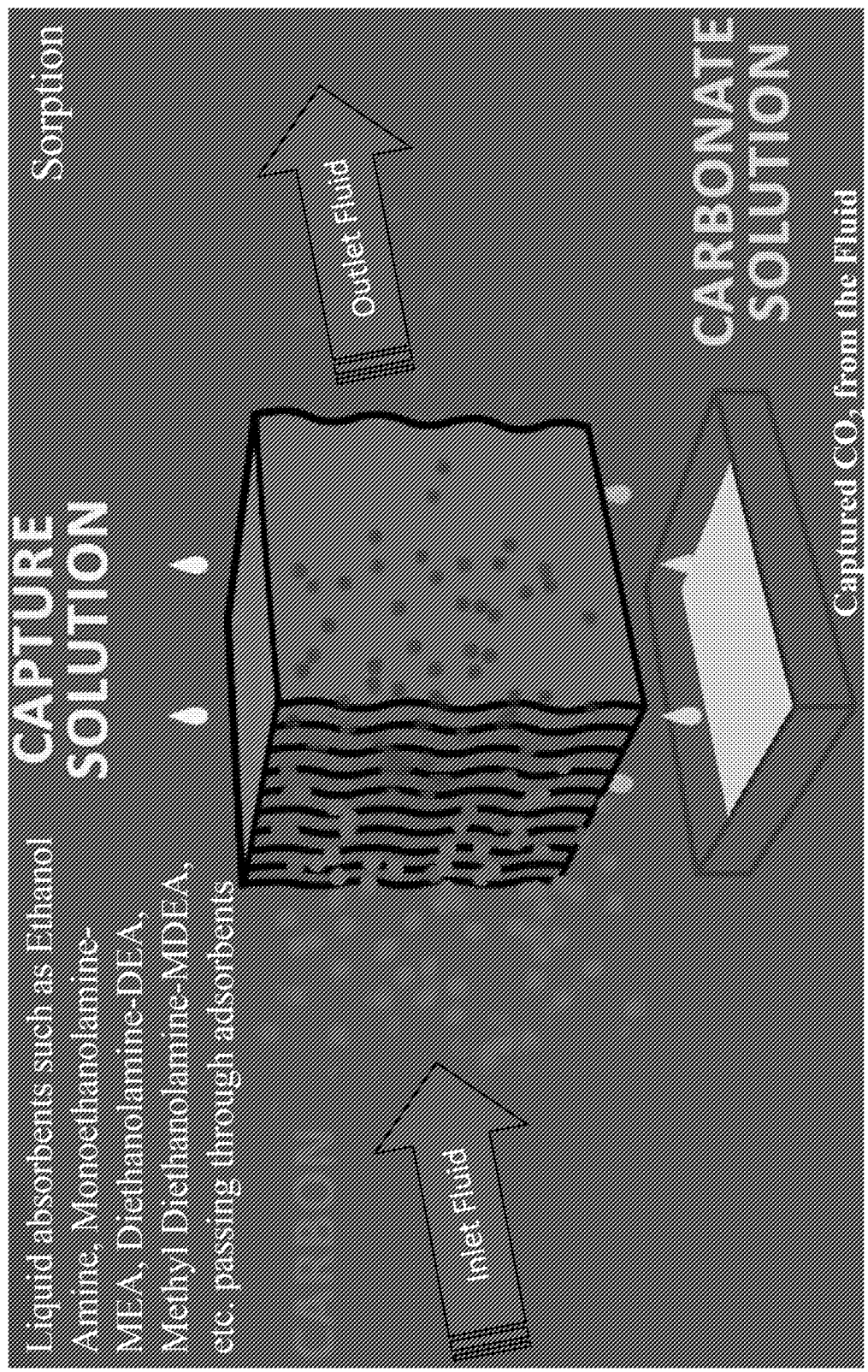
FIG. 7 illustrates an example of a sorption process in which one or more liquid absorbents are passed through one or more solid adsorbent materials that may occur in an integrated green energy and selective molecular separation system, according to an embodiment.

FIG. 7 illustrates an example of a sorption process in which one or more liquid absorbents are passed through one or more solid adsorbent materials that may occur in an integrated green energy and selective molecular separation system. In the embodiment, the sorption process uses a combination of liquid absorbents and solid adsorbent materials to separate the predetermined molecules, such as greenhouse gas (carbon dioxide ($CO_2$)), carbon monoxide (CO), hydrogen sulfide ($H_2S$), and nitrogen oxides ($NO_X$), from the inlet fluid. The liquid absorbent material may be, for example, ethanol amine, mono ethanol amine (MEA), di ethanol ammo (DEA), methyl di ethanol amine (MDEA) and tetra ethylene pent-amine (TEPA), as discussed above. Other liquid absorbent materials not listed here are encompassed within the scope of the present disclosure. The liquid absorbent material, indicated in FIG. 7 with drops of liquid, is passed through a solid adsorbent material. The solid adsorbent material may include molecular membranes such as discussed above, and/or adsorbents such as Zeolite, Layered double hydroxide (LDH), Silica, Metal-organic framework (MOF), Activated carbon, Activated carbon fibers (ACF), DOF, Alkali-metal-based materials, ordered porous carbon, Graphene, Carbon molecular sieves (CMS), and/or combinations thereof (see FIG. 5A). Other solid adsorbent materials not listed here are encompassed within the scope of the present disclosure.

When the inlet fluid containing the predetermined molecules, such as greenhouse gas (carbon dioxide ($CO_2$)), carbon monoxide CO), hydrogen sulfide ($H_2S$), and nitrogen oxides ($NO_X$), discussed herein passes through the solid adsorbent material, the predetermined molecules are adsorbed by the solid adsorbent material and absorbed by the liquid absorbent material. That is, the predetermined molecules are separated from other molecules of the inlet fluid by both an adsorption and an absorption process. The inlet fluid passes through the combined absorbent/adsorbent material as outlet fluid that is free of the predetermined molecules, such as greenhouse gas (carbon dioxide ($CO_2$)), carbon monoxide (CO), hydrogen sulfide ($H_2S$), and nitrogen oxides ($NO_X$). The separated predetermined molecules (e.g., carbon dioxide ($CO_2$), carbon monoxide (CO), hydrogen sulfide ($H_2S$), and nitrogen oxides ($NO_X$)) can then undergo a desorption process as discussed herein.

Figure 8:
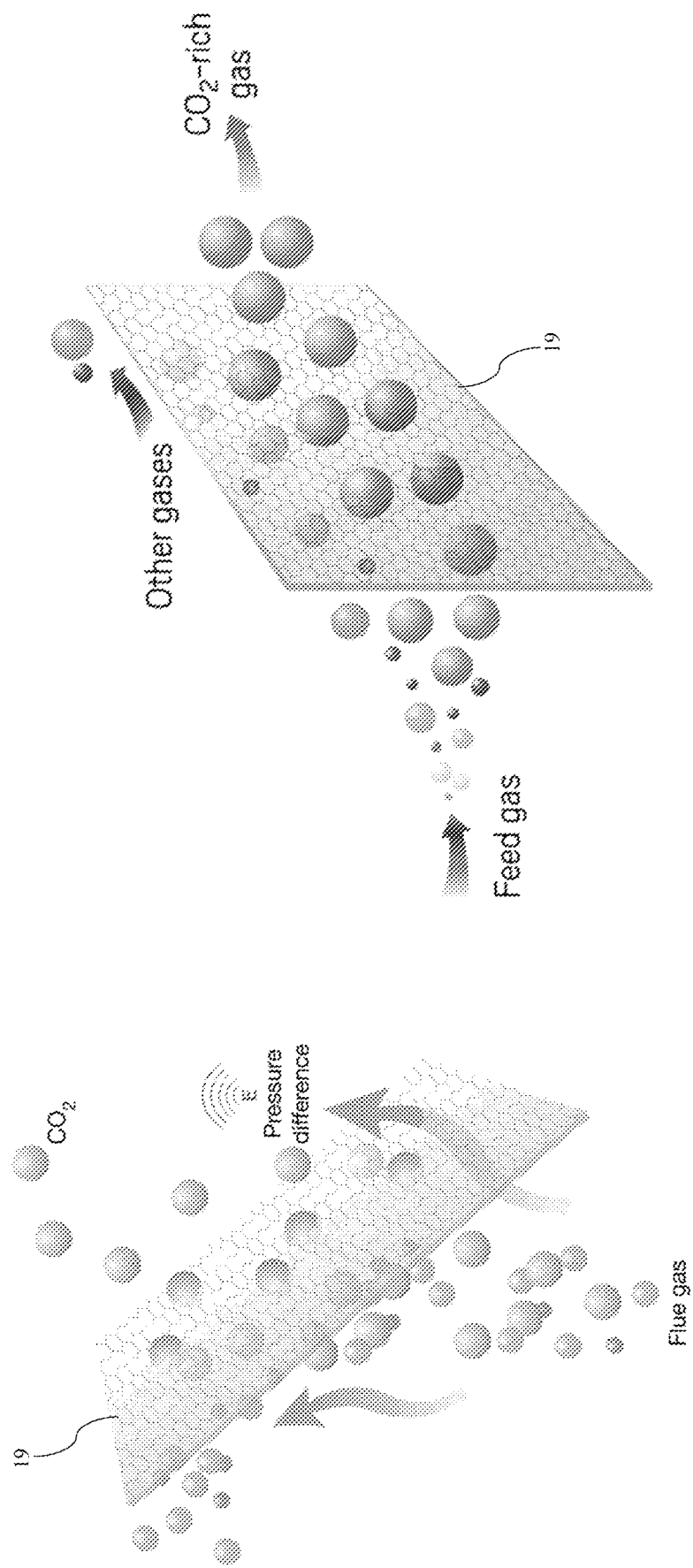
FIG. 8 illustrates examples of a separation process using a molecular sieve membrane that may occur in an integrated green energy and selective molecular separation system, according to an embodiment.

FIG. 8 illustrates embodiments of a separation process using a molecular sieve membrane 19 that may occur in an integrated green energy and selective molecular separation system. The molecular membranes 19 shown in FIG. 8 may be used to separate predetermined molecules from inlet fluid (e.g. flue gas or feed gas). In either case, the molecular sieve membranes 19 filter the gas to physically separate larger molecules from smaller molecules. For example, the membrane(s) 19 may physically separate larger oxygen ($O_2$) and nitrogen ($N_2$) molecules from the smaller carbon dioxide ($CO_2$) molecule. The membrane(s) 19 may have microscopic apertures that are sized to allow only the selected carbon dioxide ($CO_2$) molecules, carbon monoxide (CO) molecules, hydrogen sulfide ($H_2S$), and nitrogen oxide ($NO_X$) molecules to pass through, while the other inlet fluid molecules 13, such as oxygen ($O_2$) and nitrogen ($N_2$) molecules, are deflected and subsequently be directed to, e.g., an outlet of the selective molecular separation unit 9, 15, 16 as outlet fluid 14, and released back into the atmosphere (surrounding environment). In the integrated green energy and selective molecular separation systems discussed above, the smaller carbon dioxide ($CO_2$) molecules may then pass through one or more additional molecular sieve membranes 19 for further separation from larger oxygen ($O_2$) and nitrogen ($N_2$) molecules. In order to enhance the separation (filtration) process, one of the sorbent materials discussed above may be impregnated or grafted in the molecular sieve membrane(s).

Figure 9A:
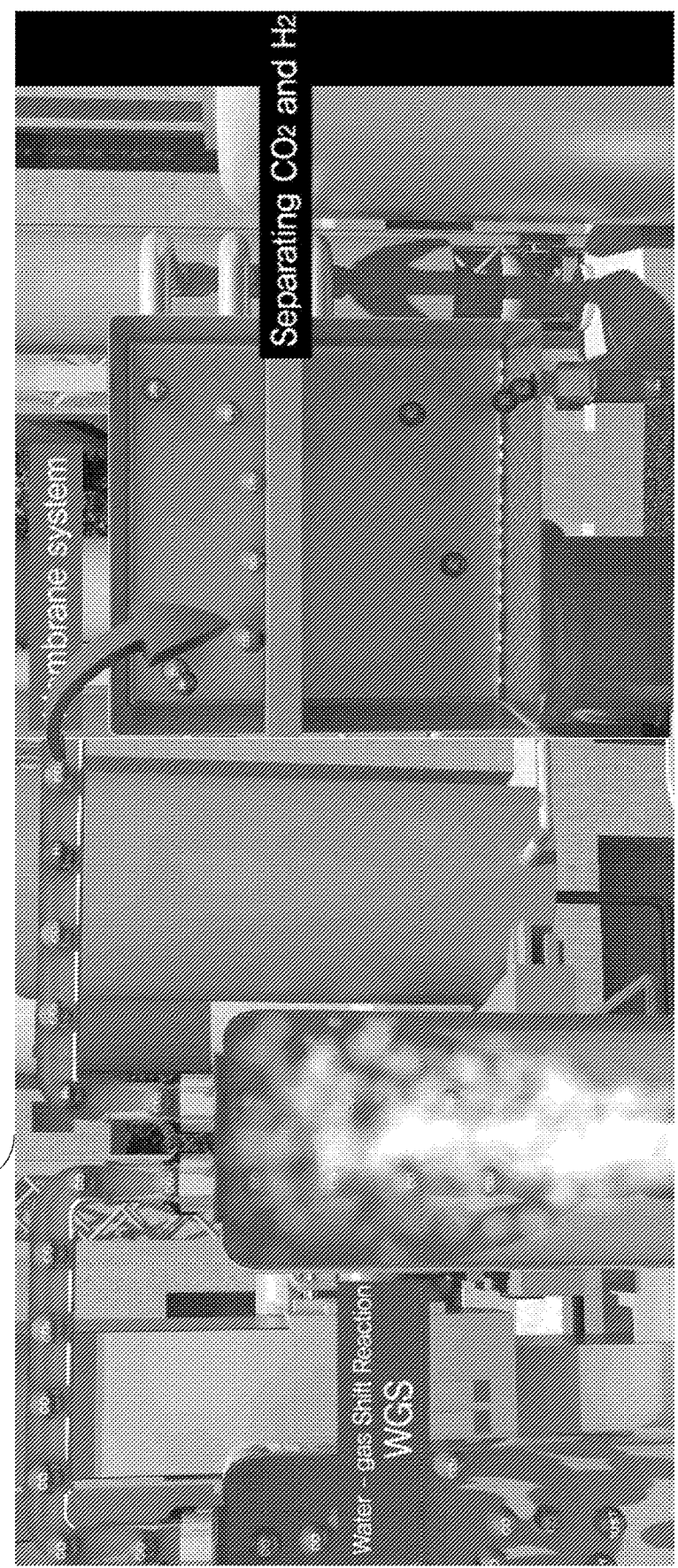
FIG. 9A illustrates an example of generating carbon dioxide molecule ($CO_2$) by mixing a water ($H_2O$) molecule with a carbon monoxide (CO) molecule in an integrated green energy and selective molecular separation system, according to an embodiment.

FIG. 9A illustrates an embodiment of a mixing water ($H_2O$) molecules with carbon monoxide (CO) molecules in an integrated green energy and selective molecular separation system, according to an embodiment. This process may be implemented by the carbon monoxide (CO) reduction unit 22. As discussed above, water ($H_2O$) molecules may be added to carbon monoxide (CO) molecules to produce chemically carbon dioxide ($CO_2$) molecules and hydrogen ($H_2$) molecules. The mixture may then pass through a molecular sieve membrane to separate hydrogen ($H_2$) molecules and carbon dioxide ($CO_2$) molecules. The water ($H_2O$) molecules may be fed from a source outside the carbon monoxide (CO) reduction unit 22 or may be derived from another component of the selective molecular separation unit 9, 15, 16, such as the selective catalytic reducer (SCR) 20. The hydrogen ($H_2$) molecules can be separated from the carbon dioxide ($CO_2$) molecules via a molecular sieve membrane and pass the carbon dioxide ($CO_2$) through the selective molecular separation unit 9, 15, 16. The carbon dioxide ($CO_2$) molecules can be conveyed from the desorption unit 16 of the selective molecular separation unit 9, 15, 16 for storage 17 in a storage tank (not shown) as discussed above.

Figure 9B:
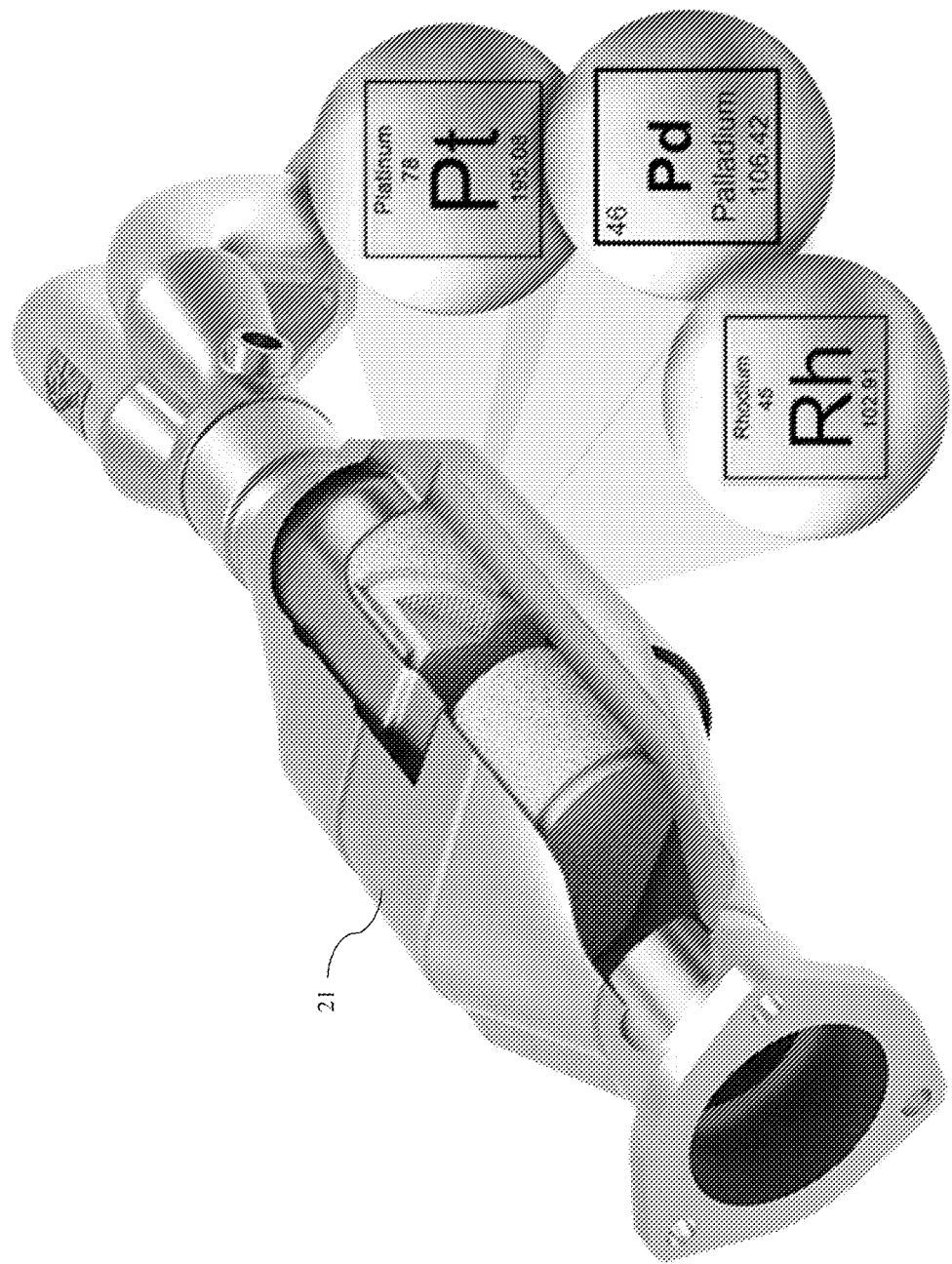
FIG. 9B illustrates an example of a catalytic converting unit to convert a carbon monoxide molecule (CO) to a carbon dioxide molecule ($CO_2$) that may be implemented in an integrated green energy and selective molecular separation system, according to an embodiment.

FIG. 9B illustrates an embodiment of the catalytic converting unit (DOC) 21 that may be implemented in an integrated green energy and selective molecular separation system. As discussed above, the catalytic converting unit (DOC) 21 may contain palladium and/or platinum, and/or rhodium. This unit converts particulate matter (PM), hydrocarbons (i.e., unburnt and partially burned fuel), and carbon monoxide (CO) to carbon dioxide ($CO_2$) and water ($H_2O$). The catalytic converting unit (DOC) 21 can therefore be used to reduce hydrocarbon and carbon monoxide from the surrounding environment. The oxidation of carbon monoxide to carbon dioxide may occur as follows: $2\ CO+O_2 \rightarrow 2\ CO_2$. The oxidation of hydrocarbons to carbon dioxide and water may occur as follows: $C_xH_{2x+2}+[(3x+1)/2]\ O_2 \rightarrow x\ CO_2+(x+1)\ H_2O$.

The foregoing integrated systems may be utilized in processes of generating electricity and selectively separating and capturing predetermined molecules present in a surrounding environment. The processes may include providing a kinetic energy working fluid derived from an energy source to drive a turbine 5 by rotating a shaft of the turbine 5 as discussed herein. An electricity generator 6 may be driven via rotation of the shaft of the turbine 5 to generate electricity 7 by electromagnetic induction as discussed herein. In the processes, at least one of (i) the kinetic energy fluid exiting the turbine 5 and (ii) electricity 7 generated by the generator 6 may be supplied to a selective molecular separation unit 9, 15, 16 as discussed herein. The processes further include intaking the predetermined molecules into the separation portion 15 of the selective molecular separation unit 9, 15, 16 and selectively separating at least one predetermined molecule from other molecules of the surrounding environment as discussed herein; and then capturing the at least one predetermined molecule via a desorption process of the at least one predetermined molecule in the desorption unit 16 of the selective molecular separation unit 9, 15, 16 using heat from thermal energy of at least one of (i) the kinetic energy fluid and (ii) an electrical heater powered by the electricity 7 generated by the generator 6 as discussed herein.

In the processes, at least one predetermined molecule is selectively separated via at least one of a sorption process and a molecular sieve membrane in the separation portion 15 of the selective molecular separation unit 9, 15, 16 as discussed herein. The desorption process in the desorption unit 16 regenerates at least one of a sorbent material used in the sorption process and the molecular sieve membrane as discussed herein. In the desorption process, the thermal energy is sufficient to break a bond between the separated predetermined molecule and at least one of the sorbent material and the molecular sieve membrane to regenerate the at least one of the sorbent material and the molecular sieve membrane for a next cycle of selective separation of another predetermined molecule of the surrounding environment as discussed herein. The sorption process in the separation portion 15 may utilize at least one of an absorption process and adsorption process as discussed herein. In addition the sorbent material may be impregnated or grafted in the molecular sieve membrane as discussed herein. The processes may also include storing 17 the at least one predetermined molecule in a storage unit after capturing the at least one predetermined molecule in the desorption process, as discussed herein. In the processes, the turbine 5 may be a windmill. As discussed herein, the energy source used in the processes may be at least one of: a combustion process which produces the kinetic energy fluid; a burning process which produces the kinetic energy fluid; and the surrounding environment including wind which produces the kinetic energy fluid. The combustion process may occur in one of an engine and a gas turbine as discussed herein. The burning process may occur in one of a flare, a water heater and a furnace as discussed herein.

Furthermore, in the processes of generating electricity and selectively separating and capturing predetermined molecules present in a surrounding environment, the heat may be generated via at least one of: (i) one or more of: a Rankine Cycle; a Carnot Cycle; a Brayton Cycle; a Diesel Engine Cycle, an Otto Cycle; an Ericsson Cycle; a Hygroscopic Cycle; a Scuderi Cycle; a Stirling Cycle; a Manson Cycle; a Stoddard Cycle; an Atkinson Cycle; a Humphrey Cycle; a Bell Coleman Cycle and a Lenoir Cycle; and (ii) the electrical heater powered by the generator in combination with the one or more Cycles in (i), as discussed herein.

It is within the scope of the present disclosure that the processes of generating electricity and selectively separating and capturing predetermined molecules present in a surrounding environment may implement any combinations of the components of the systems as discussed herein, and include operation of the systems discussed herein and any combinations of the components of the systems as discussed herein.

The present disclosure integrates an energy generation system/process with a greenhouse gas capturing system/process, which have conventionally been two separate and discrete systems/processes. The present disclosure provides an improvement over known systems and processes for generating green energy, and over known systems and processes for capturing greenhouse gases, because the present disclosure integrates different types of energy systems, such as thermal, solar, wind, combustion, and kinetic energy systems, with a selective molecular separation (e.g., greenhouse, gas capturing) system ("Green Energy Blue"). An important aspect of the integration is the utilization of the output (e.g., thermal energy) of the energy generating portion of the system in the selective molecular separation portion of the system, and the utilization of the output (e.g., a reduced temperature working fluid) of the selective molecular separation portion the energy generating portion. Each portion of the system utilizes the other to form one unitary system that produces green energy (i.e., electricity) while also separating and capturing predetermined molecules (e.g., greenhouse gas) from the surrounding environment. Moreover, the integrated green energy and selective molecular separation systems and processes discussed herein can generate electricity while removing greenhouse gas (carbon dioxide ($CO_2$) from the air with zero emissions. That is, the systems and processes discussed herein can generate electricity from any energy source (such as thermal, solar, wind, combustion, and kinetic energy) with zero emissions while at the same time capturing greenhouse gas (carbon dioxide ($CO_2$) in an integrated manner.

The present disclosure is thus an integrated solution to both reducing the production of fossil fuels and global warming ("Green Energy Blue"). Generating energy from the energy sources discussed above and incorporating such with a selective molecular separation unit (e.g., greenhouse gas capturing unit) can help preserve the Earth's atmosphere and provide a sustainable living environment for the foreseeable future.

It should be understood that the foregoing description provides embodiments of the present invention which can be varied and combined without departing from the spirit of this disclosure. Although several embodiments have been illustrated in the accompanying drawings and describe in the foregoing specification, it will be understood by those of skill in the art that additional embodiments, modifications and alterations may be constructed from the principles disclosed herein. Those skilled in the art should, in light of the present disclosure, appreciate that many changes can be made in the specific embodiments which are disclosed and still obtain a like or similar result without departing from the concept, spirit and scope of the present disclosure.

What is claimed is:

1. A process of generating power and selectively separating and capturing predetermined molecules present in a polluted fluid, the process comprising:
    transferring heat from an energy source to a kinetic energy fluid, wherein the polluted fluid and the kinetic energy fluid are different fluids;
    driving a mechanical device by rotating a shaft of the mechanical device;
    driving a generator via rotation of the shaft of the mechanical device to generate electricity by electromagnetic induction;
    supplying at least one of (i) the kinetic energy fluid and (ii) electricity generated by the generator to a selective molecular separation unit;
    intaking the polluted fluid into the selective molecular separation unit and selectively separating at least one predetermined molecule from other molecules of the polluted fluid; and capturing the at least one predetermined molecule via a desorption process of the at least one predetermined molecule in the selective molecular separation unit using heat from thermal energy of at least one of (i) the kinetic energy fluid passing through an integrated heat-exchanger to exchange heat internally with the selective molecular separation unit and (ii) an electrical heater powered by the electricity generated by the generator.

2. The process according to claim 1, wherein the at least one predetermined molecule is selectively separated via at least one of a sorption process and a molecular sieve membrane in the selective molecular separation unit.

3. The process according to claim 2, wherein the desorption process regenerates at least one of a sorbent material used in the sorption process and the molecular sieve membrane.

4. The process according to claim 3, wherein the thermal energy is sufficient to break a bond between the separated predetermined molecule and at least one of the sorbent material and the molecular sieve membrane to regenerate the at least one of the sorbent material and the molecular sieve membrane for a next cycle of selective separation of another predetermined molecule of the polluted fluid.

5. The process according to claim 2, wherein the sorption process utilizes at least one of an absorption process and adsorption process.

6. The process according to claim 3, wherein the sorbent material is impregnated or grafted in the molecular sieve membrane.

7. The process according to claim 1, wherein the process further comprises circulating the kinetic energy fluid between the energy source and the selective molecular separation unit.

8. The process according to claim 1, wherein the mechanical device is a windmill.

9. The process according to claim 1, wherein the energy source is at least one of:
   a combustion process which produces the kinetic energy fluid;
   a burning process which produces the kinetic energy fluid; and
   a surrounding environment including wind which produces the kinetic energy fluid.

10. The process according to claim 9, wherein the combustion process occurs in one of an engine and a gas turbine.

11. The process according to claim 9, wherein the burning process occurs in one of a flare, a water heater and a furnace.

12. The process according to claim 1, wherein the heat is generated via at least one of:
   (i) one or more of: a Rankine Cycle; a Carnot Cycle; a Brayton Cycle; a Diesel Engine Cycle, an Otto Cycle; an Ericsson Cycle; a Hygroscopic Cycle; a Scuderi Cycle; a Stirling Cycle; a Manson Cycle; a Stoddard Cycle; an Atkinson Cycle; a Humphrey Cycle; a Bell Coleman Cycle and a Lenoir Cycle; and
   (ii) the electrical heater powered by the generator in combination with the one or more Cycles in (i).

13. The process according to claim 1, wherein the kinetic energy fluid is at least one of: in a supercritical state; and has an increased flow rate when driving the mechanical device.

14. An integrated green energy and selective molecular separation system, comprising:
   an energy source that provides thermal energy to heat a working fluid to produce a heated working fluid;
   a turbine;
   a generator that is driven by the turbine to generate electricity by electromagnetic induction; and
   a selective molecular separation unit that intakes a polluted fluid comprising predetermined molecules and receives at least one of (i) the heated working fluid and (ii) electricity generated by the generator,
   wherein the polluted fluid and the heated working fluid are different fluids, and wherein the selective molecular separation unit selectively separates at least one predetermined molecule from other molecules of the polluted fluid and captures the at least one predetermined molecule via a desorption process using heat from thermal energy of at least one of (i) the heated working fluid passing through an integrated heat-exchanger to exchange heat internally with the selective molecular separation unit and (ii) an electrical heater that is associated with the selective molecular separation unit and that is powered by the electricity generated by the generator.

15. The system according to claim 14, wherein the selective molecular separation unit comprises at least one of a sorbent material and a molecular sieve membrane that selectively separates the at least one predetermined molecule of the polluted fluid.

16. The system according to claim 15, wherein heat transferred from the thermal energy regenerates at least one of the sorbent material and the molecular sieve membrane by breaking a bond between the separated at least one predetermined molecule and at least one of the sorbent material and the molecular sieve membrane for a next cycle of selective separation of another predetermined molecule of the polluted fluid.

17. The system according to claim 15, wherein the sorbent material is at least one of an absorbent material and adsorbent material.

18. The system according to claim 17, wherein the sorbent material is impregnated or grafted in the molecular sieve membrane.

19. The system according to claim 14, further comprising a heat exchanger associated with the energy source, wherein the energy source provides thermal energy to heat the working fluid via the heat exchanger to produce the heated working fluid, and wherein the heated working fluid circulates between the heat exchanger and the selective molecular separation unit.

20. The system according to claim 14, wherein the heat is generated via at least one of:
   (i) one or more of: a Rankine Cycle; a Carnot Cycle; an Ericsson Cycle; a Hygroscopic Cycle; a Scuderi Cycle; a Stirling Cycle; a Manson Cycle; and a Stoddard Cycle; and
   (ii) the electrical heater powered by the generator in combination with the one or more Cycles in (i).

21. The system according to claim 15, wherein the selective molecular separation unit further comprising a condenser that receives the heated working fluid and extracts heat from the heated working fluid exiting the turbine to desorb the separated at least one predetermined molecule and regenerate at least one of the sorbent material and the molecular sieve membrane, and wherein the condenser reduces a temperature of the heated working fluid to produce a reduced-temperature working fluid.

22. The system according to claim 21, further comprising:
   a compressor that receives the reduced-temperature working fluid from the condenser and increases a pressure of the reduced-temperature working fluid to produce an increased-pressure, reduced-temperature working fluid, and conveys the increased-pressure, reduced-temperature working fluid to a heat exchanger that also receives the thermal energy from the energy source, wherein the heat exchanger transfers the thermal energy from the energy source to the increased-pressure, reduced-temperature working fluid to increase a temperature of the increased-pressure, reduced-temperature working fluid to produce the heated working fluid having increased pressure and increased temperature.

23. The system according to claim 22, further comprising:
one of an expansion valve and a nozzle to increase a velocity of the heated working fluid before the heated working fluid enters the turbine.

24. The system according to claim 14, wherein the energy source is one of:
an underground geothermal energy source comprising a primary fluid that transfers heat to the heated working fluid to increase kinetic energy of the heated working fluid;
a thermal energy source including one of a flare and an exhaust flue gas comprising a primary fluid that transfers heat to the heated working fluid to increase kinetic energy of the heated working fluid; and
a solar energy source that raises the temperature of a primary fluid that transfers heat to the heated working fluid to increase kinetic energy of the heated working fluid.

25. An integrated green energy and selective molecular separation system, comprising:
an energy source that provides thermal energy to a kinetic energy fluid;
a mechanical device that performs work, the mechanical device comprising a shaft;
a generator that is driven via rotation of the shaft of the mechanical device to generate electricity by electromagnetic induction;
a selective molecular separation unit that intakes a polluted fluid comprising predetermined molecules and receives at least one of (i) the kinetic energy fluid and (ii) electricity generated by the generator,
wherein the polluted fluid and the kinetic energy fluid are different fluids, and wherein the selective molecular separation unit selectively separates at least one predetermined molecule from other molecules of the polluted fluid and captures the at least one predetermined molecule via a desorption process using thermal energy of at least one of (i) the kinetic energy fluid passing through an integrated heat-exchanger to exchange heat internally with the selective molecular separation unit and (ii) an electrical heater that is associated with the selective molecular separation unit and that is powered by the electricity generated by the generator.

26. The system according to claim 25, wherein the energy source is at least one of:
a combustion process which produces the kinetic energy fluid;
a burning process which produces the kinetic energy fluid; and
a surrounding environment including wind which produces the kinetic energy fluid.

27. The system according to claim 26, wherein the mechanical device is a windmill.

28. The system according to claim 25, further comprising at least one of:
a compressor to increase a pressure of the kinetic energy fluid before the kinetic energy fluid enters the mechanical device;
a combustor to increase a temperature of the kinetic energy fluid before the kinetic energy fluid enters the mechanical device; and
a burner to increase a temperature of the kinetic energy fluid before the kinetic energy fluid enters the mechanical device.

29. The system according to claim 25, wherein the selective molecular separation unit comprises at least one of a sorbent material and a molecular sieve membrane that selectively separates the at least one predetermined molecule of the polluted fluid.

30. The system according to claim 25, wherein heat transferred from the thermal energy regenerates at least one of the sorbent material and the molecular sieve membrane by breaking a bond between the separated at least one predetermined molecule and at least one of the sorbent material and the molecular sieve membrane for a next cycle of selective separation of another predetermined molecule of the polluted fluid.

31. The system according to claim 25, further comprising a heat exchanger to exchange the thermal energy from the kinetic energy fluid to at least one of the sorbent material and the molecular sieve membrane to regenerate and desorb the at least one predetermined molecule.

32. The system according to claim 25, wherein the sorbent material is at least one of an absorbent material and adsorbent material.

33. The system according to claim 32, wherein the sorbent material is impregnated or grafted in the molecular sieve membrane.

34. The system according to claim 25, wherein the kinetic energy fluid circulates between the energy source and the selective molecular separation unit.

35. The system according to claim 25, wherein the heat is generated via at least one of:
(i) one or more of: a Brayton Cycle; a Diesel Engine Cycle, a Otto Cycle; an Atkinson Cycle; a Humphrey Cycle; a Bell Coleman; and a Lenoir Cycle; and
(ii) the electrical heater powered by the generator in combination with the one or more Cycles in (i).

36. The system according to claim 25, wherein the mechanical device is a windmill.

37. The system according to claim 25, wherein the energy source is at least one of:
a combustor which produces the kinetic energy fluid;
a burner which produces the kinetic energy fluid; and
a windmill which produces the kinetic energy fluid.

38. The process according to claim 37, wherein the combustor is one of an engine and a gas turbine.

39. The process according to claim 37, wherein the burner is one of a flare, a water heater and a furnace.

* * * * *